US012732614B2

(12) United States Patent
Giasson et al.

(10) Patent No.: US 12,732,614 B2
(45) Date of Patent: Sep. 8, 2026

(54) HIGH-CAPACITY TRANSCODING STATION AND METHOD

(71) Applicant: CORESEE, INC., Irvine, CA (US)

(72) Inventors: Frédéric Giasson, Canton-de-Hatley (CA); Maged E. Beshai, Maberly (CA)

(73) Assignee: CORESEE, INC., Irvine, CA (US)

( * ) Notice: Subject to any disclaimer, the term of this patent is extended or adjusted under 35 U.S.C. 154(b) by 144 days.

(21) Appl. No.: 18/679,226

(22) Filed: May 30, 2024

(65) Prior Publication Data

US 2024/0323383 A1 Sep. 26, 2024

Related U.S. Application Data

(63) Continuation-in-part of application No. 18/392,409, filed on Dec. 21, 2023.

(60) Provisional application No. 63/504,978, filed on May 30, 2023, provisional application No. 63/434,448, filed on Dec. 21, 2022.

(51) Int. Cl.

| | |
|---|---|
| ***H04N 19/127*** | (2014.01) |
| ***H04N 19/177*** | (2014.01) |
| ***H04N 19/40*** | (2014.01) |
| ***H04N 19/70*** | (2014.01) |

(52) U.S. Cl.

CPC ......... *H04N 19/127* (2014.11); *H04N 19/177* (2014.11); *H04N 19/40* (2014.11); *H04N 19/70* (2014.11)

(58) Field of Classification Search

None

See application file for complete search history.

(56) References Cited

U.S. PATENT DOCUMENTS

| | | | |
|---|---|---|---|
| 9,609,317 | B1 | 3/2017 | Kizhepat et al. |
| 9,787,986 | B2 | 10/2017 | Dunphy |
| 10,003,626 | B2 | 6/2018 | Kim et al. |
| 10,027,997 | B2 | 7/2018 | Mutton |
| 10,165,310 | B2 | 12/2018 | Sievers et al. |
| 10,218,826 | B2 | 2/2019 | Eswaran et al. |
| 10,298,969 | B2 | 5/2019 | Bayoumi et al. |
| 10,356,448 | B2 | 7/2019 | Ducloux et al. |
| 10,595,059 | B2 | 3/2020 | Mutton |

(Continued)

*Primary Examiner* — Kaitlin A Retallick

(74) *Attorney, Agent, or Firm* — Knobbe, Martens, Olson & Bear, LLP

(57) ABSTRACT

The invention provides a high-capacity transcoding station for concurrently transcoding multiple signal streams received from designated multimedia sources. The transcoding station employs a pool of heterogenous processing units of different types, referenced as "workers", a pool of resources communicatively coupled to the pool of workers, and an orchestrator configured to communicate with the pool of workers and communicate with the multimedia sources through a network interface. The network interface receives transcoding requests and signal streams to be transcoded, directs control data components of the transcoding requests from different multimedia sources to the orchestrator and directs content data of the signal streams to the pool of workers. The content data is organized into groups of pictures (GOPs) and each worker is configured to process one GOP at a time. The GOPs are treated as independent entities, regardless of their stream affiliations. A worker may process a GOP belonging to any stream.

17 Claims, 44 Drawing Sheets

(56) References Cited

U.S. PATENT DOCUMENTS

| | | | | |
|---|---|---|---|---|
| 10,951,925 | B2 | 3/2021 | Reitmeyer et al. | |
| 11,184,627 | B2 | 11/2021 | Zhang et al. | |
| 11,363,262 | B1 | 6/2022 | Pang et al. | |
| 11,405,661 | B2 | 8/2022 | Reitmeyer et al. | |
| 11,528,516 | B2 | 12/2022 | Park et al. | |
| 11,638,033 | B2 | 4/2023 | Braness et al. | |
| 11,716,480 | B2 | 8/2023 | Leontaris et al. | |
| 11,743,478 | B2 | 8/2023 | Rao | |
| 11,825,136 | B2 | 11/2023 | Yan | |
| 11,849,112 | B2 | 12/2023 | Naletov et al. | |
| 2020/0322659 | A1* | 10/2020 | Park | H04N 21/2405 |
| 2021/0344733 | A1* | 11/2021 | Tweedale | H04L 41/08 |
| 2024/0163464 | A1* | 5/2024 | Miller | H04N 19/40 |
| 2024/0323383 | A1 | 9/2024 | Glasson | |

* cited by examiner

3920
Signal-stream metadata
(Example)

| | 4010 Received signal stream | | 4020 Transcoded signal stream | |
|---|---|---|---|---|
| | 4012 Compression standard | 4014 Frame rate and frame dimension (in pixels) | 4022 Compression standard | 4024 Frame rate and frame dimension (in pixels) |
| Stream-01 | H.264/AVC | 30 frames/second, 2560×1440 pixels | H.265/HEVC | 30 frames/second, 2560×1440 pixels |
| • • • | | | | |
| Stream-σ, 1<σ≤S | H.264/AVC | 30 frames/second, 2560×1440 pixels | H.264/AVC | 50 frames/second, 1920×1080 pixels |
| • • • | | | | |
| Stream-S, S>1 | | | | |

FIG. 40

HIGH-CAPACITY TRANSCODING STATION AND METHOD

CROSS-REFERENCE TO RELATED APPLICATIONS

The present application is a Continuation-in-Part of U.S. application Ser. No. 18/392,409 filed on Dec. 21, 2023, which claims the benefit of U.S. provisional application No. 63/434,448 filed on Dec. 21, 2022. The present application also claims the benefit of U.S. provisional application No. 63/504,978 filed on May 30, 2023. The entire content of the above noted applications is incorporated herein by reference.

FIELD OF THE INVENTION

The invention relates to multimedia streaming. In particular, the invention is directed to realizing a large-scale transcoding station serving high speed streams of diverse formations.

BACKGROUND OF THE INVENTION

The rapid growth of transport capacity of communication networks enables provision of multimedia streaming at high flow rates. The constantly evolving techniques of video-signal encoding necessitates an intermediate transcoding layer to enable multimedia sources of different generations to stream to receivers which may not be equipped to decode streams of different resolutions and formats encoded at sources of different generations. In some applications, video signals are generated using codecs producing high-quality encoded signals but at a low compression ratio, thus necessitating a large storage capacity or a high-capacity communication path, of the order of gigabits/sec, to a recipient.

A traditional transcoding server is typically constructed to download a source multimedia file, to be stored locally, then produce a corresponding transcoded file which is also stored locally to be uploaded to a designated destination. The sizes of files thus produced may be of the order of a terabyte. Transcoding may be performed in a single server or cooperatively in multiple servers which may not be collocated.

There is a need, therefore, to explore methods and systems for expeditious and efficient transcoding of high speed multimedia streams of diverse formations.

SUMMARY OF THE INVENTION

The invention provides a high-capacity transcoding station for concurrently transcoding multiple heterogenous signal streams received from designated multimedia sources. Each signal stream is organized into groups of pictures (GOPs).

In accordance with an aspect, the transcoding station comprises a pool of heterogenous processing units of different types, referenced as "workers" and an orchestrator configured to assign to each GOP a respective set of workers to produce a respective transcoded GOP. The workers are configured to concurrently transcode a plurality of heterogeneous signal streams, each worker comprising a respective hardware processor;

A network interface, connecting to a telecommunication network, communicates with a plurality of multimedia sources to receive transcoding requests and corresponding signal streams organized into GOPs. The network interface attaches a signal-stream identifier to each GOP, directs the transcoding requests to the orchestrator; and directs the signal streams to the pool of workers; A collator coupled to the network interface collates transcoded GOPs according to respective signal-stream identifiers and arrange GOPs of each signal stream in proper sequential order to be communicated to respective destinations through the network interface. The plurality of heterogeneous signal streams comprises at least two signal streams formed according to different coding standards.

Transcoding the signal streams is performed in a predefined number, $\Omega$, $\Omega>1$, of transcoding stages. The pool of workers is organized into $\Omega$ worker groups, with each worker group comprising workers configured to perform tasks relevant to a respective transcoding stage. The orchestrator is coupled to $\Omega$ transcoding-stage controllers, each transcoding-stage controller communicatively coupled to a respective worker group which includes one worker from each worker group.

Each transcoding request of a specific signal stream comprises metadata indicating a compression standard according to which the specific stream is formed and specifying a compression standard according to which a respective transcoded signal stream is to be formed.

The orchestrator is configured to define tasks to be performed for each GOP, in each transcoding stage, according to metadata content of transcoding request. The orchestrator presents task definitions to compatible workers and, for each task, selects a compatible worker of least workload.

In order to enable transfer of control data and content data from a worker of any work-group to a worker of another work group, each worker of each worker group has a dual control channel to the orchestrator, a first content-transfer channel from a content-transfer mechanism, and a second content-transfer channel to the content transfer mechanism. The content-transfer mechanism comprises: (1) a worker-selection unit for each work group having a respective upstream selector for transferring GOP content to a selected worker of the work group and a downstream selector for transferring output of the selected worker to a common memory; (2) a first cyclical selector for supplying GOP content data from the network interface and from the worker-selection units to the common memory; and (3) a second cyclical selector for transfer of GOP content data from the common memory to the worker-selection units and to the network interface.

In an alternate implementation, the content-transfer mechanism may be constructed as a worker-selection unit for each work group having a respective upstream selector for transferring GOP content to a selected worker of the work group and a downstream selector for transferring output of the selected worker to an intermediate content memory coupled to a subsequent worker-selection unit.

In another alternate implementation, the content-transfer mechanism may be constructed as: (1) an input selector for transferring GOP content data received through the network interface to designated workers of a first-stage worker group; (2) $(\Omega-1)$, $\Omega>2$, switching units each connecting a respective worker-group to a subsequent worker group; and (3) an output selector for transferring transcoded GOP content data to the network interface.

Any worker group of the $\Omega$ worker groups, $\Omega>2$, may comprise workers having respective dedicated resources and/or workers sharing resources. The resources being software modules or modules comprising software instructions and hardware processing units. A worker group may connect to a shared pool of heterogenous resources through a resource-access mechanism where a source of the shared pool is allocable to any worker on demand.

In a preferred implementation, the pool of workers is organized into three worker groups so that: a first worker group decodes received GOPs to produce respective decoded GOPs; a second worker group performs processes relevant to frame rate and frame dimension to organize frames of each GOP to be compatible with destination receivers; and a third worker group encodes output GOPs of the second worker group according to a requisite coding standard at destination to produce a compressed signal modulating a downstream carrier directed to respective destinations.

In order to expedite allocating workers of the first worker group and the third worker group, to tasks the first worker group is divided a predetermined number of decoding sub-groups, each decoding sub-group corresponding to a respective coding standard, and the third worker group comprises a predetermined number of encoding sub-groups, each encoding sub-group corresponding to a respective coding standard.

The network interface comprises: (1) a network interface processor; (2) a source-characterization module configured to determine characteristics of each engaged multimedia source of the plurality of multimedia sources, with the help of a source-characteristics database; and (3) a destination interaction module configured to communicate notifications and respective transcoded content to all destinations of each transcoded stream.

In accordance with another aspect, the invention provides a method of signal-stream transcoding, implemented at a transcoding station employing a plurality of hardware processors. The method comprises receiving heterogenous signal streams from multiple signal sources, each signal stream associated with respective metadata and organized into respective groups of pictures (GOPs), and concurrently processing individual GOPs of all of the heterogenous signal streams as independent entities, each GOP comprising a respective number of video frames;

A plurality of heterogeneous workers is employed to perform a plurality of predefined tasks for transcoding the heterogeneous signal streams. Each worker comprises a processor and is configured to perform a respective set of tasks of the plurality of predefined tasks.

The processing of individual GOPs comprises: (1) identifying requisite tasks of the plurality of predefined tasks for each signal stream of the heterogenous signal streams according to the respective metadata; and (2) activating compatible workers to perform the requisite tasks for each GOP to produce a respective transcoded GOP.

The method collates the resulting transcoded GOPs, according to signal-stream identity and sequential order within each signal-stream, and transmits transcoded GOPs of each signal stream to respective designated destinations.

The plurality of workers comprises a number of specific workers performing functions pertinent to respective coding standards. Each of the specific worker comprises dedicated resources.

The requisite tasks comprise generic processes of: (1) decoding received GOPs to produce respective decoded GOPs; (2) adjustments of frame-dimensions and frame-rates of the respective decoded GOPs to produce edited GOPs compatible with target receivers; (3) encoding the edited GOPs to produce compressed GOPs, compatible with target receivers; and modulating a downstream carrier directed to a network for distribution to target receivers.

The transcoding station handles heterogenous signal streams formed according to different coding standards and the metadata of each signal stream specify: (1) a first coding standard according to which the signal stream is compressed at source; (2) frame dimensions and frame rate at source, and requisite frame dimensions and frame rate at destination; and (3) a second coding standard according to which a respective transcoded signal stream is to be formed.

The method arranges the plurality of heterogeneous workers into: a first worker group for performing video-signal decompression functions; a second worker group for performing video-signal formatting; and a third worker group for performing video-signal compression functions. In order to expedite allocation of workers to tasks, the method further comprises: (1) partitioning the first-worker group into a predetermined number of decoding sub-groups, each decoding sub-group corresponding to a respective coding standard; and (2) partitioning the third worker group into a predetermined number of encoding sub-groups, each encoding sub-group corresponding to a respective coding standard.

Thus an improved high-capacity transcoding station and a corresponding method of transcoding have been provided.

BRIEF DESCRIPTION OF THE DRAWINGS

Embodiments of the present invention will be further described with reference to the accompanying exemplary drawings, in which:

FIG. 40 details metadata associated with a signal stream;

TERMINOLOGY

Figure 1:
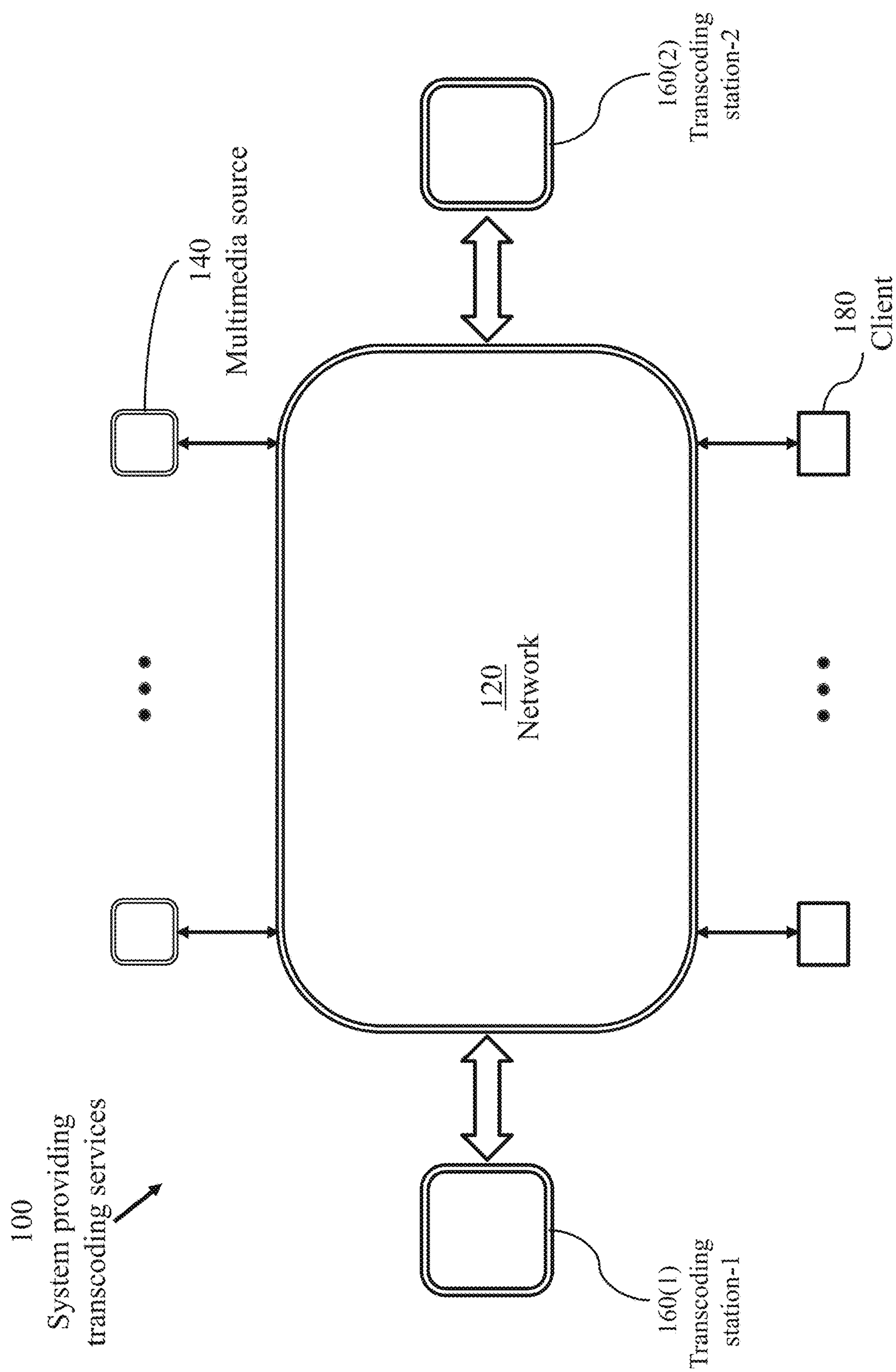
FIG. 1 illustrates a network supporting transcoding stations.

Group-of-pictures: A multimedia stream comprises a video stream which may be organized into independent groups-of-pictures (GOPs) to enable parallel processing. The GOPs generated at different multimedia sources may have arbitrary numbers of video frames.

Content data vs. control data: The streaming data comprises content data of different forms (video, audio, text, . . . ) and control data which guide the processing and routing of the content data. The content data of a multimedia constitutes the bulk of the data of the stream.

Orchestrator assembly: An orchestrator assembly comprises an orchestrator core (functioning as a master controller) and multiple stage controllers each dedicated to a respective transcoding stage. The orchestrator assembly guides the work-load assignment to a plurality of heterogenous workers (defined below).

Dual link: A dual link is a bidirectional link. Likewise, a dual control path is a bidirectional control path.

Content-processing assembly: The content-processing assembly, operating under control of the orchestrator assembly, dynamically provides to each engaged worker access to respective data.

Content-access units: The content-processing assembly is structured in the form of content-access units.

Collator: A collator is an output module of the transcoding station, coupled to the network interface, which is configured to arrange successive encoded GOPs in the order of corresponding source GOPs.

Decoder: The term decoder refers to a decompression module for reconstructing raw source data from a received compressed source data.

Encoder: The term refers to a compression module for compressing a signal-processed stream adapted to be compatible with intended receivers.

VPU: A video-processing unit (VPU), also called a signal adaptor, formats a video signal to be compatible with intended receivers.

Transcoder: The term transcoder refers to a device employing at least one decoder, at least one VPU, and at least one encoder.

Worker: The term "worker" refers to a decoder, a signal adaptor, or an encoder having a respective hardware processor coupled to a memory device storing software instructions and a buffer holding transitory data.

Transcoding station: A transcoding station is a large-scale transcoder employing a plurality of heterogenous workers where workers of any processing stage comprise a mixture of uni-functional and multi-functional workers, with the multifunctional workers comprising uni-tasking worker and multitasking workers.

Worker type: The plurality of heterogenous workers is sorted according to types of tasks that a worker is configured to perform.

REFERENCE NUMERALS

100: A system providing transcoding services
120: A network supporting transcoding stations
140: Multimedia sources
160: Transcoding station
180: Clients of the transcoding system
200: An overview of a structure of a transcoding station
210: Dual link (bidirectional link) connecting to network 120
220: Network interface
230: External control signals and metadata from multiple sources 140
231: External control data directed to Orchestrator 250
232: Control data directed to destinations through the network interface 220
235: Selector of external control data from a specific stream
240: External content data from the sources
241: External content data (upstream content data) directed to the pool of workers 260
242: Content data directed to destinations through the network interface
250: Orchestrator
260: A pool of workers of different types
270: Dual (bidirectional) control paths between orchestrator 250 and the pool of workers 260
280: A pool of resources communicatively coupled to the pool of workers 260
300: Detected baseband GOPs received at a transcoding station from multiple sources
310: GOPs of a specific received stream, 310A, 320B, and 320C belong to individual streams of different flow rates and formats
400: Basic functions of a transcoding station; processes 410 to 450 are performed at a specific transcoding station
410: Process of receiving multiple signal streams from multiple signal sources, each stream being organized into groups of pictures (GOPs)
420: Process of detecting individual GOPs and corresponding metadata
430: Processes of transcoding all GOPs of all streams as independent entities employing a plurality of workers operating concurrently
440: A process of collating transcoded GOPs according to stream identity and sequential order within each stream
450: A process of transmitting transcoded GOPs of each stream to respective designated destinations
500: Requirements for a steady-state operation of the transcoding station
520: A group of workers of pool 260 of a specific worker type
600: Allocation of multiple workers to each stream
610: Signal streams received at the network interface
700: A general structure for inter-worker content-transfer mechanism
741: Means for content transfer from the network interface 220 to a first group 520(1) of type-1 workers of the pool of workers 260
742: Means for content transfer from the first group 520(1) of type-1 workers to a second group 520(2) of type-2 workers of the pool of workers 260
743: Means for content transfer from the second group 520(2) of type-2 workers to a third group 520(3) of type-3 workers of the pool of workers 260
744: Means for content transfer from the third group 520(3) of type-3 workers to a fourth group 520(4) of type-4 workers of the pool of workers 260
745: Means for content transfer from the fourth group 520(4) of type-4 workers to the network interface
800: A broad overview of transcoding the GOPs of all received streams as independent entities
810: Operator-provided data
820: A process of identifying candidate workers
830: A process of receiving a transcoding request from a source
840: A process of determining availability of requisite resources
850: Processes of identifying applicable tasks for the request, available workers and resources, and updating availability of resources and workers.
900: An overview of handling transcoding requests
930: Memory storing tasks types (from operator-defined data)
940: Paths for communicating task definitions to workers
1000: Partitioning tasks and corresponding workers
1010: Dual control path between orchestrator 250 and a stage controller
1020: Stage controllers (individually 1020(1) to 1020(Ω), Ω>1)
1030: Path to transfer task definitions from a stage controller 1020 to a respective memory device 1035
1035: Memory holding task definitions for a specific transcoding stage
1040: Paths for communicating task definitions to workers of a specific type
1070: Dual control paths coupling a stage controller to respective stage workers
1100: Inter-worker content transfer
1110: Inter-worker paths
1120: Stage-1 processed GOPs of multiple signal streams
1150: Stage (Ω−1) processed GOPs of multiple signal streams
1160: Paths from type (Ω−1) workers
1200: Network-interface components
1210: Source interaction module
1220: Metadata extraction module
1230: Destination interaction module
1240: Source-characterization algorithm
1250: Source characteristics database
1260: Content-data-extraction module
1280: Transcoded GOPs rearrangement module
1290: Network-interface processor (generally, a pool of processors)
1300: Orchestrator connectivity to other components of the transcoding station
1330: Module forming internal control data
1345: All dual paths 1010 between orchestrator 250 and the stage controllers 1020
1350: The set of Ω stage controllers 1020
1400: Components of an exemplary worker
1410: Worker's processor
1420: Worker-orchestrator interface

1425: Dual paths between a worker and the orchestrator
1430: Interface to other workers
1432: Dual paths to other workers
1440: Worker-resources interface
1450: Memory storing software modules for executing tasks allocable to a worker
1460: Module for handling external data transferred through the network interface 220
1500: A worker having dedicated resources versus workers accessing shared resources
1510: Any set of workers
1520: Dedicated resources
1530: One set of heterogeneous resources
1550: A specific resource
1560: A pool of shared resources
1580: Means for enabling workers to access shared resources-a resource-access mechanism
1600: Sharing resources among workers
1620: Groups of resources
1630: Resource-access paths
1640: Organization of shared resources
1700: Identifying tasks and requisite resources for basic transcoding functions
1710: Basic transcoding functions
1720: Decompression of received streams
1730: Video-signal processing based on source-provided metadata
1740: Destination-specific video-signal processing
1750: Compression of processed video signals according to a specified standard
1780: Exemplary task types
1790: Exemplary resources types
1800: Relating tasks to workers
1820: Process of identifying allocable resources for each worker type
1840: Process of identifying requisite resources for each task type
1860: Process of determining a set of tasks that each worker can perform
1880: Inversion of process 1840 to determine a set of workers suitable for each task
1900: Relating tasks to requisite resources and workers to allocable resources
1930: Worker types
1990: An example of tasks which a worker of a specific worker-type can perform
2000: An example of task types relating to worker types, and vice versa
2100: Provisioned resources and workers-exemplary allocable resources for a plurality of workers of different worker types
2200: Centralized allocation of workers to tasks
2210: Scheduler
2260: Worker-allocation instructions
2270: Content-transfer assembly
2300: Distributed allocation of workers to tasks
2360: Internal control data
2400: An orchestrator's selection of a worker (method-1) versus the orchestrator polling candidate workers (method-2) for a specific task
2410: Worker selection, method-1
2412: Selector operated in a random-selection mode
2414: Orchestrator's assignment of a worker to a task
2420: Worker selection method-2
2432: Selector operated in a round-robin mode
2434: Round-robin polling
2430: Task definition (from orchestrator)
2432: Selector of a worker (or one of workers) for task 2430
2434: Round-robin selection of a worker (or one of workers) for task 2430
2500: Multicasting a definition of a requisite task to candidate workers (method-3)
2520: Fan-out unit
2530: Buffers of offered tasks, each buffer coupled to a respective worker 1400
2600: Basic processes of worker selection for a task
2620: Process of receiving a memory address of a new GOP
2630: Process of identifying requisite tasks and selecting a first task as a current task
2640: Processes of finding an available worker for the current task and communicating to the available worker the memory address and relevant metadata
2650: Process of receiving from the worker a completion indication and memory address of processed content data
2660: Step of determining completion of all tasks for the GOP
2670: Process of communicating the memory address of the processed content data to the network interface 220 and revisiting process 2620 to receive another GOP
2680: Process of determining a subsequent task and revisiting process 2640 to find a worker for the subsequent task
2700: Processes 2640 applied to method-2 of worker selection for a task
2710: Process of identifying a set of workers for a task
2720: Process of polling individual workers of the set of workers
2730: Process of determining whether a polled worker is available
2740: Branching based on polled-worker's mode (0: dedicated resources, 1: shared resources)
2745: Process of assigning a worker to implement the task and marking the worker as occupied
2750: Process of identifying requisite resource types for the task
2760: Process of determining availability of requisite resources
2770: Process of ascertaining availability of all requisite resources
2775: Process of reducing counts of resources allocated to the task
2780: Pausing processing then revisiting process 2720
2800: Processes 2640 applied to method-3 of worker selection for a task
2810: Process of identifying a set of workers for a task and presenting task definition to all workers of the set of workers
2820: Process of receiving individual workers' responses within a predefined time window
2830: Process of determining availability of at least one available worker
2840: Process of selecting one available worker
2880: Pause and revisit process 2820
2900: State update following completion of a task regardless of the method used for worker allocation to the task
2910: Process of acquiring identification of worker to be marked available and memory address of processed content data
2930: Process of marking released worker as available
2940: Process of identifying resources to be released

2950: Process of increasing count of each corresponding resource type

3000: A configuration for transfer of control data following a worker's task completion for the case of centralized allocation of a worker for a task

3010: Dual control channel between a worker and orchestrator 250

3020: Paths of processed content data between workers

3100: A configuration for transfer of control data following a worker's task completion for the case of polling workers for a task

3110: A buffer holding task definitions

3200: A configuration for transfer of control data following a worker's task completion for the case of multicasting a task definition to all workers of a respective set of workers

3300: First mechanism of inter-worker content transfer

3310: A selector for directing GOP content data read from a common content memory 3350 to a worker for method-1, method-2, or method-3

3320: A selector for directing GOP content data from a worker to the common content memory 3350.

3340: Worker-selection unit (WSU) comprising a selector 3310, a group 520 of workers, and a selector 3320

3350: Common content memory holding content data of GOPs in progress

3360: WRITE-access selector coupled to common content memory

3365: READ-access selected coupled to the common content memory

3371: Detected compressed content data received from a multimedia source 140 offered to a type-1 worker of WSU-1 (stream-specific upstream content data 241 is buffered in the common content memory 3350)

3372: Processed content data offered to a type-ω worker through WSU-ω, 1≤ω≤Ω

3373: Processed content data offered to a type-Ω worker through WSU-Ω

3391: Decompressed content data received from a type-1 worker of WSU-1 to be held in common-content memory 3350

3392: Processed content data from a type-ω worker to be held in memory 3350 1≤ω≤Ω

3393: Processed content data from a type-Ω2 worker to be held in memory 3350 to be transmitted to a respective destination (or respective multiple destinations) through network interface 220.

3400: A variation of the first mechanism of inter-worker content transfer where the common-content memory 3350 is replaced with Ω content memory devices 3450(ω), 1≤ω≤Ω, each preceding a WSU, and an output content memory 3455; the illustrated case corresponds to Ω=4

3450: Stage content memory preceding a respective worker-selection unit (WSU)

3455: Output Content memory holding transcoded content ready for delivery to destination

3460: Stage-content-memory controller

3465: Output-content-memory controller

3480: Interface of pool of workers with the orchestrator

3500: Second mechanism of inter-worker content transfer

3520: A content-transfer mechanism, preceding a respective worker group, configured as a simplified switching mechanism, for concurrent transfer of GOPs at different stages of processing to Ω worker groups (for a case where Ω=4)

3600: Forms of signals formed at source directed to a transcoding station

3610: A video stream arranged in groups of pictures (GOPs)

3620: Compressed video stream of variable flow rate but equal compressed GOP durations

3630: Compressed video stream of fixed flow rate, hence variable compressed GOP durations

3700: An example of discrepancy between the order of transcoded GOPs and the order of received GOPs at a transcoding station 160

3720: GOP index of a received stream of GOPs

3740: Index of a processed GOP

3800: Effect of varying durations of GOP processing on sequential order of processed GOPs

3810: Instants of receiving GOPs

3820: Indices of received GOPs

3830: Sequential order of output GOPs of stage-1

3840: Sequential order of output GOPs of stage-2

3850: Sequential order of output GOPs of stage-3

3900: A signal stream received at the transcoding station from a multimedia source 140

3910: A signal-stream identifier inserted at the network interface

3920: Signal-stream metadata

3930: GOP data

3940: GOP index within signal-stream 3910

3950: Compressed GOP content

4010: Data relevant to received signal stream

4012: Compression standard applied at source

4014: Frame rate and structure of received signal stream

4020: Data relevant to transcoded signal stream

4022: Compression standard applied to transcoded signal stream

4024: Frame rate and structure of transcoded signal stream

4100: Allocation of GOPs of the received signal stream to stratified workers of the processing stages

4110: All workers of the decoding stage (the first processing stage) including standard-specific workers which are configured to handle compressed GOPs formed according to respective standards

4118: Worker of the decoding stage (first stage) currently processing GOP (01, 2864)

4120: Workers of the second stage which relates to frame rate and structure of decoded GOPs

4122: worker of the second stage currently processing GOP (03, 2521)

4130: All workers of the encoding stage (the third processing stage) including standard-specific workers which are configured to compress outgoing GOPs according to respective standards

4132: worker of the encoding stage (third stage) currently processing GOP (01, 2861).

4200: Allocation of GOPs of the received signal stream to stratified and sorted workers of the processing stages

4210: Workers of the decoding stage (the first processing stage) divided into L subgroups, L>1, each subgroup corresponding to a respective compression standard

4230: Workers of the encoding stage (the third processing stage) divided into L subgroups, L>1, each subgroup corresponding to a respective compression standard

4300: Holding content data of processed GOPs during tenancy within the transcoding station using a linked list

4310: An array storing GOP identifiers and corresponding initial memory segments

4350: A common-memory used for holding GOP data during the multi-stage transcoding processes

4355: A memory segment

DETAILED DESCRIPTION OF EMBODIMENTS

FIG. 1 illustrates a system 100 providing transcoding services comprising a network 120 supporting multimedia sources 140, multiple transcoding stations 160, two of which are illustrated, and clients 180 of the transcoding system.

Figure 2:
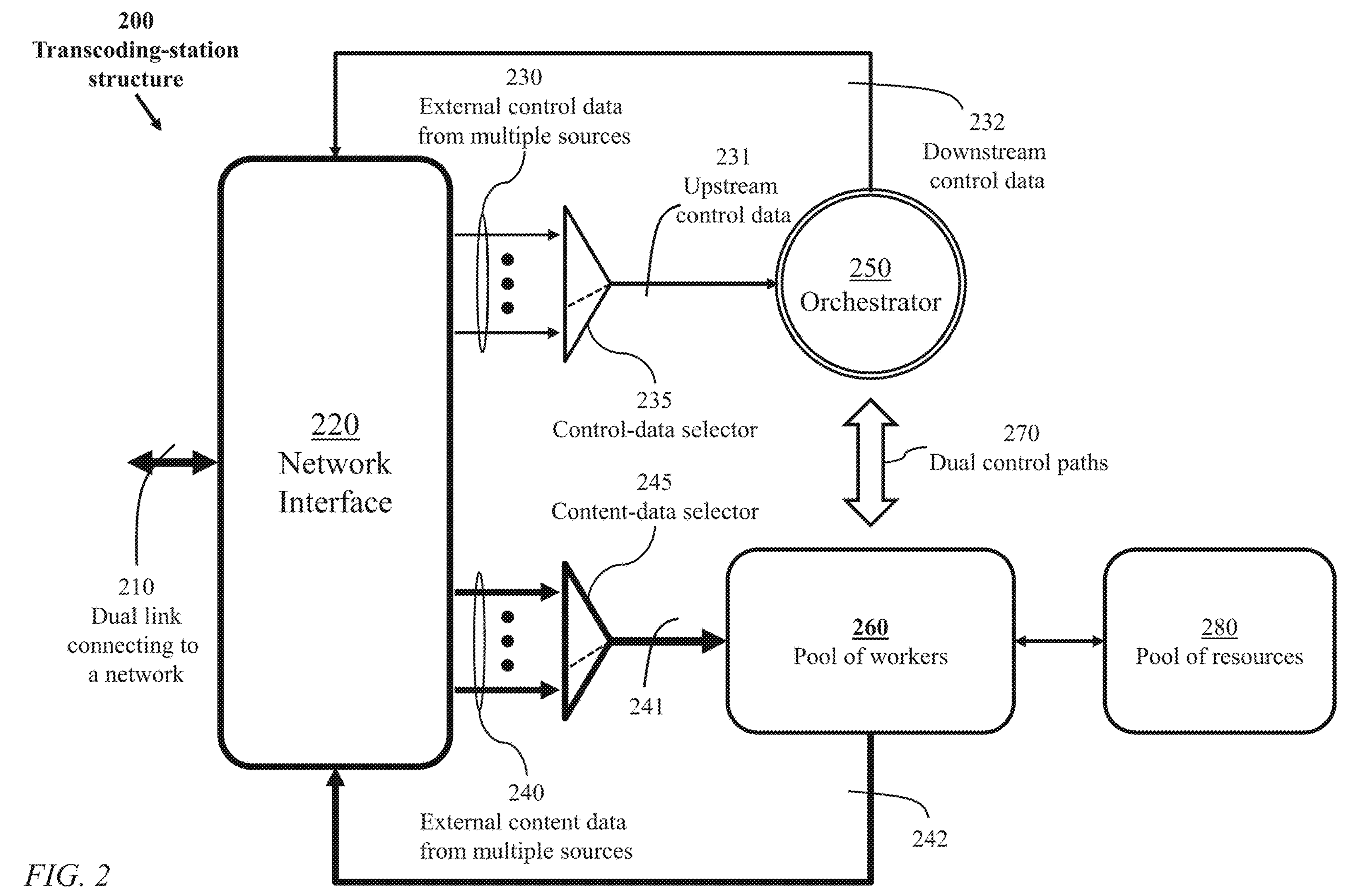
FIG. 2 is an overview of a structure of a transcoding station, in accordance with an embodiment of the present invention.
Figure 14:
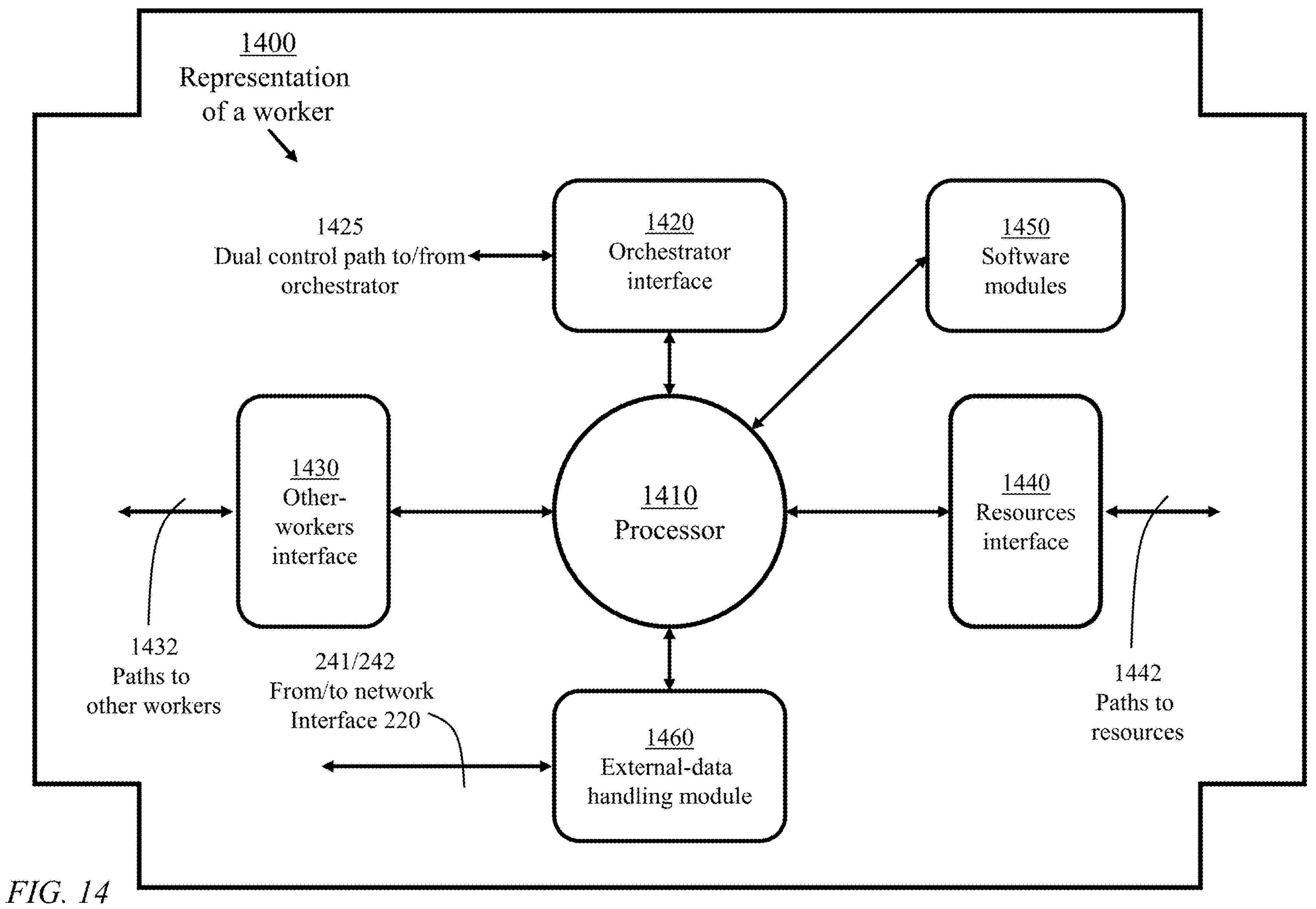
FIG. 14 illustrates components of an exemplary worker, in accordance with an embodiment of the present invention.

FIG. 2 is an overview 200 of a structure of a transcoding station 160. A network interface 220 (detailed in FIG. 12) connects to network 120 through a dual link 210 for receiving transcoding requests from the plurality of multimedia sources 140 and signal streams to be transcoded then communicating transcoded streams to respective destinations through the network. The network interface is configured to separate control data (including metadata) 230 and content data 240 from each stream received from a multimedia source 140. The network interface directs the control data 230 to an orchestrator 250, through stream-specific control-data selector 235, and the content data 240 to a pool 260 of shared workers of different types through high-capacity stream-specific content selector 245. A representative structure of a worker is illustrated in FIG. 14. The orchestrator 250 receives stream-specific upstream control data 231 and transmits stream-specific downstream control data 232 to respective destinations through the network interface. The pool 260 of workers receives stream-specific upstream content data 241 and transmits stream-specific downstream content data 242 to respective destinations through the network interface.

Figure 15:
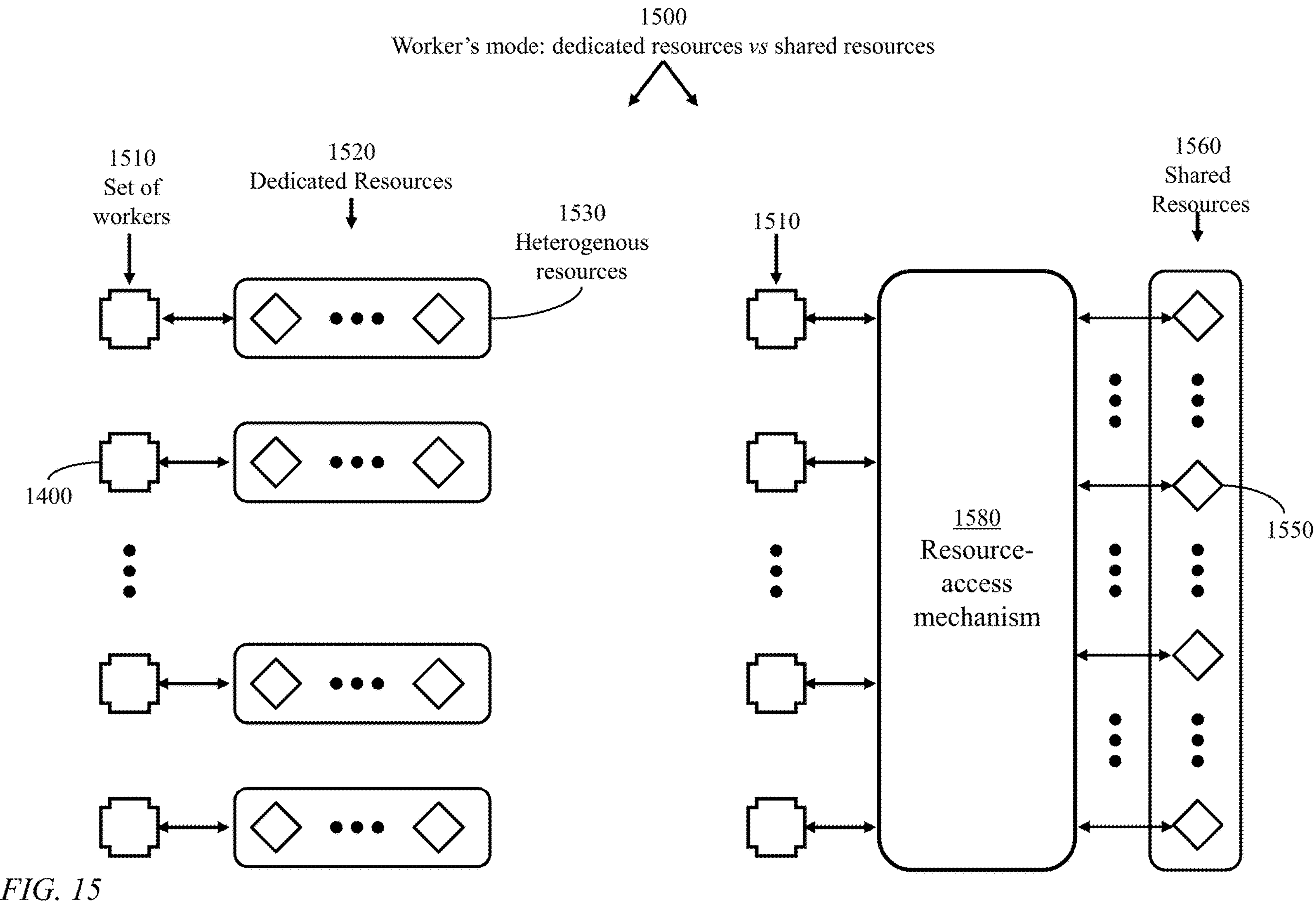
FIG. 15 illustrates two modes of operations of a worker based on dedicated resources or shared resources, in accordance with an embodiment of the present invention.
Figure 16:
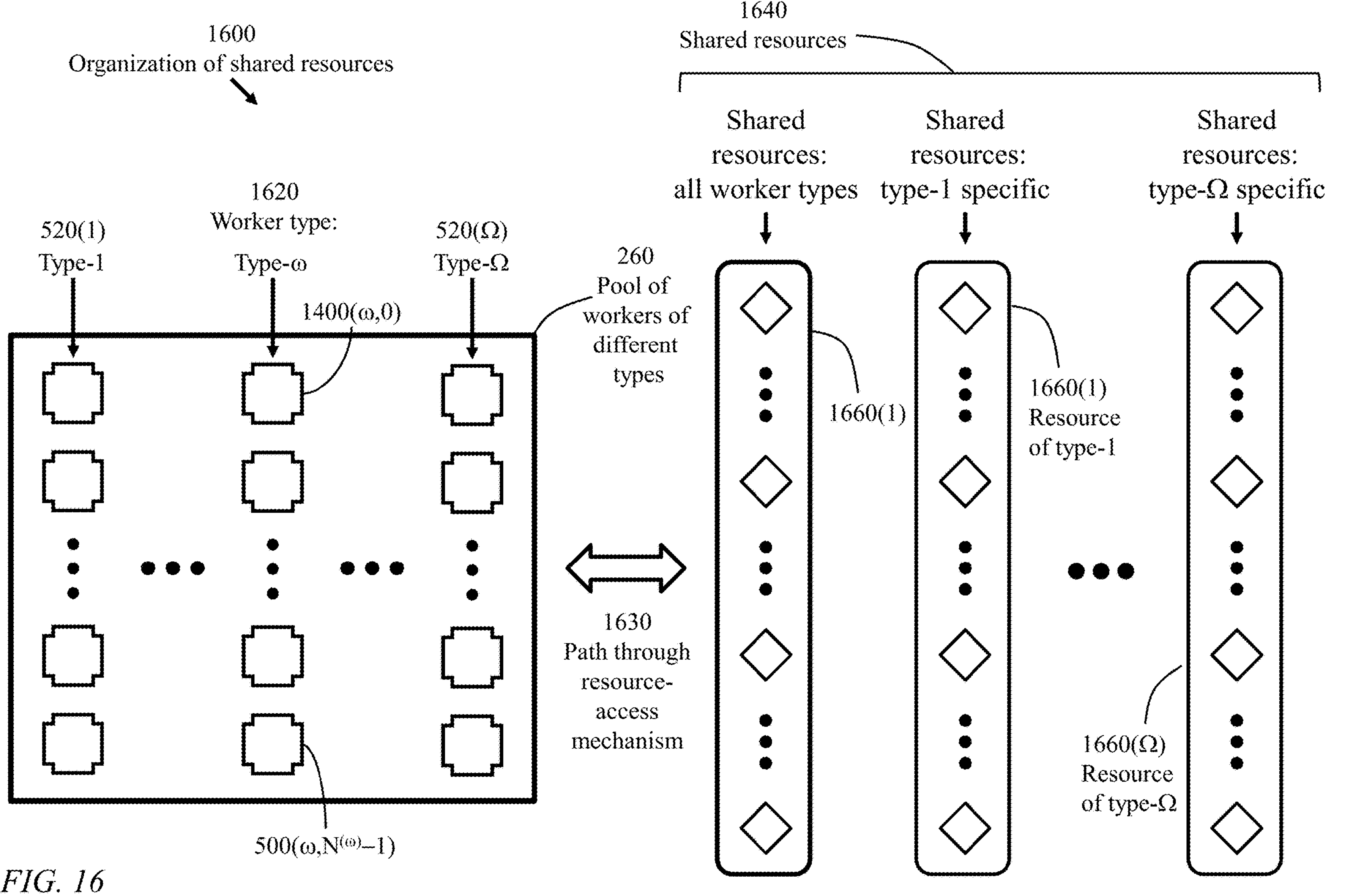
FIG. 16 details sharing resources among a plurality of workers.

The orchestrator communicates with the pool 260 of workers through dual control paths 270. A pool 280 of resources is communicatively coupled to the pool of workers 260. As illustrated in FIG. 15 and FIG. 16, a worker may be coupled to respective dedicated resources or rely on a pool of shared resources.

To enable concurrent transcoding at the transcoding stations 160, the multimedia sources 140 generally format video-signal components of multimedia signals into groups of pictures (GOPs). A GOP comprises a number $\gamma$ of video frames, $\gamma>1$ ($\gamma=50$, for examples) which may be source dependent and may even differ for GOPs of a same stream. At a frame rate of f frames per second, the duration of a GOP before compression at source is $\tau=(\gamma/f)$, and the GOP generation rate, denoted $\lambda$, is $\lambda=(f/\gamma)$.

Figure 3:
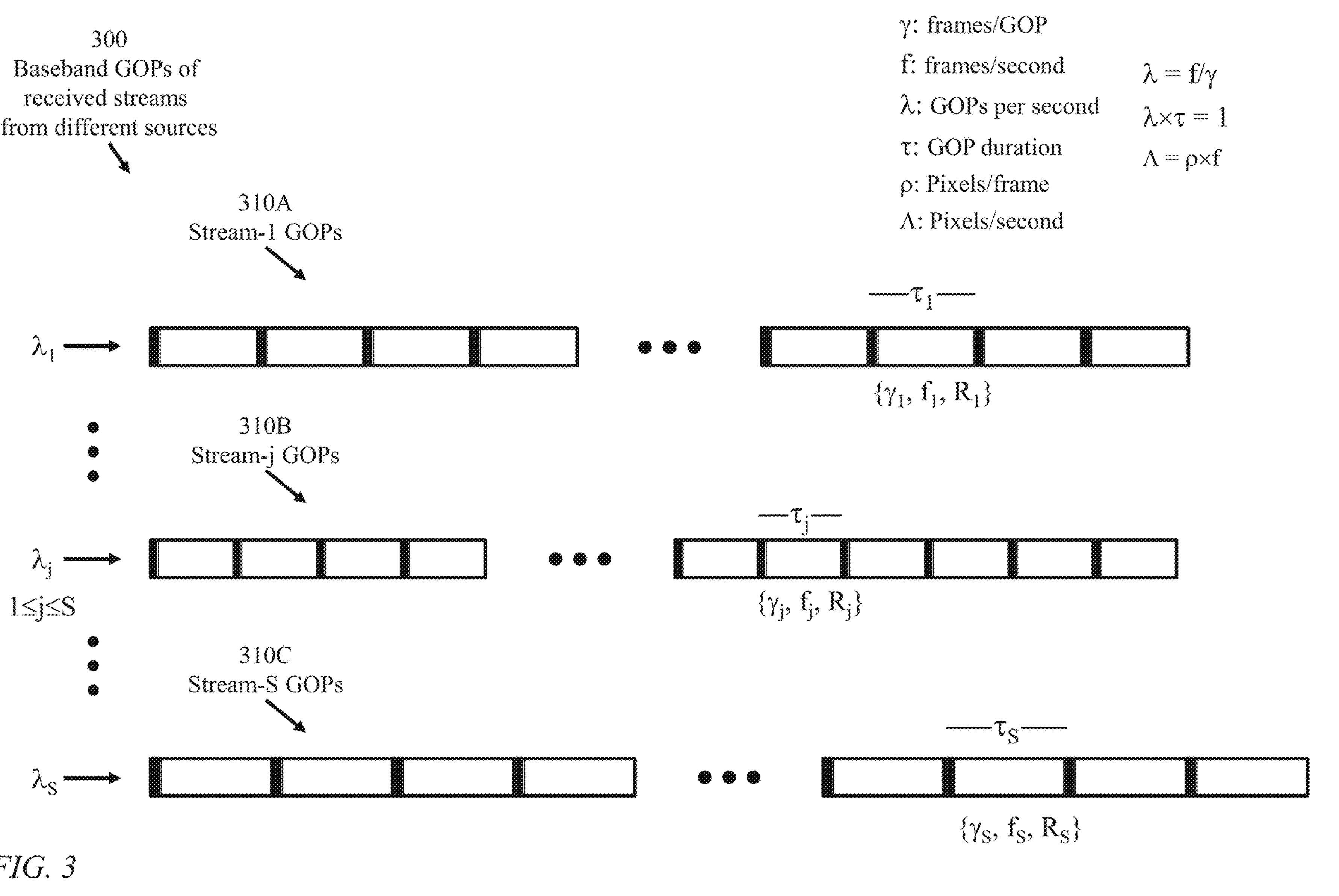
FIG. 3 illustrates detected baseband GOPs received at a transcoding station from multiple sources.
Figure 4:
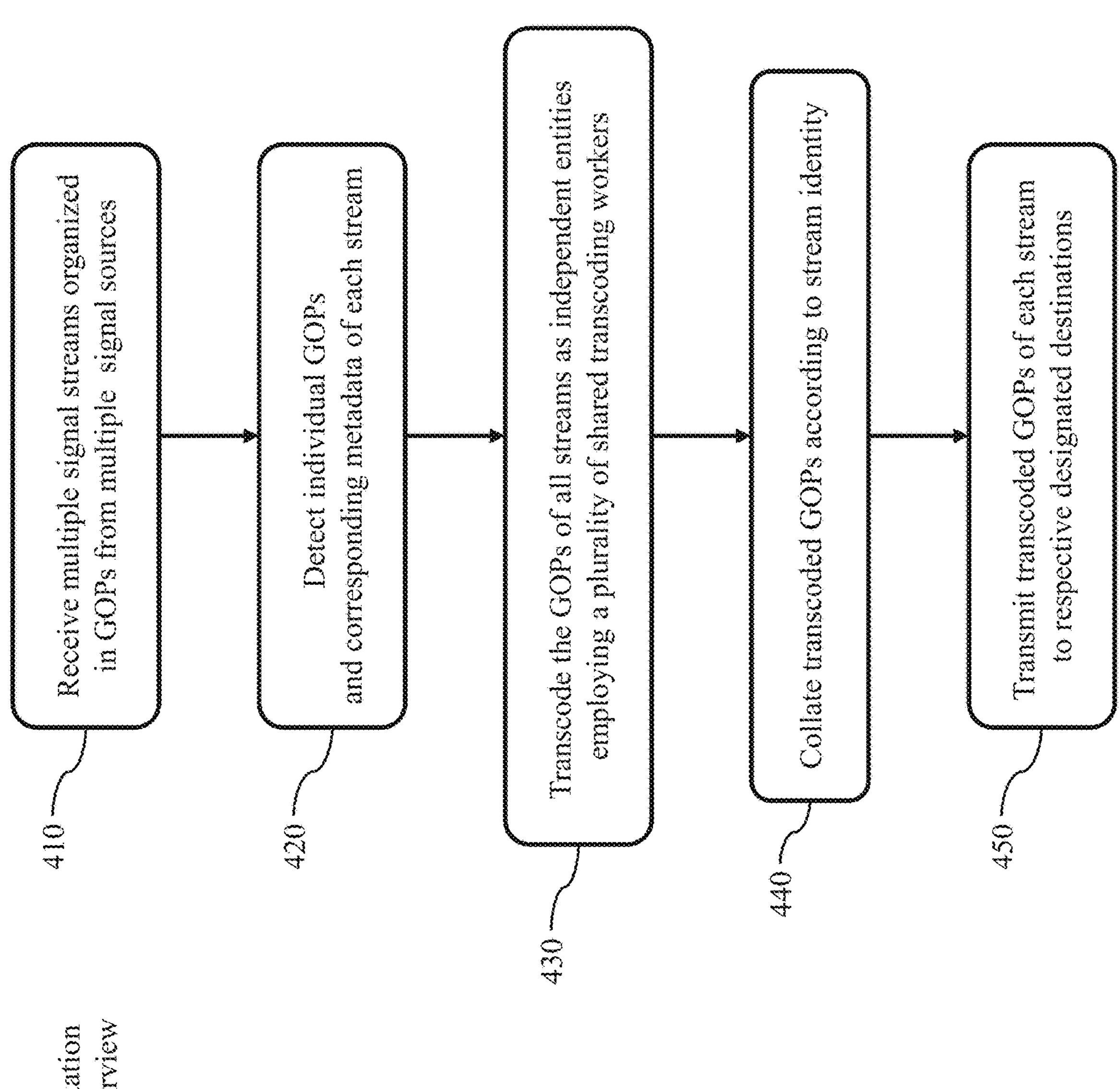
FIG. 4 is a flow chart depicting basic functions of a disclosed transcoding station, in accordance with an embodiment of the present invention.

FIG. 3 illustrates baseband GOPs 300 detected from received S streams, S>1, at a transcoding station from multiple sources. GOPs of a specific received stream, such as 310A, 320B, and 320C, belong to individual streams of different flow rates and formats FIG. 4 is a flow chart 400 depicting basic functions of a transcoding station 160. Process 410 receives multiple signal streams from multiple signal sources, each stream being organized into GOPs. Process 420 detects individual GOPs and corresponding metadata. Processes 430 transcode all GOPs of all streams as independent entities employing a plurality of workers operating concurrently. Process 440 collates transcoded GOPs according to stream identity and sequential order within each stream. Process 450 transmits transcoded GOPs of each stream to respective designated destinations.

Figure 5:
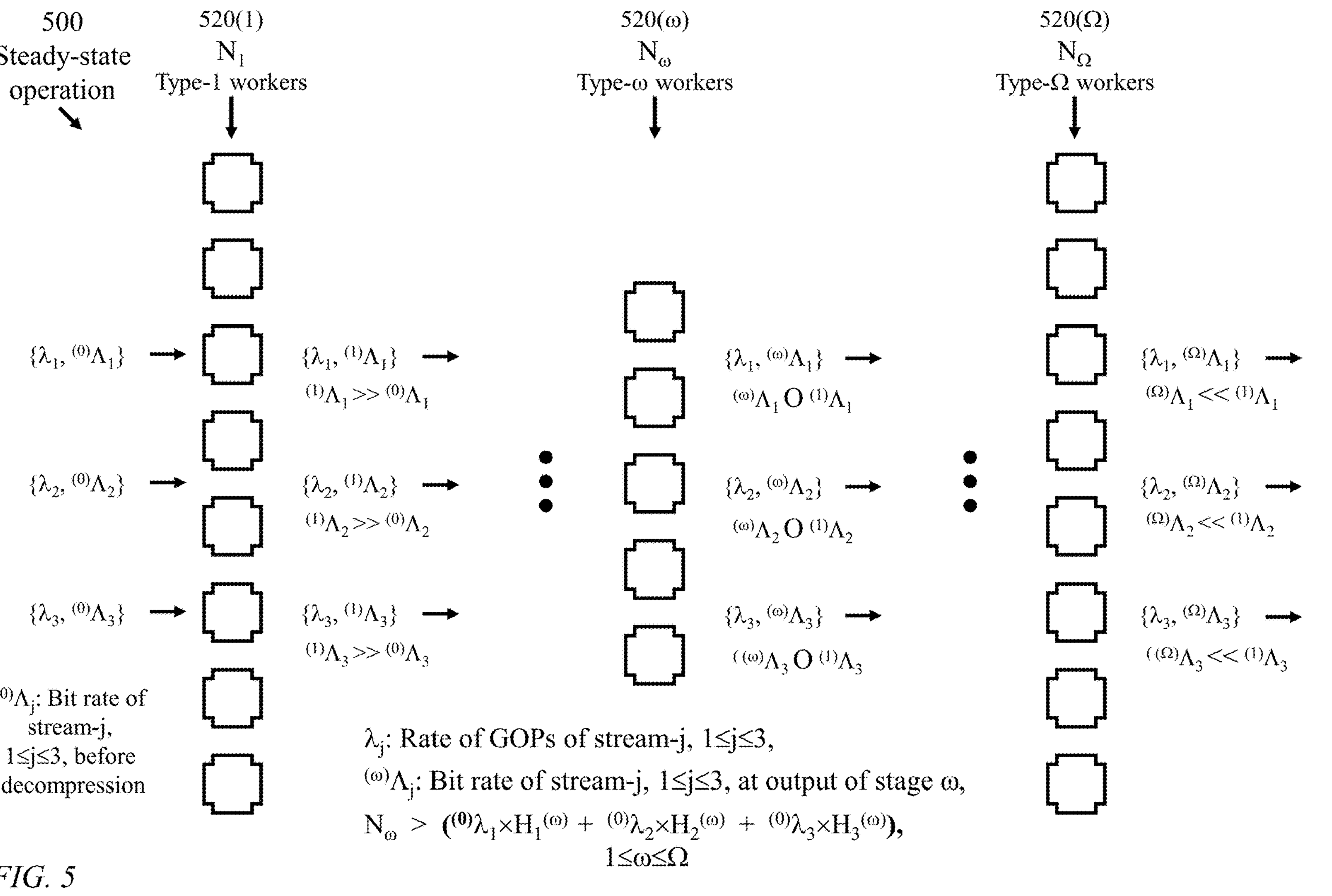
FIG. 5 illustrates requirements for a steady-state operation of a transcoding station, in accordance with an embodiment of the present invention.
Figure 34:
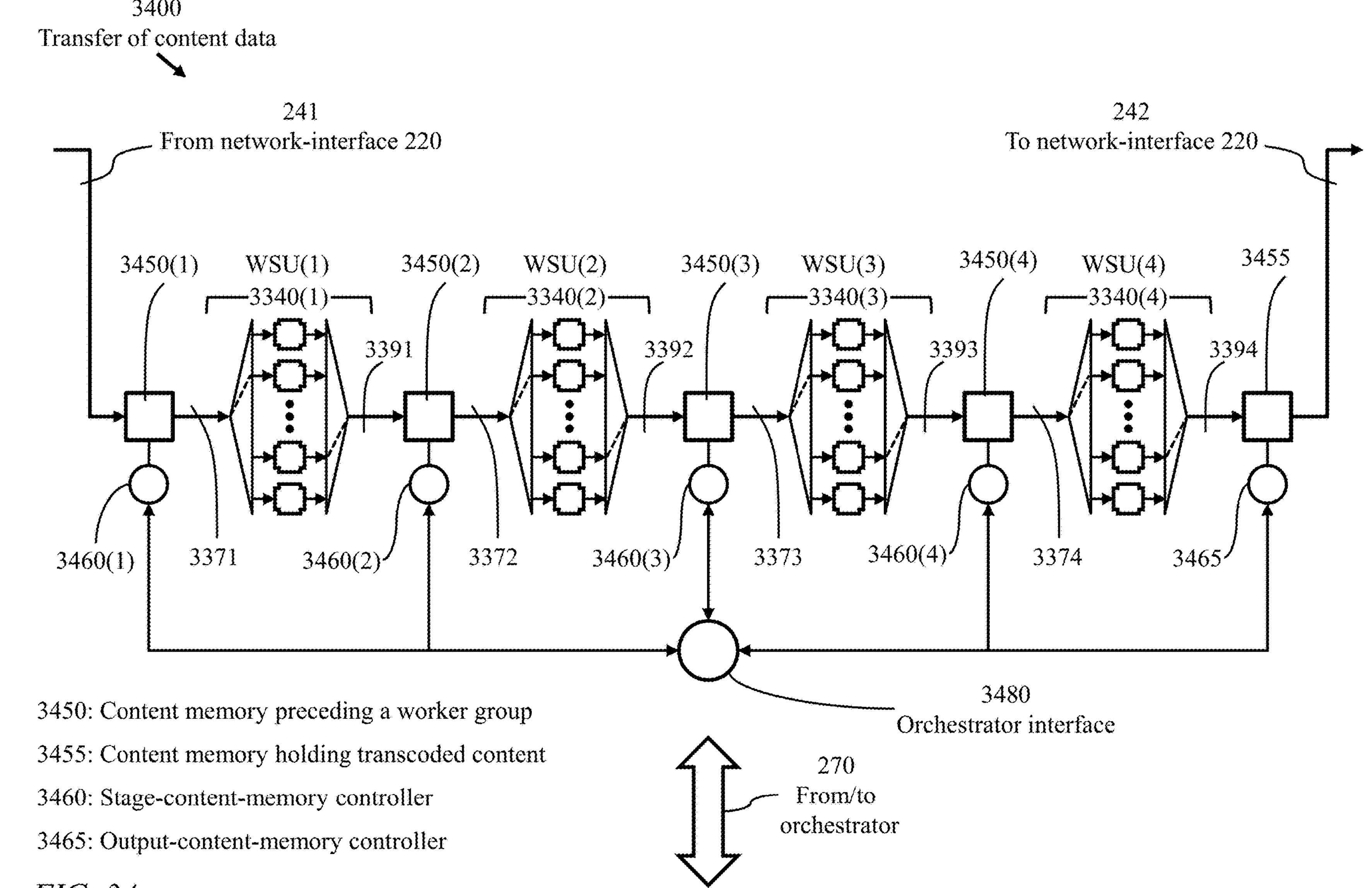
FIG. 34 is a continuation of FIG. 33.

FIG. 5 illustrates processing-capacity requirements 500 for a steady-state operation of a transcoding station 160 receiving S streams (with S=3). The pool of workers 260 comprises groups of workers 520 of different types corresponding to basic transcoding functions. In order to ensure steady operation of a transcoding station 160, the collective processing capacity of each group of workers needs to be sufficient to continuously handle the flow of tasks. FIG. 5 illustrates a case of a transcoding station receiving three multimedia streams (S=3), of GOP rates of $\lambda_1$, $\lambda_2$, and $\lambda_3$, from multimedia sources 140. The pool of workers is divided into a number $\Omega$, $\Omega>1$, of worker groups having one-to-one correspondence to $\Omega$ processing stages. Each GOP is processed to completion using one worker in each stage, although it may be desirable to skip a stage as illustrated in FIG. 34. For the case where workers of a same type have a same processing capacity, with the processing time per GOP of stream-$\sigma$, $1\le\sigma\le S$, in stage $\omega$, $1\le\omega\le\Omega$, being estimated to be $H_\sigma^{(\omega)}$, then the total workload $\Theta_\omega$ of stage $\omega$ is:

$$\Theta_\omega=(\lambda_1\times H_1^{(\omega)}+\lambda_2\times H_2^{(\omega)}+\lambda_3\times H_3^{(\omega)}),$$

the workload $\Theta_\omega$ being the mean number of concurrently occupied type-$\omega$ workers. Due to fluctuations of processing times of successive GOPs (even GOPs of a same stream), the integer number $N_\omega$ of workers of type $\omega$ is selected to exceed $\Theta_\omega$.

The values of the tuple $\{H_1^{(\omega)}, H_2^{(\omega)}, H_3^{(\omega)}\}$ may vary significantly among the $\Omega$ transcoding stages.

For example, if the first stage ($\omega=1$) is a decompression stage, the processing time interval for a GOP may significantly exceed the duration of receiving the GOP. Thus, several successive GOPs of a same stream may be processed concurrently (during overlapping periods of time) in multiple type-1 workers. With appropriately provisioned workers, the flow rate of each decompressed stream $\lambda^*_1$, $\lambda^*_2$, . . . , and $\lambda^*s$ would exactly equal the respective arrival flow rates $\lambda_1$, $\lambda_2$, . . . , and $\lambda_s$.

If the first stage ($\omega=1$) is a conventional signal-processing stage, the processing time interval for a GOP may be comparable to the duration of receiving the GOP.

Figure 6:
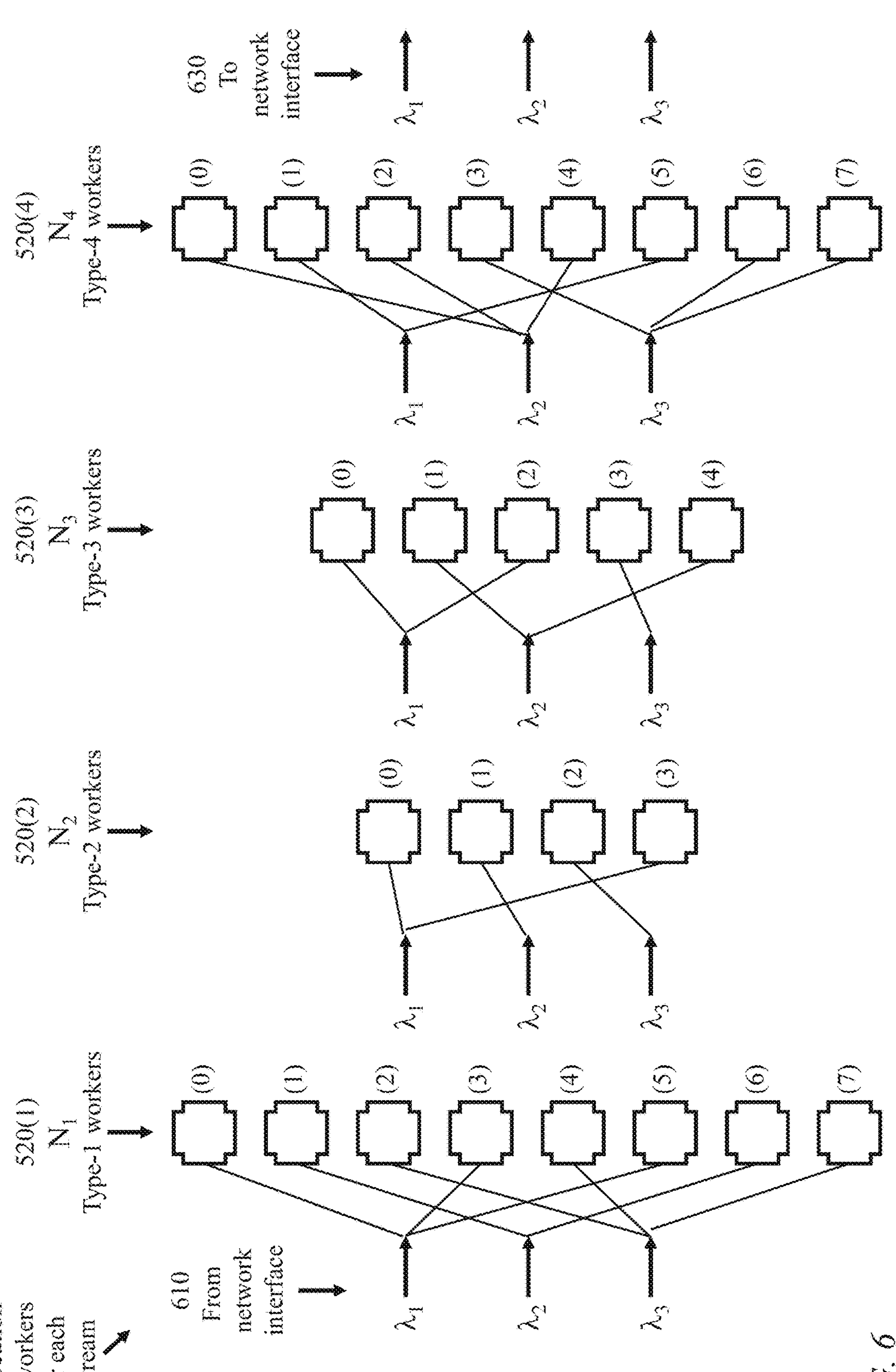
FIG. 6 illustrates allocation of multiple workers to each stream.

FIG. 6 illustrates allocation 600 of multiple workers to each stream for a case where the mean processing time $H_\sigma^{(1)}>H_\sigma^{(2)}$, $H_\sigma^{(2)}<H_\sigma^{(3)}<H_\sigma^{(4)}$. As illustrated, three successive GOP of stream 1 are processed concurrently, during overlapping periods of time, at workers of indices (1,1), (1,4), (1,6). Two successive GOP of stream 2 are processed concurrently at workers of indices (1,2) and (1,7). Three successive GOP of stream 1 are processed concurrently, during overlapping periods of time, at workers of indices (1,3), (1,5), (1,8). Likewise, multiple successive GOP of a stream may be processed concurrently at multiple workers.

Figure 7:
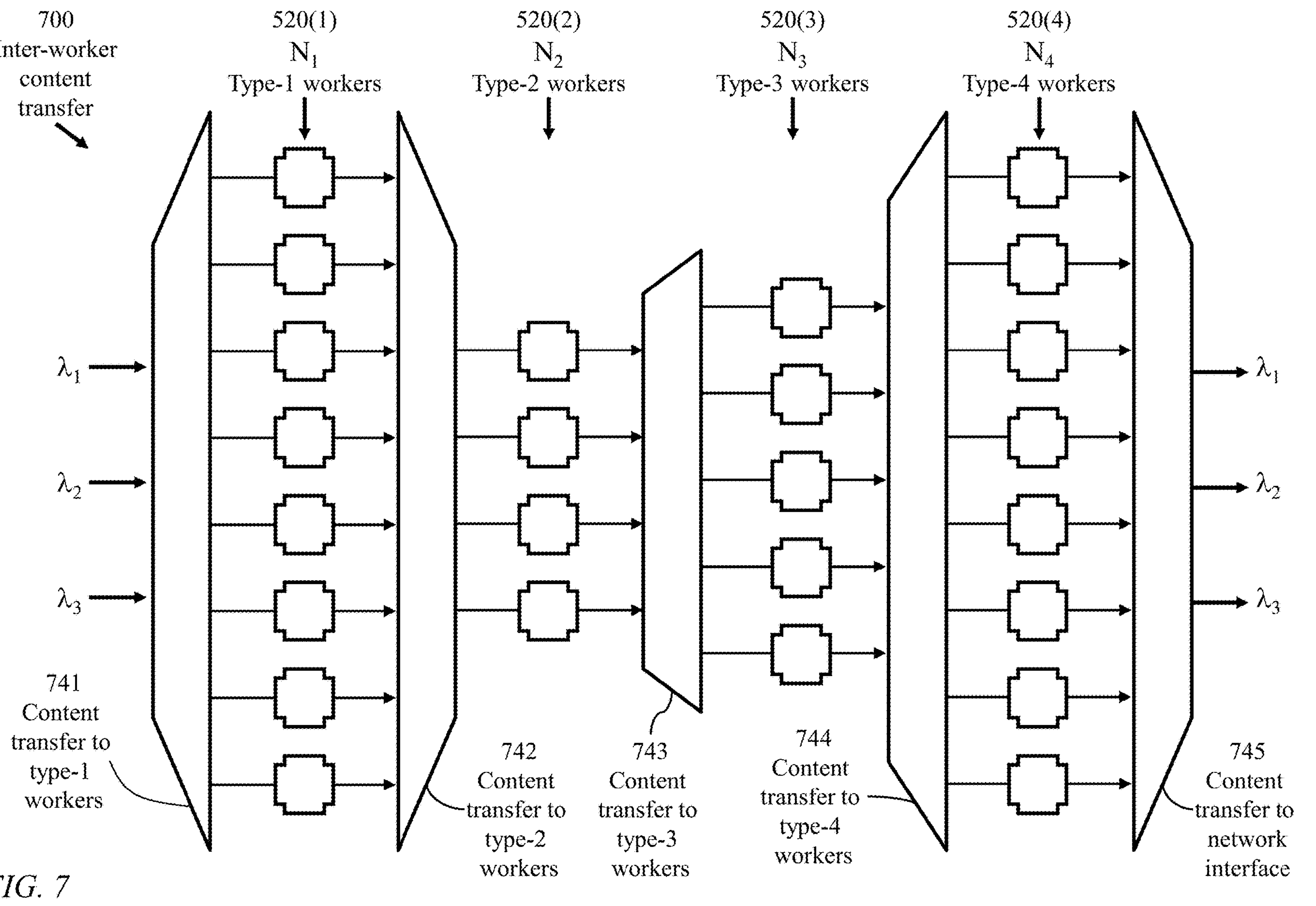
FIG. 7 illustrates a structure for inter-worker content transfer, in accordance with an embodiment of the present invention.

FIG. 7 illustrates a general structure 700 for content transfer between the network interface 220 and successive groups 520(1) to 520(4) of the overall pool 260 of workers. A content-transfer mechanism comprises:

- means 741 for content transfer from the network interface 220 to a first group 520(1) of type-1 workers;
- means 742 for content transfer from the first group 520(1) of type-1 workers to a second group 520(2) of type-2 workers;
- means 743 for content transfer from the second group 520(2) of type-2 workers to a third group 520(3) of type-3 workers;
- means 744 for content transfer from the third group 520(3) of type-3 workers to a fourth group 520(4) of type-4 workers; and means 745 for content transfer from the fourth group 520(4) of type-4 workers to the network interface.

Means 741 to 745 may be implemented in a variety of ways including: (1) shared memory devices each storing outputs of a previous processing stage or (2) efficient space switches each comprising a relatively small number of selectors.

Figure 8:
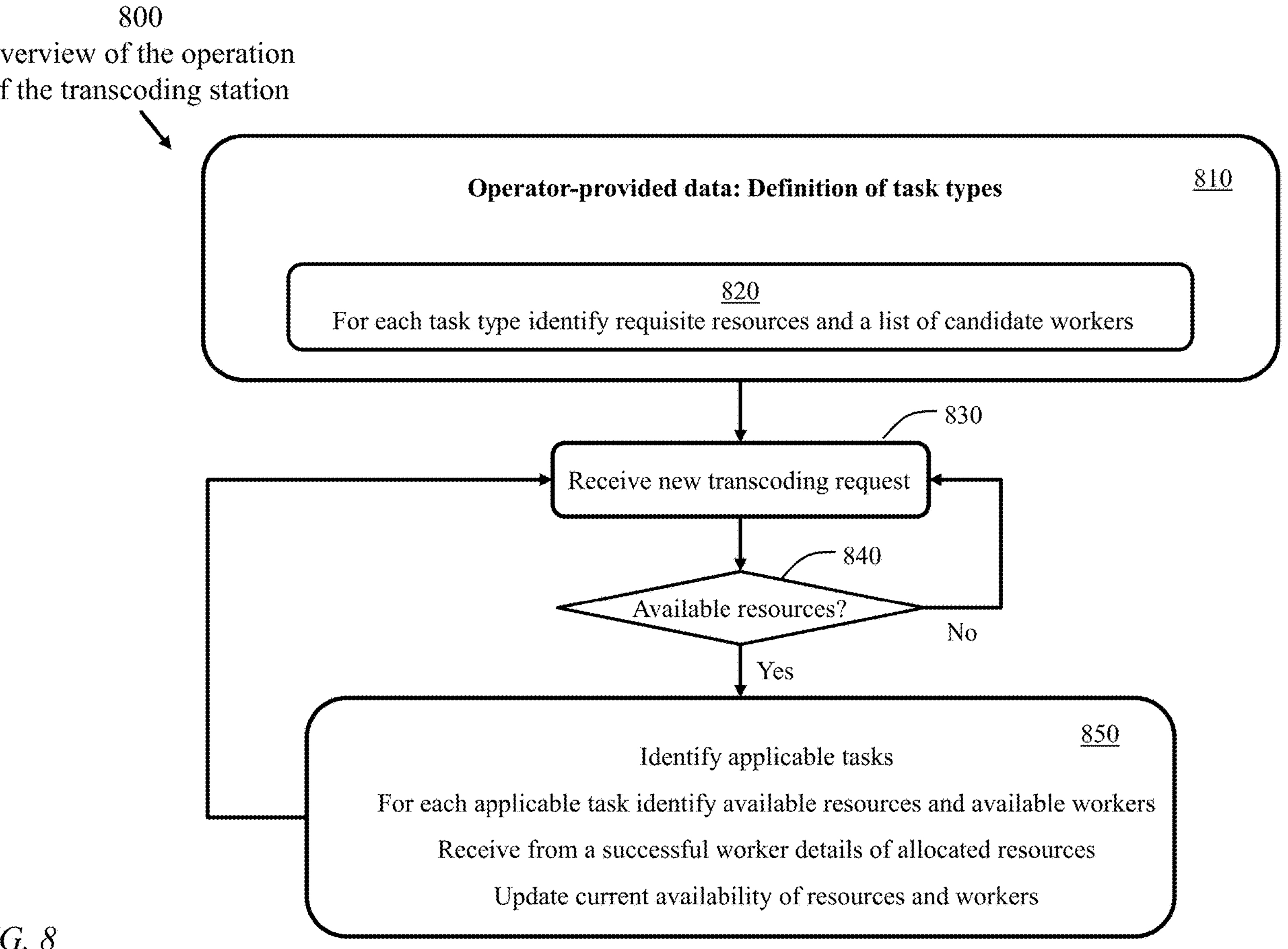
FIG. 8 is a broad overview of basic functions of the disclosed transcoding station, in accordance with an embodiment of the present invention.

FIG. 8 is a broad overview 800 of basic functions of the disclosed transcoding station, where the GOPs of all received streams are treated as independent entities. Process 810 acquires operator-defined data including definitions of all task types. Process 820, embedded within process 810, identifies for each task types resources and a list of candidate workers (FIGS. 17 to 20). Process 830 receives a transcoding request from a multimedia source. Process 840 determines availability of requisite resources. Processes 850 identify applicable tasks for the request, determine available workers and resources, and updates availability of resources and workers.

Figure 9:
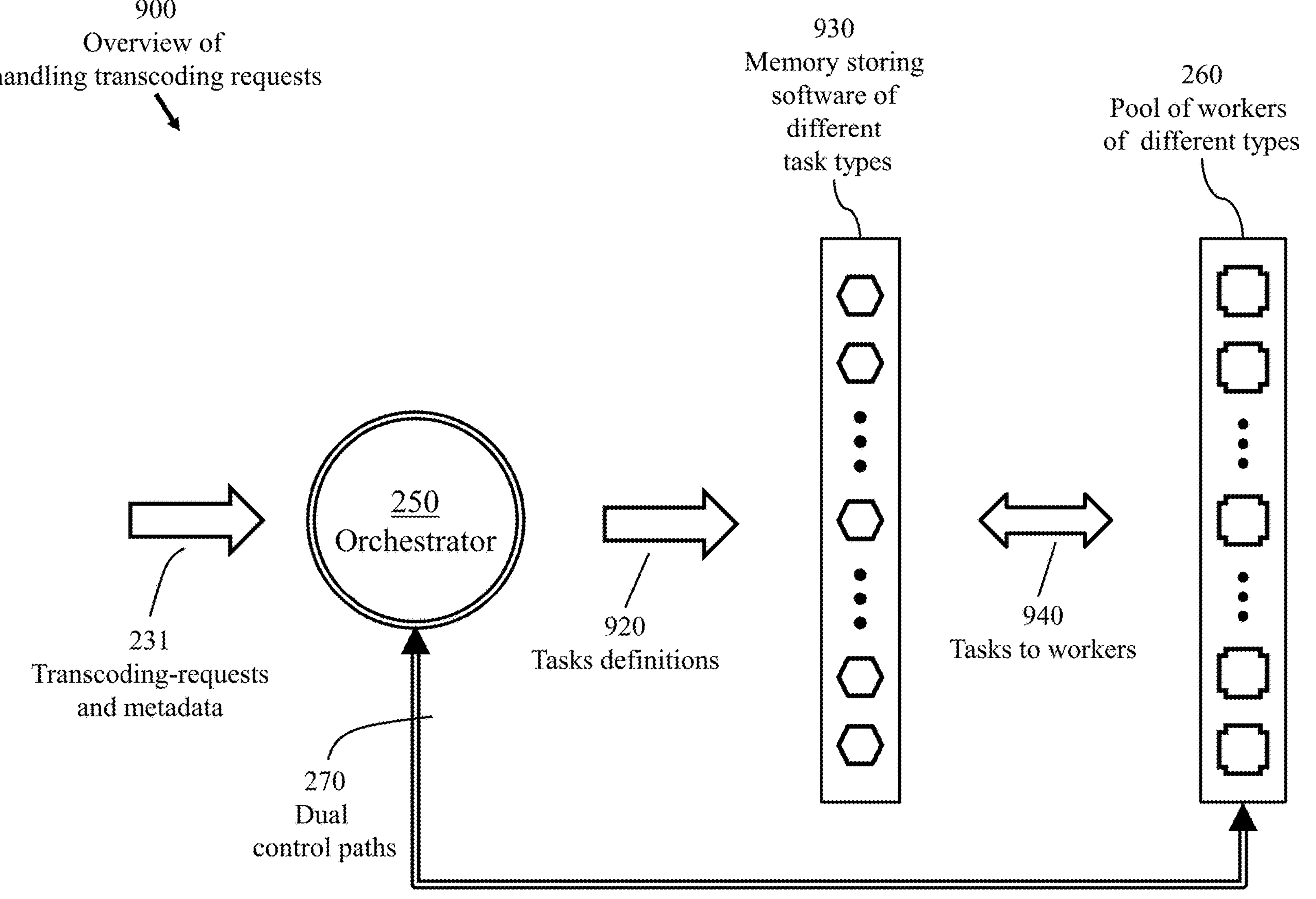
FIG. 9 is an overview of handling transcoding requests.

FIG. 9 is an overview 900 of handling transcoding requests. Orchestrator 250 receives transcoding requests and respective metadata 231, identifies requisite tasks of different types, and stores definitions of the requisite tasks 930 in a memory device to be presented to the pool 260 of workers through paths 940. The orchestrator communicates with individual workers, directly or indirectly through dual control paths 270.

Figure 10:
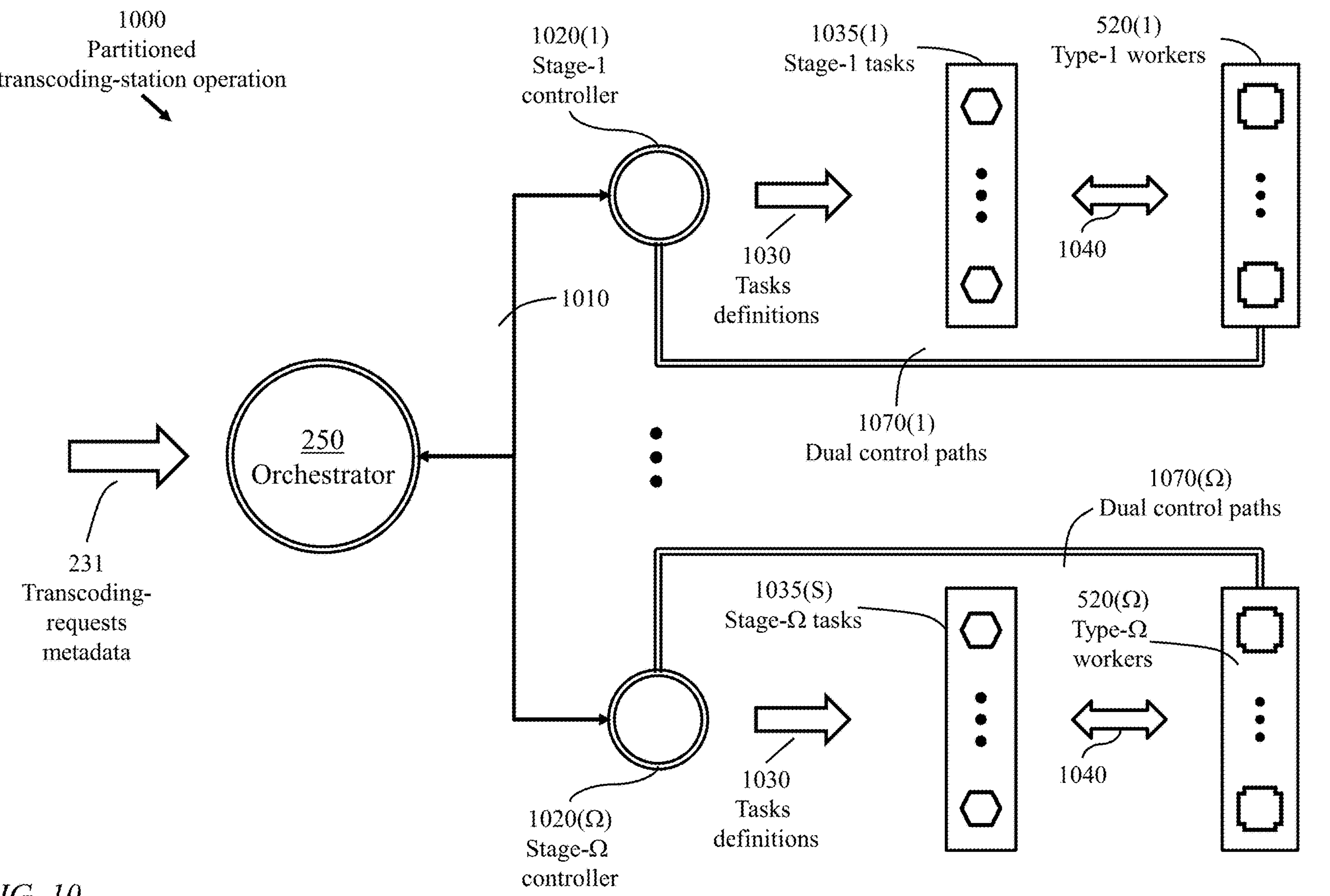
FIG. 10 illustrates details of handling transcoding requests based on partitioning tasks and corresponding workers, in accordance with an embodiment of the present invention.

FIG. 10 illustrates details 1000 of handling transcoding requests based on partitioning tasks according to task types and corresponding workers. The workers are arranged into Ω groups of workers, corresponding to Ω transcoding stages, Ω>1. The orchestrator may communicate directly with the worker groups. However, for a large-scale transcoding station 160, each of Ω stage controllers 1020 directly coupled to the orchestrator controls a respective worker group. Each of controller 1020(1) to 1020(Ω) communicates with the orchestrator through a dual control channel 1010 and communicates with a respective worker group through a dual control channel 1070. A controller 1020 identifies requisite tasks for each worker group and stores definitions of the requisite tasks in a respective memory device 1035 to be presented to respective worker groups. Task definitions from a stage controller 1020 to a respective memory device 1035 are transferred through a respective path 1030. Each stage controller 1020 communicates with individual workers of a respective group of workers, directly or indirectly, through a respective dual control paths 1070.

Figure 11:
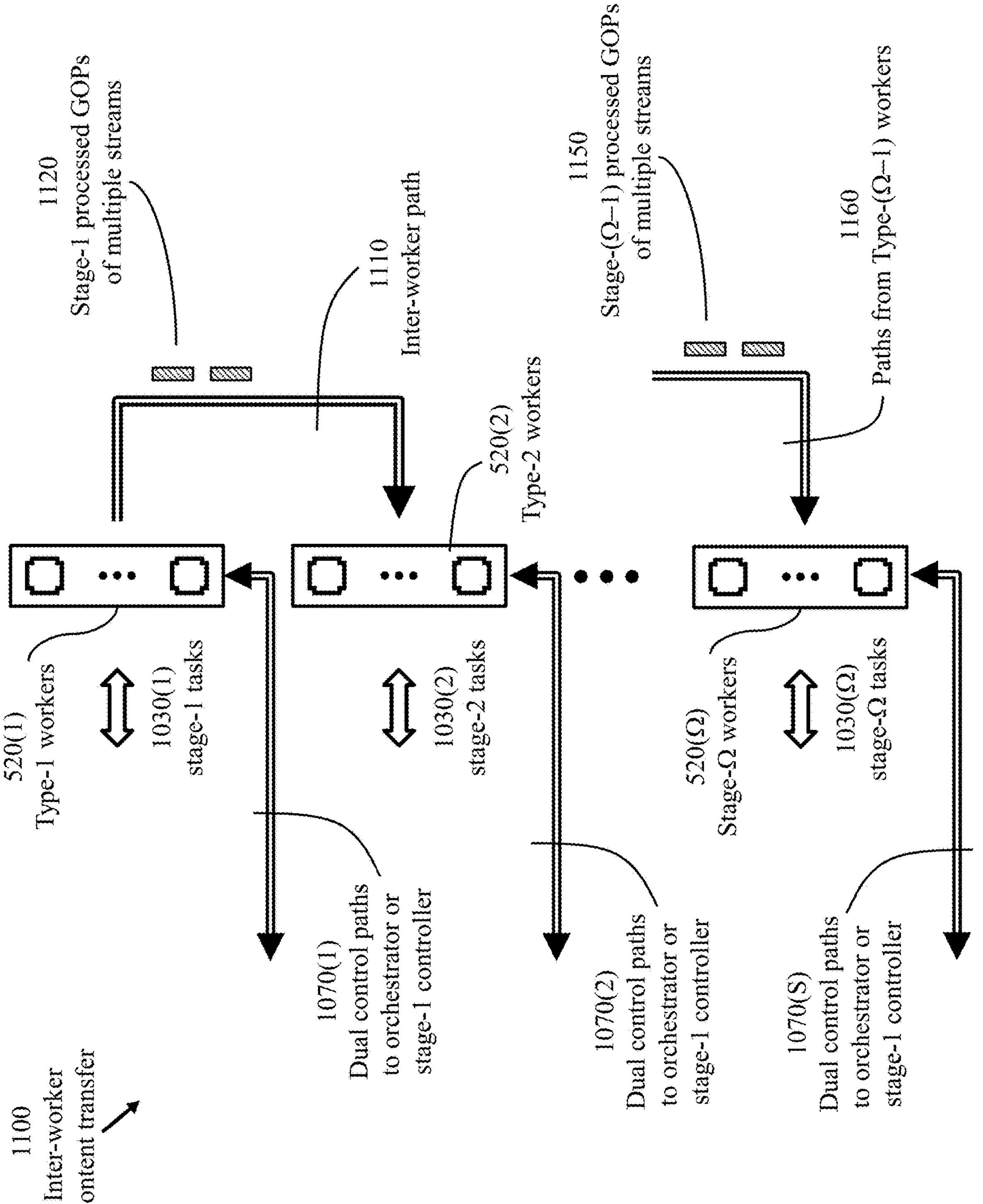
FIG. 11 is a schematic of inter-worker content transfer, in accordance with an embodiment of the present invention.

FIG. 11 is a schematic 1100 of inter-worker content transfer. Each worker group 1050 has a dual control path 1070 to a respective stage controller. Processed content 1120 of a type-1 worker (i.e., at the first stage) is transferred to a type-2 worker (of the second stage) through inter-worker path 1100 (to be detailed in FIGS. 33, 34, and 35). Processed content of each stage is likewise transferred to a subsequent stage; processed content 1150 of a type-(Ω−1) worker is Transferred to a type-Ω worker through an inter-worker path 1160.

Figure 12:
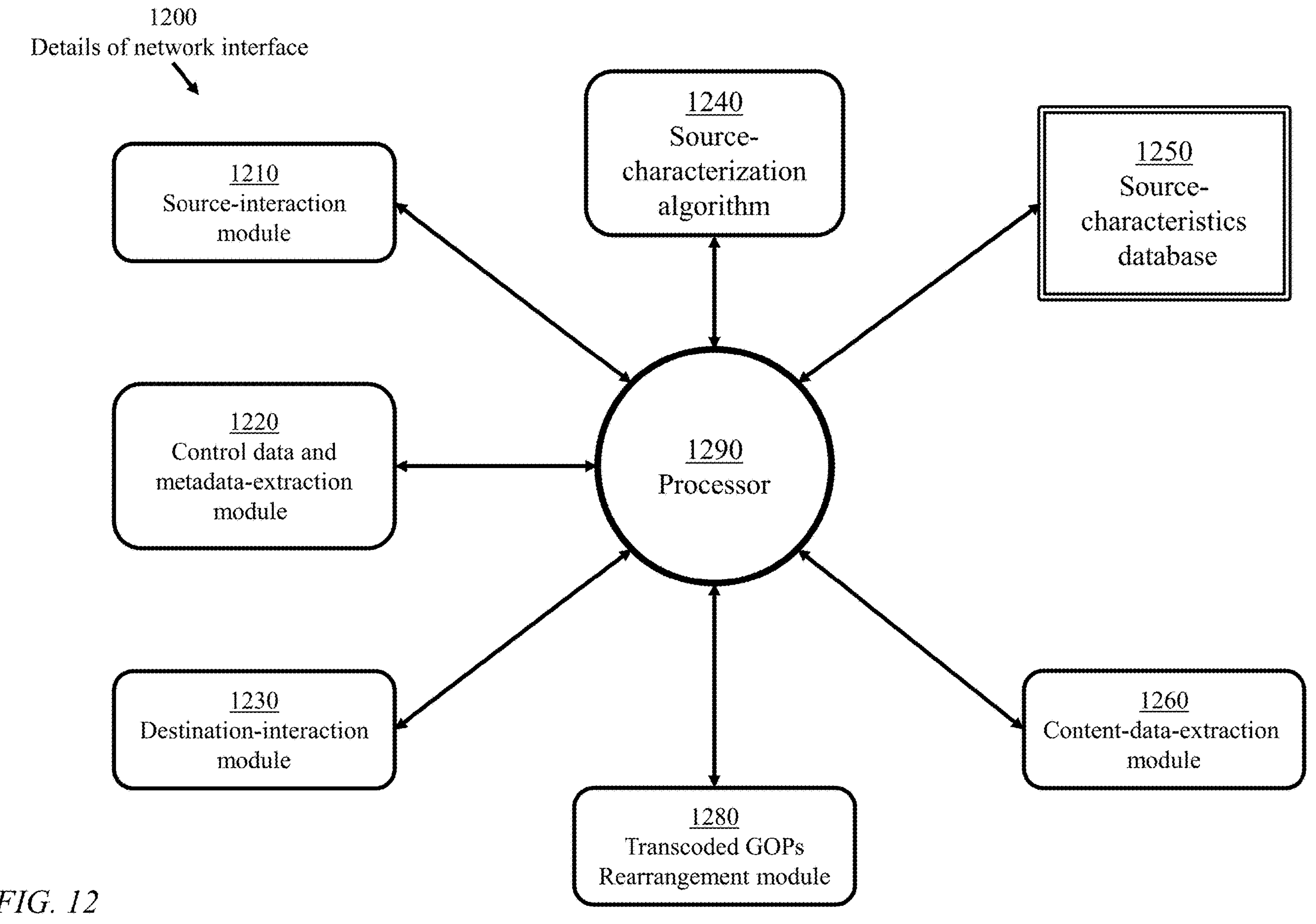
FIG. 12 illustrates details of a network interface, in accordance with an embodiment of the present invention.

FIG. 12 illustrates components 1200 of a network interface 220. A source interaction module 1210 receives transcoding requests from different multimedia sources 140, communicates respective admission, or otherwise, to respective sources, and receives content data and corresponding control data and metadata from admitted sources. A Metadata extraction module 1220 separates metadata (and corresponding control data) from a received stream to be directed to orchestrator 250 (FIG. 2). A destination interaction module 1230 communicates notifications and respective transcoded content to all destinations of each transcoded stream. A source-characterization algorithm 1240 determines characteristics of each engaged multimedia source 140, with the help of a source-characteristics database 1250. A content-data-extraction module 1260 separates content (the payload, the data to be transcoded) of each stream to be directed to the pool 260 of workers (FIG. 2). A transcoded-GOPs rearrangement module 1280 collates GOPs according to streams and orders GOPs of each stream. A network-interface processor (or a pool of processors) 1290 executes software instructions of modules 1210 to 1260.

Figure 13:
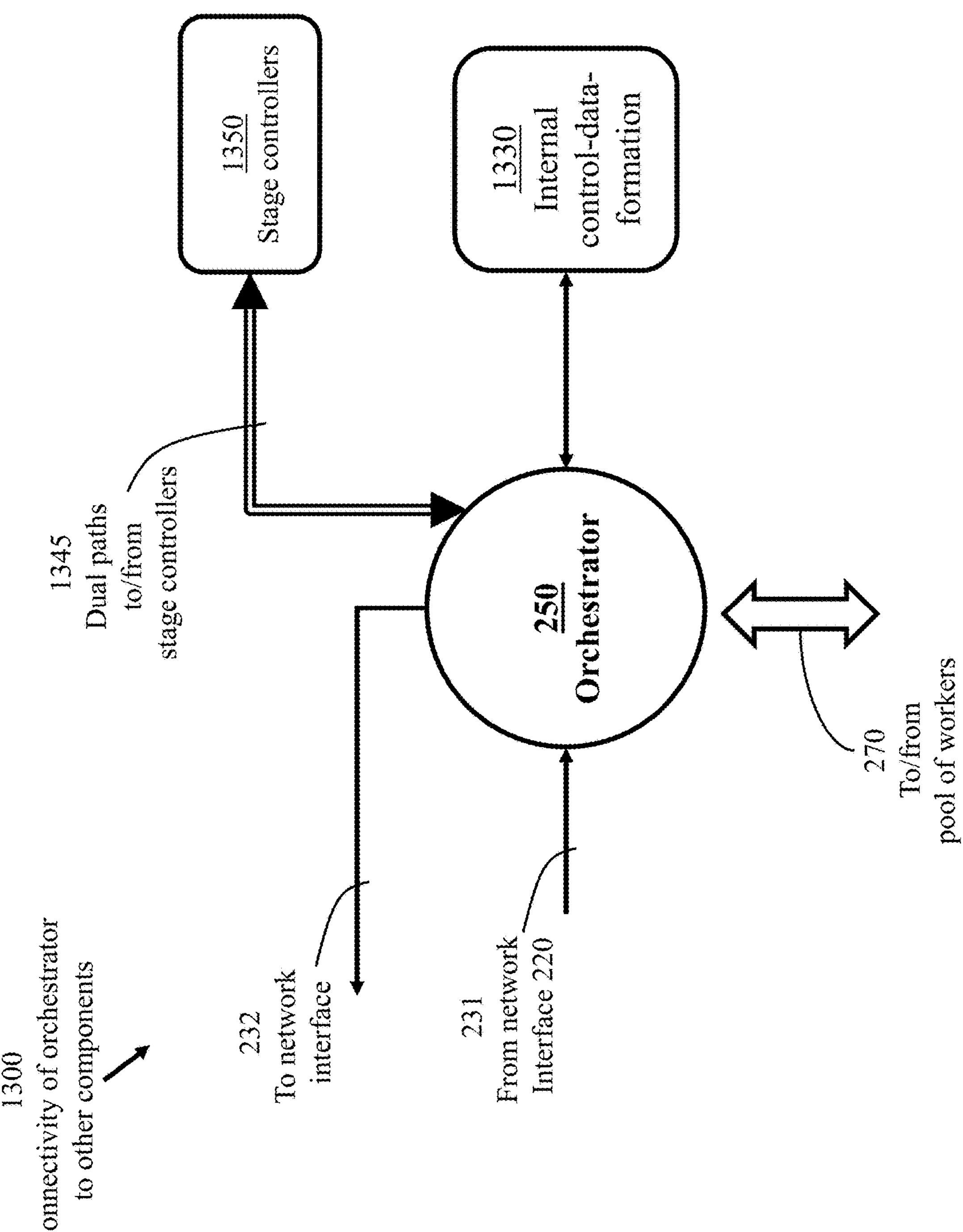
FIG. 13 illustrates direct connectivity of an orchestrator to other components of the disclosed transcoding station, in accordance with an embodiment of the present invention.

FIG. 13 illustrates direct connectivity 1300 of an orchestrator to other components of the disclosed transcoding station. The orchestrator connects to the network interface 220 through channels 231 and 232, and connects to the pool 260 of workers through dual channels 270 as illustrated in FIG. 2 (though further detailed in FIG. 10). Module 1330, coupled to orchestrator 250, is configured to form internal control data according to the adopted worker selection method (FIGS. 24 to 28). A set 1350 of Ω stage controllers 1020 is coupled to orchestrator 250 through dual paths 1345 (individual dual paths 1010, FIG. 10).

FIG. 14 illustrates components 1400 of an exemplary worker. A worker-orchestrator interface module 1420 communicates with orchestrator 250 (or with a respective stage controller 1020) through a dual control path 1425. An inter-worker interface module 1430 enable communication of control signals to other workers through a dual control path 1432. A worker-resources interface module 1440 enables connections to respective resources. A memory device 1450 stores software modules for executing tasks allocable to the worker. Module 1460 handles external data transferred through the network interface 220. Processor 1410 executes software instructions of the modules associated with the worker.

FIG. 15 illustrates worker modes of operations 1500 where a worker may have dedicated resources or access shared resources.

As illustrated, each worker 1400 of a set 1510 of workers may have respective dedicated resources 1520, which may be heterogenous resources 1530 or connect to a shared pool 1560 of heterogenous resources through a resource-access mechanism 1580. A resource 1550 of the pool 1560 may be allocated to any worker on demand.

FIG. 16 illustrates organization 1600 of workers and resources to facilitate sharing among a plurality of workers. The pool 260 of workers is organized in Ω worker groups of work-types 520(1) to 520 (Ω). The pool 280 of resources are arranged into Ω source groups 1620(1) to 1620(Ω), having a one-to-one correspondence to the 2 worker groups. Additionally, some resources may be of use to all work types and are hence grouped into a common source group 1620(0) as indicated in arrangement 1640. Individual workers may access respective resources through paths 1630 within a resource-access mechanism such as mechanism 1580 of FIG. 15.

Figure 17:
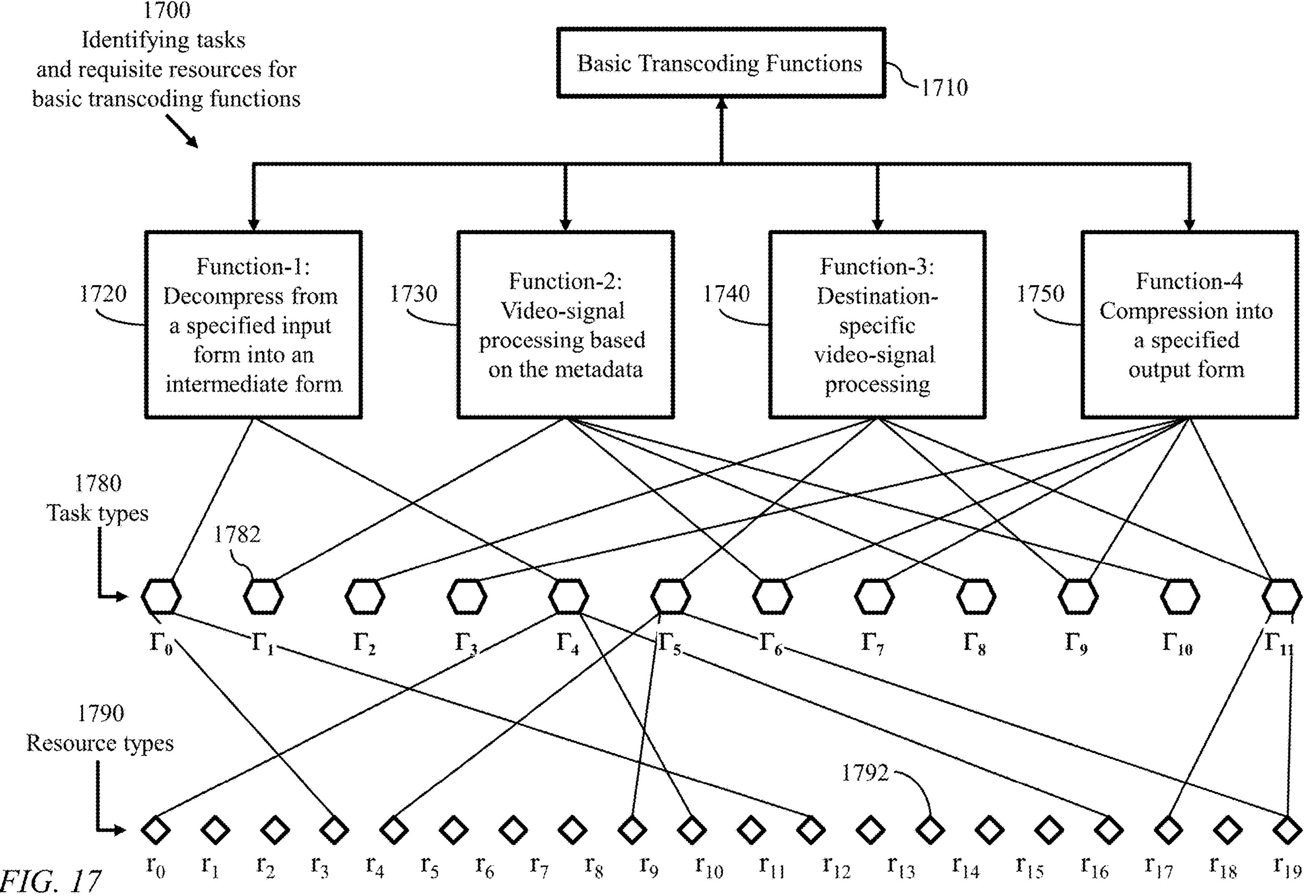
FIG. 17 illustrates a scheme for identifying tasks and requisite resources for basic transcoding functions, in accordance with an embodiment of the present invention.

FIG. 17 illustrates a scheme 1700 for identifying tasks and requisite resources for basic transcoding functions 1710. In the illustrated exemplary scheme, the transcoding functions comprise (1) decompression 1720 of received streams; (2) video-signal processing 1730 based on source-provided metadata; (3) destination-specific video-signal processing 1740; and (4) compression 1750 of processed video signals according to a specified standard.

Each transcoding function implements a respective set of tasks from the set 930 of predefined tasks produced in process 810 (FIG. 8). Twelve task types 1780, individually denoted $\Gamma_0$ to $\Gamma_{11}$, are predefined. The decomposition function 1720 implements tasks of types $\Gamma_0$ and $\Gamma_4$. Video-signal processing 1730 implements tasks of types $\Gamma_1$, $\Gamma_6$, $\Gamma_8$, and $\Gamma_{10}$. Destination-specific video-signal processing 1740 implements tasks of types $\Gamma_2$, $\Gamma_5$, $\Gamma_9$, and $\Gamma_{11}$. Compression of processed video signals (process 1750) implements tasks of types $\Gamma_3$, $\Gamma_6$, $\Gamma_7$, $F_9$, and $\Gamma_{11}$.

The pool 280 of resources comprises resources of different resource; 20 resources types 1790, individually denoted $r_0$ to $r_{19}$, are illustrated. A task may require multiple resources. For example, task $\Gamma_4$ uses resources $r_0$, $r_{10}$, and $r_{16}$.

As illustrated in FIG. 17, the content of each GOP undergoes several changes during the transcoding process. In order to facilitate tracking individual GOPs of concurrent multiple signal streams, each GOP is allocated a unique identifier which lasts until the GOP is transmitted to a respective destination (or respective multiple destinations). The GOP identifiers are preferably cyclic (hence reusable), ranging from 0 to 255, for example. The content of a GOP at a given stage of processing is held in a buffer until a respective processed content is produced. An appropriate data structure facilitates maintaining and accessing only the most recent processed content of a GOP.

Figure 18:
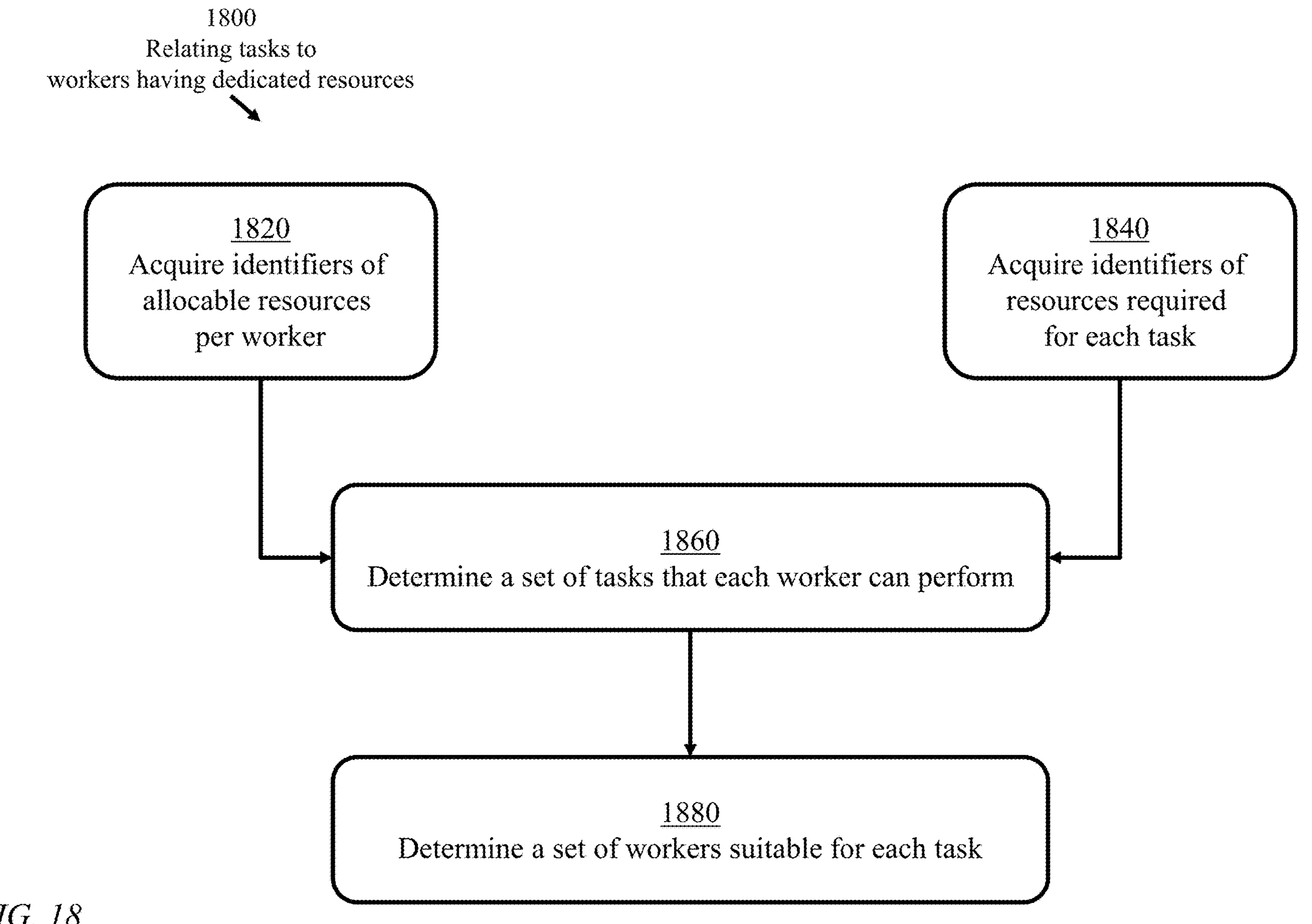
FIG. 18 illustrates basic steps of relating tasks to workers having respective dedicated resources.

FIG. 18 illustrates basic steps 1800 of relating tasks to workers having respective allocable resources. Process 1820 identifies allocable resources for each worker type. Process 1840 identifies requisite resources for each task type. Process 1860 determines worker-specific tasks, identifying a set of tasks that each worker is configured to perform. Process 1880 is an inversion of process 1840 determining a set of workers suitable for each task.

Figure 19:
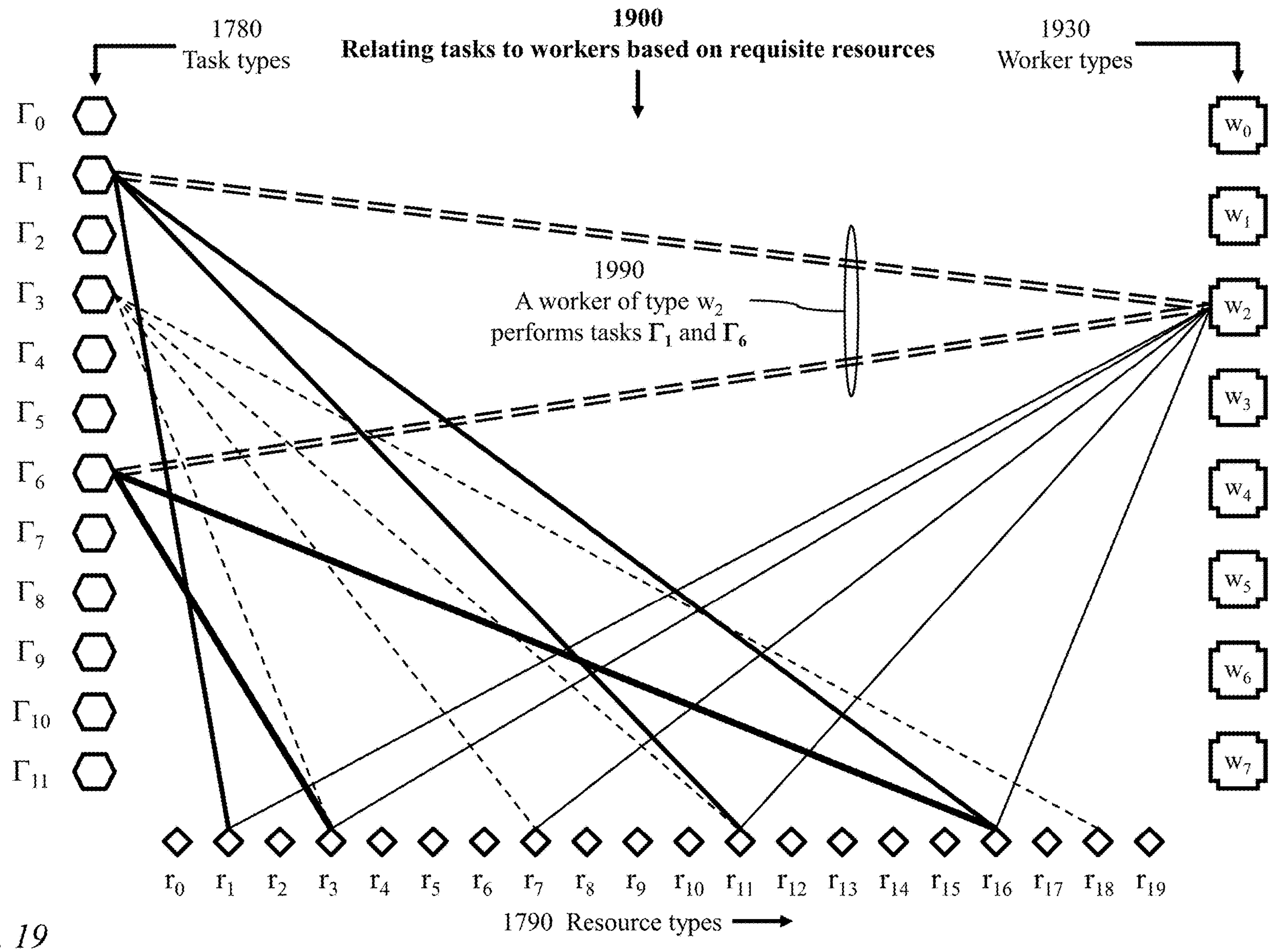
FIG. 19 illustrates an implementation the steps of FIG. 18 based on relating tasks to requisite resources and workers to allocable resources, in accordance with an embodiment of the present invention.

FIG. 19 illustrates an implementation 1900 the steps of FIG. 18, for relating tasks to requisite resources and workers to allocable resources, based on relating tasks to requisite resources and workers to allocable resources for the case of a pool 260 of workers of eight worker types 1930 denoted $w_0$ to $w_7$, implementing tasks of task types 1780 using a pool 280 of resources of resource types 1790. Task $\Gamma_1$ requires resources $r_1$, $r_{11}$, and $r_{16}$. Task $\Gamma_3$ require resources $r_3$, $r_7$, $r_{11}$, and $r_{18}$. Task $\Gamma_6$ requires resources $r_3$ and $r_{16}$. A worker of type $w_2$, for example, is configured to handle resources $r_1$, $r_3$, $r_7$, $r_{11}$, and $r_{16}$, but not resource $r_{18}$. Hence, as indicated (reference 1990), a worker of type $w_2$ may perform tasks $\Gamma_1$ and $\Gamma_6$ but not task $\Gamma_3$.

Figure 20:
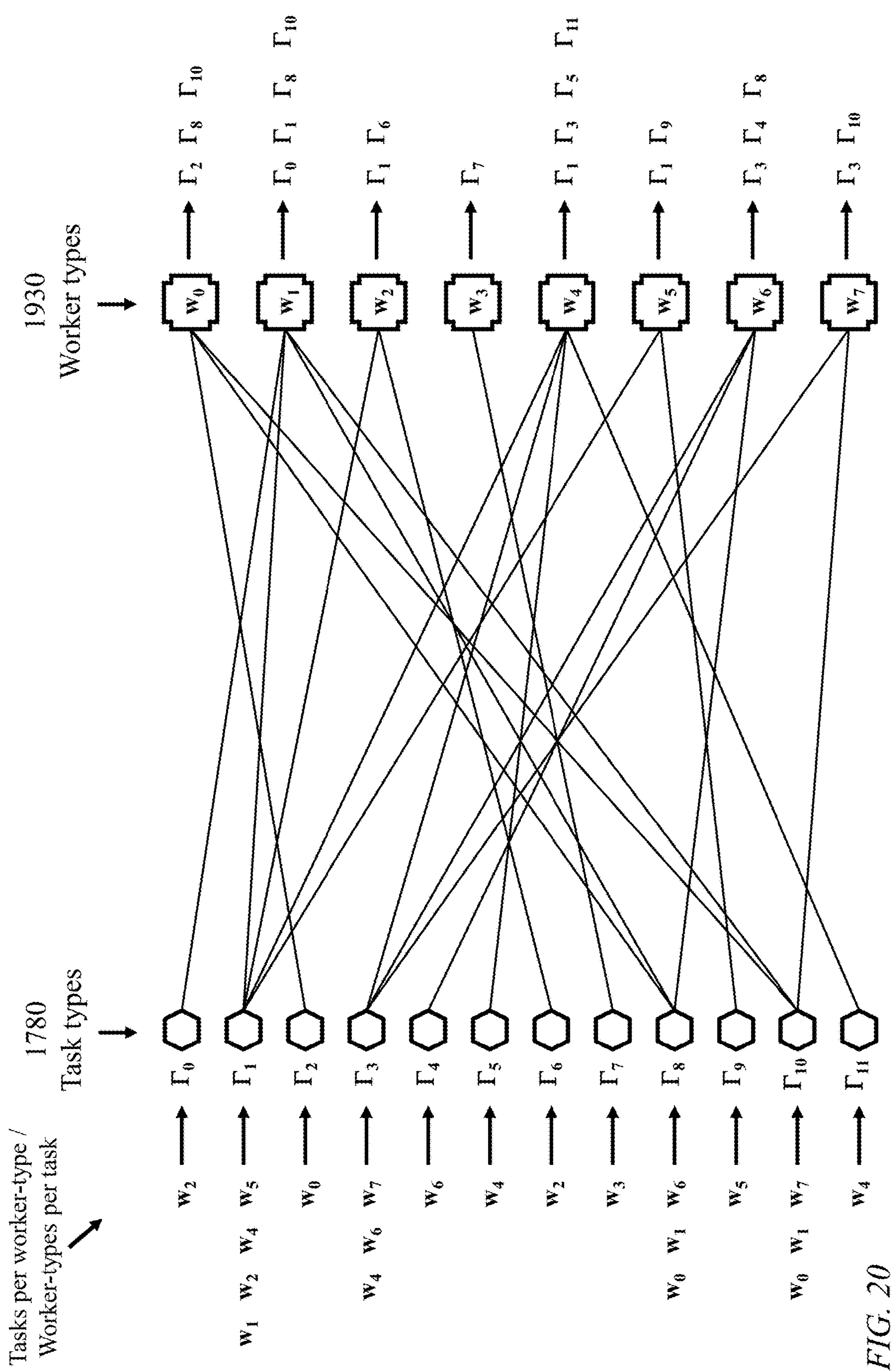
FIG. 20 illustrates an exemplary result of the implementation of FIG. 19.

FIG. 20 illustrates an exemplary result 2000 of the implementation of FIG. 19, relating task types to worker types, and vice versa.

Figure 21:
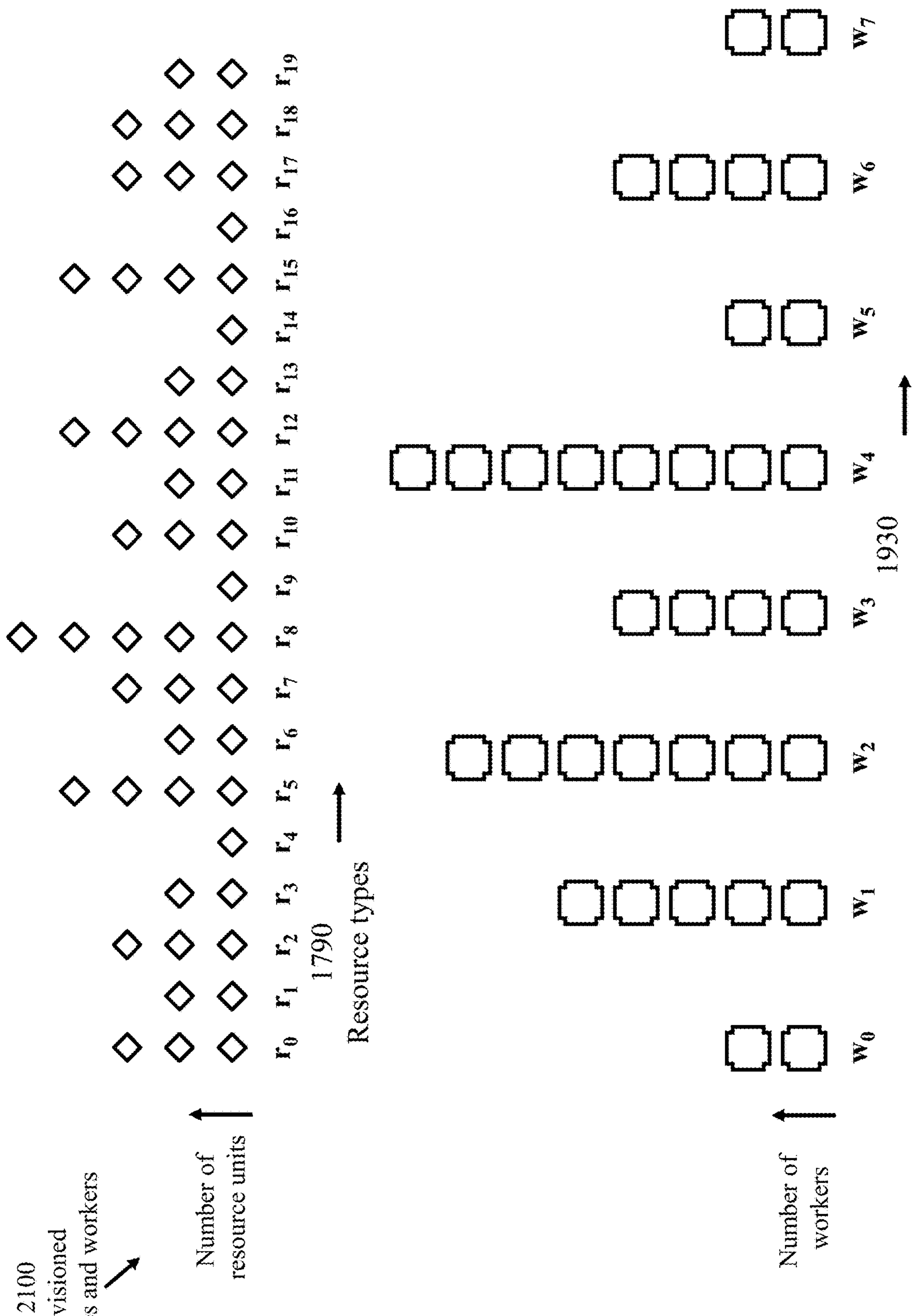
FIG. 21 illustrates exemplary allocable resources for different worker types.

FIG. 21 illustrates an example 2100 of provisioned workers and resources. A pool 260 of workers, of the eight worker types $w_0$ to $w_7$ of FIG. 19, shares a pool 280 of resources of the 20 resource types $r_0$ to $r_{19}$ allocable to the pool of workers. As illustrated in FIG. 19 each worker may activate a subset of dedicated or accessible resources specific to the worker's type. The number of workers per worker type, and the number of resources per resource type depend on the rate of executing the tasks of different task types 1780, and the duration of executing each task as illustrated in FIG. 5.

Figure 22:
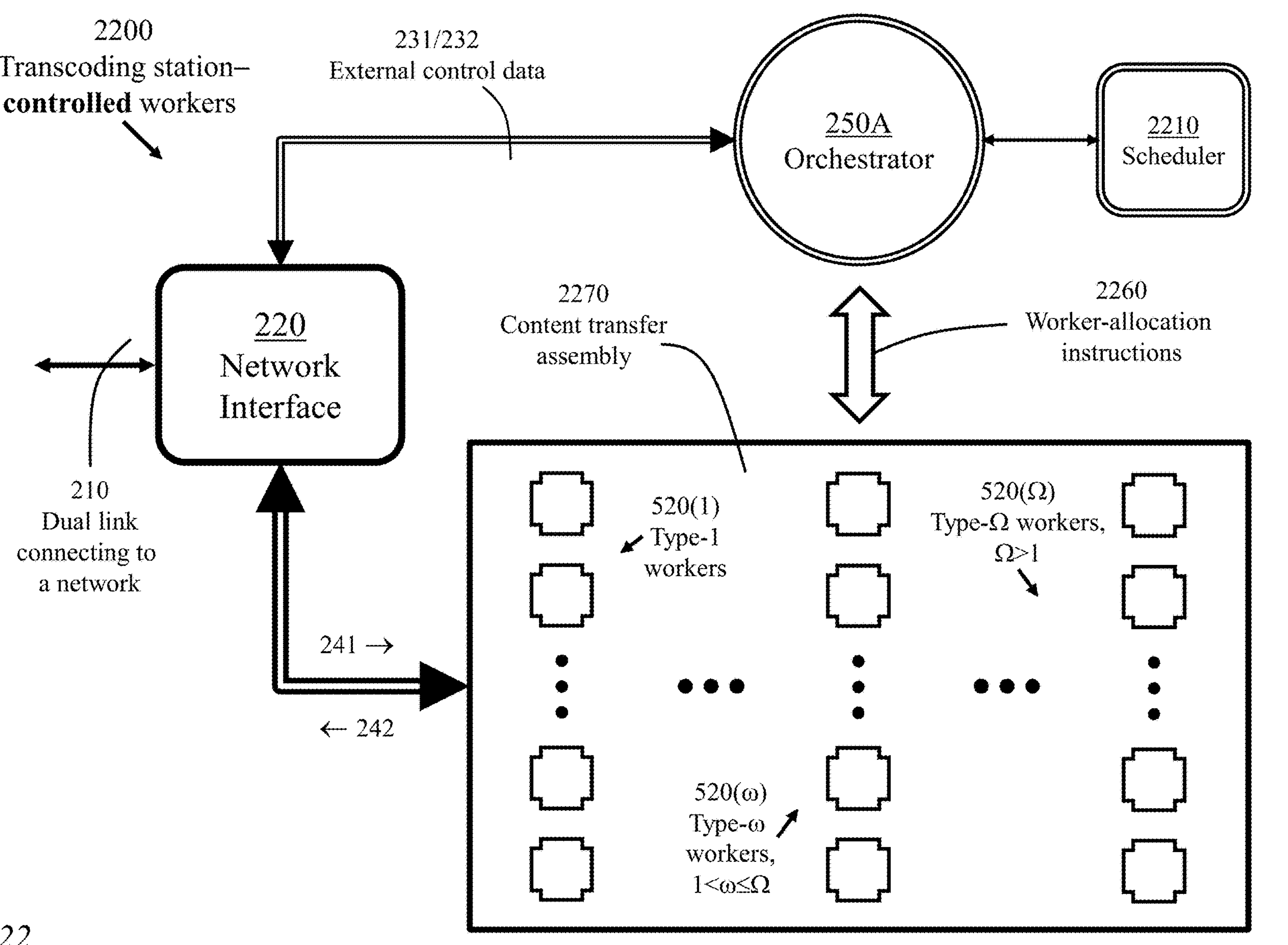
FIG. 22 illustrates a first scheme where the orchestrator uses a scheduler to allocate workers to tasks, in accordance with an embodiment of the present invention.
Figure 30:
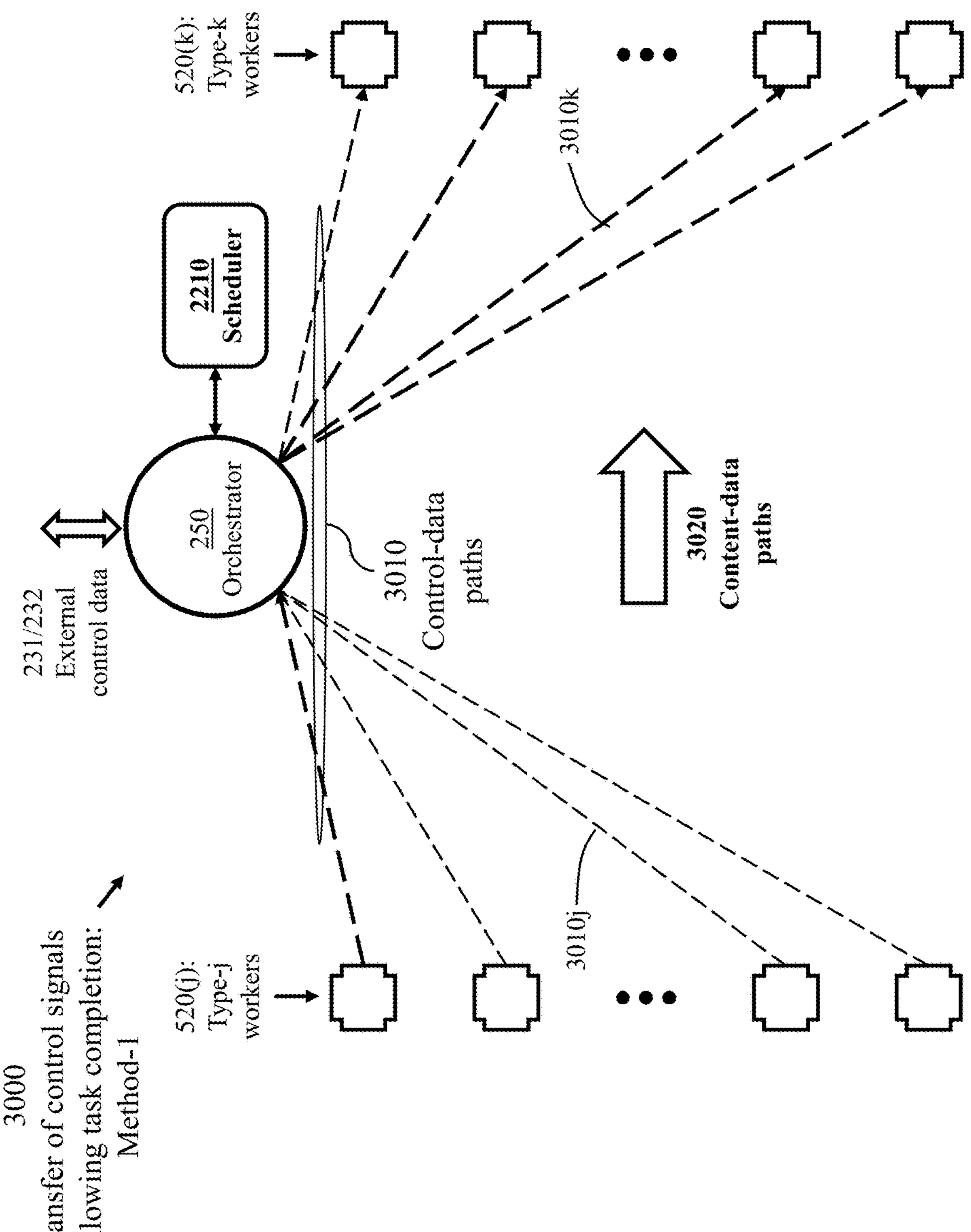
FIG. 30 illustrates transfer of control data following a worker's task completion for method-1, in accordance with an embodiment of the present invention.

FIG. 22 illustrates a scheme 2200 of centralized allocation of workers to tasks where a scheduler 2210 selects a worker for each task. Instructions 2260 of workers-allocation to tasks are communicated to individual workers through orchestrator-worker dual control paths (FIG. 30). A content-transfer assembly 2270 transfers processed GOPs content between workers as detailed in FIGS. 33-35.

Figure 23:
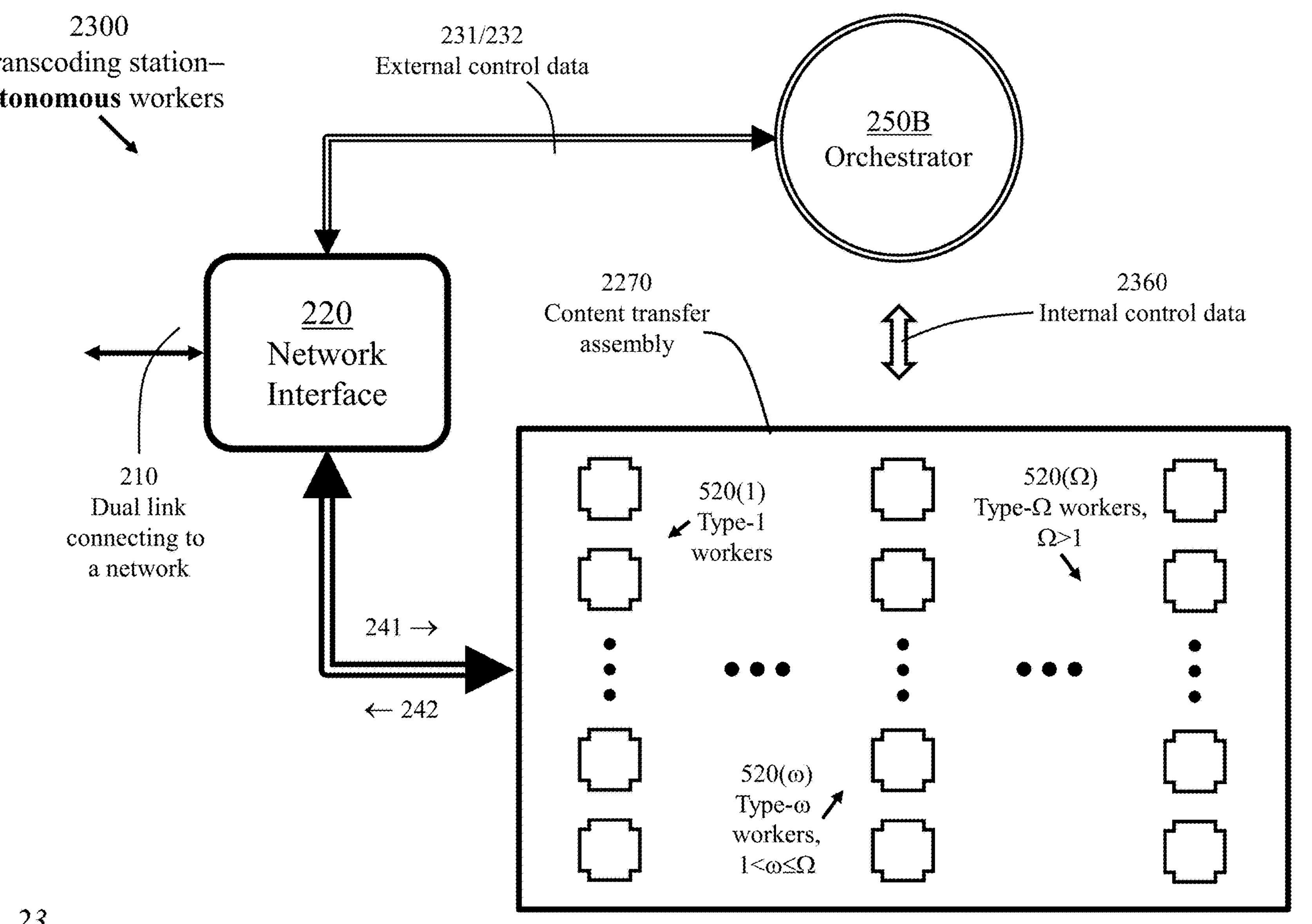
FIG. 23 illustrates a second scheme where the orchestrator identifies requisite tasks and the workers individually operate in a semi-autonomous, or an autonomous, mode to select tasks, in accordance with an embodiment of the present invention.
Figure 31:
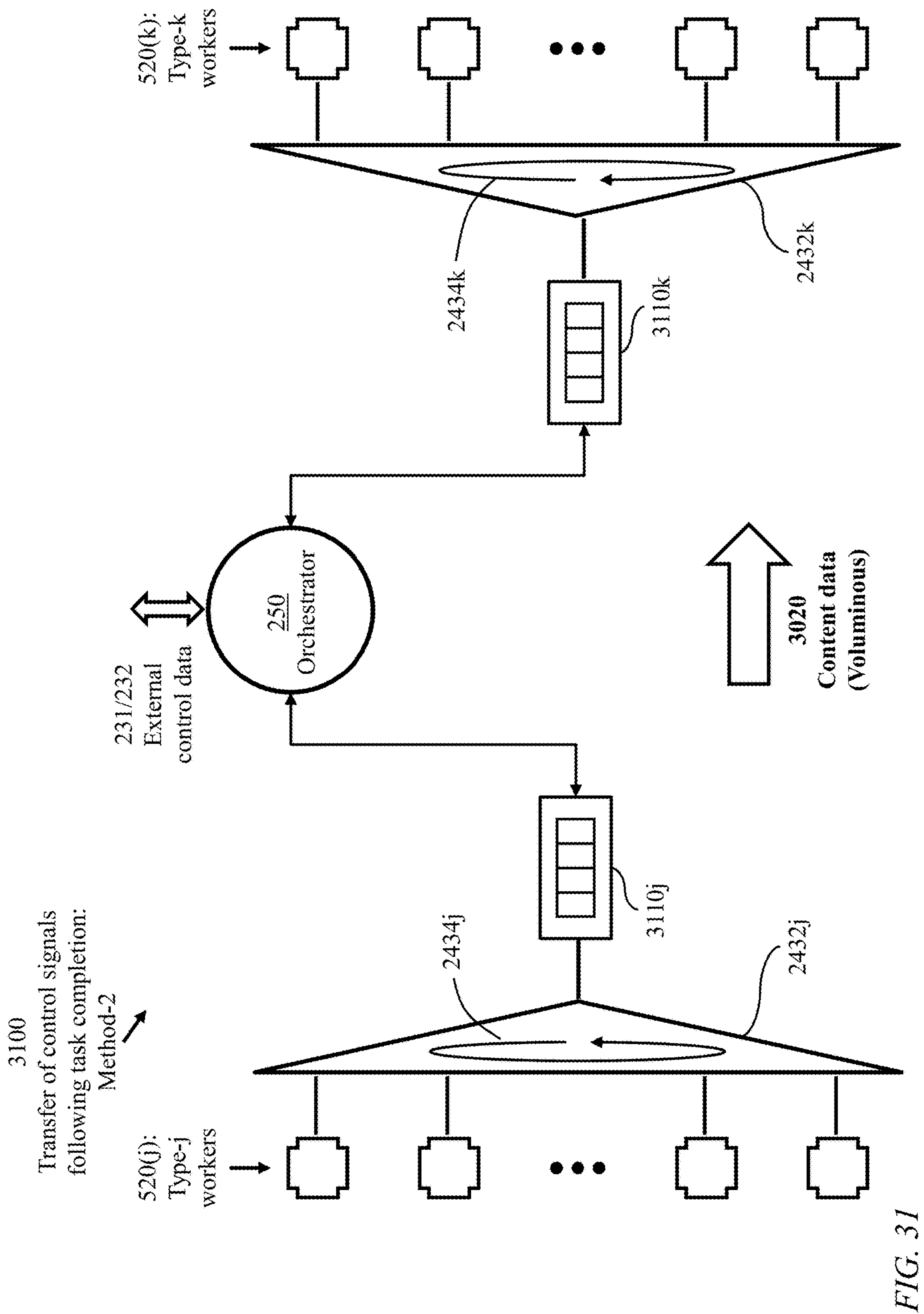
FIG. 31 illustrates transfer of control data following a worker's task completion for method-2, in accordance with an embodiment of the present invention.
Figure 32:
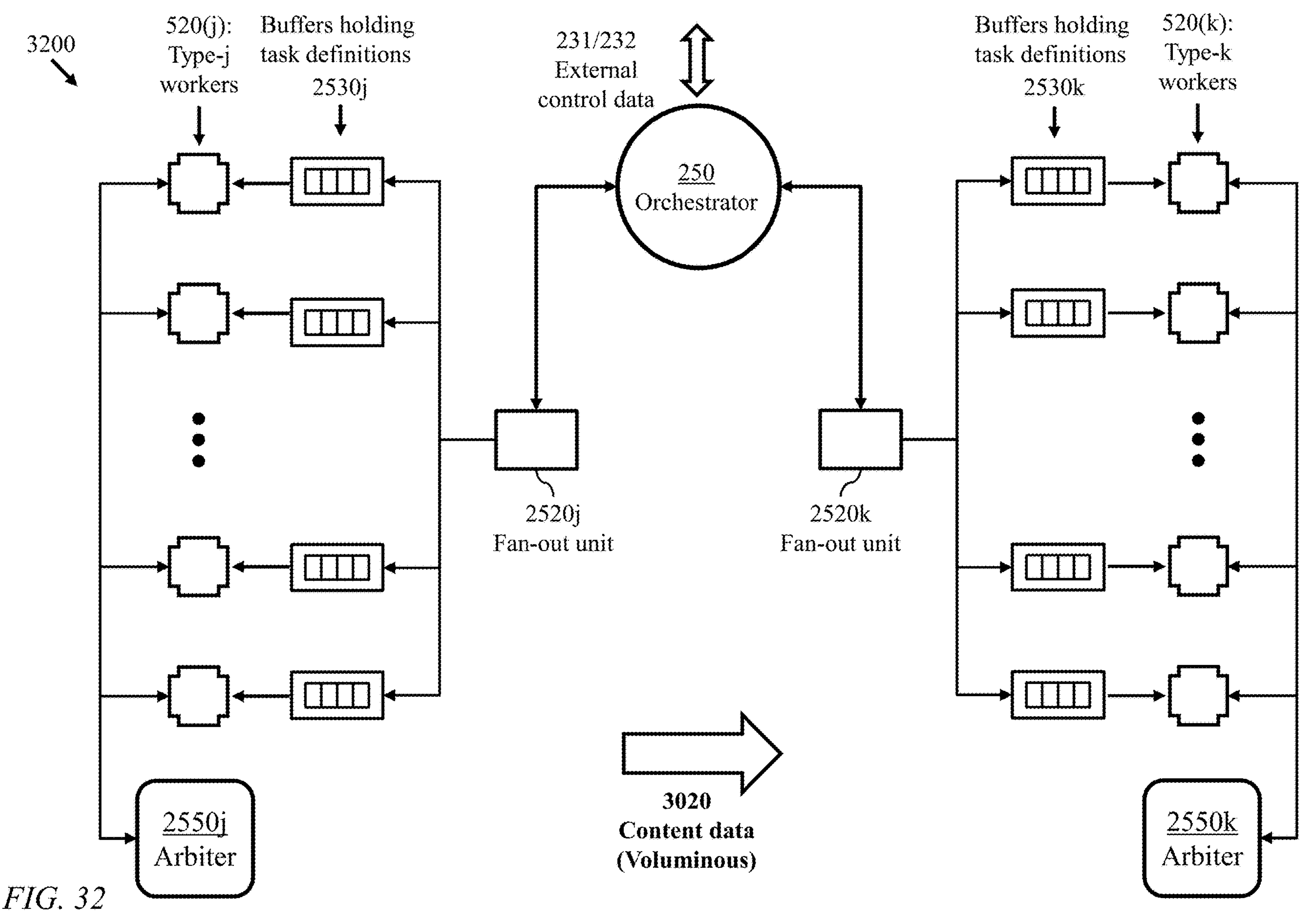
FIG. 32 illustrates transfer of control data following a worker's task completion for method-3, in accordance with an embodiment of the present invention.

FIG. 23 illustrates an alternate scheme 2300 where the orchestrator identifies requisite tasks and the workers individually operate in a semi-autonomous, or an autonomous, mode to select tasks. The orchestrator communicates internal control data 2360 to workers through orchestrator-worker dual control paths (FIG. 31, FIG. 32).

Figure 24:
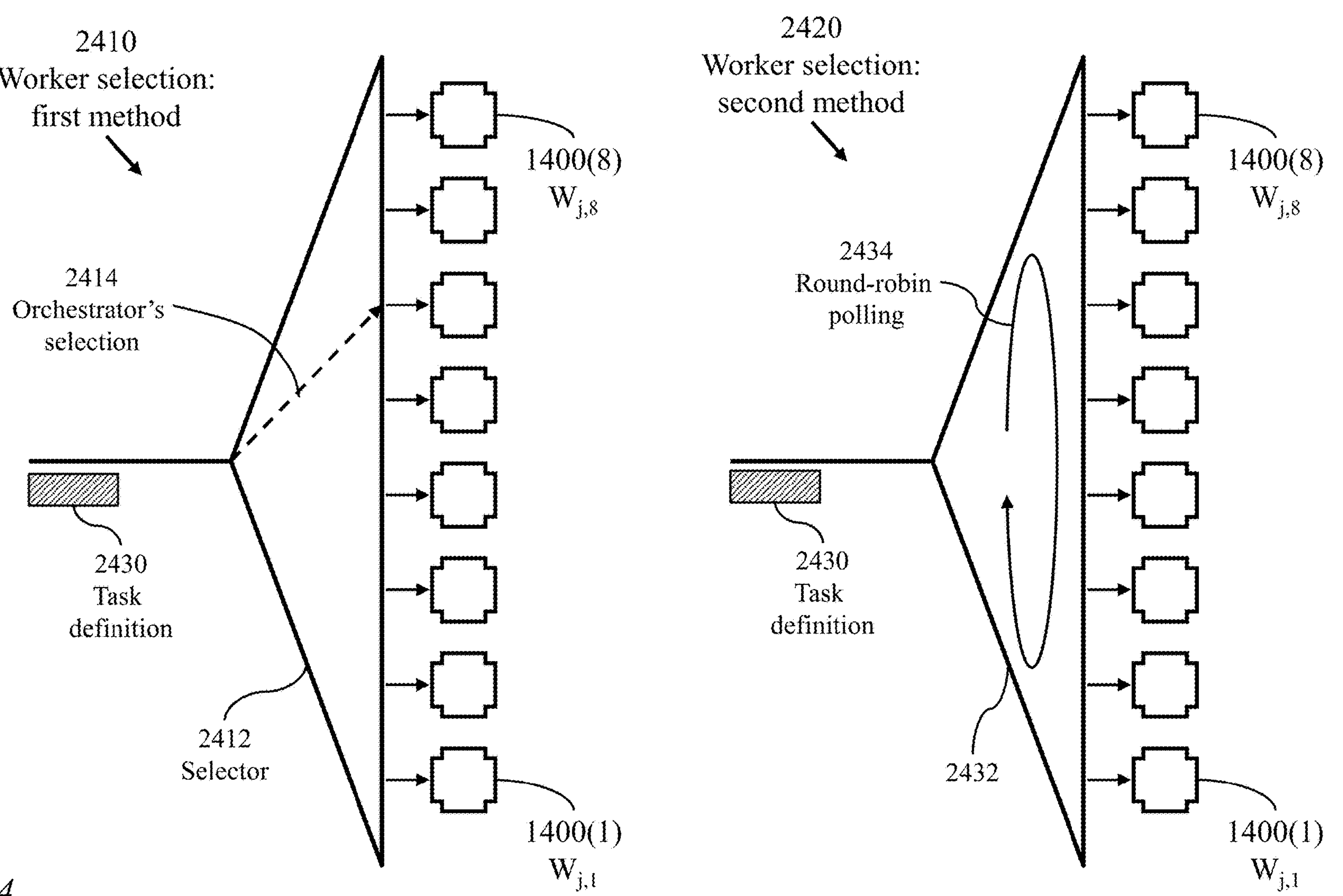
FIG. 24 illustrates an orchestrator's selection of a worker (method-1) versus the orchestrator polling candidate workers (method-2) for a specific task, in accordance with an embodiment of the present invention.

FIG. 24 illustrates worker selection methods 2400 where an orchestrator selects a worker (2410, method-1) or polls candidate workers (2420 method-2) for a specific task. According to method-1, the orchestrator generates a task definition 2430, selects a worker of the eight worker types $W_0$ to $W_7$, and directs the task definition to the selected worker through a 1:8 selector 2412 (path 2414). According to method-2, the orchestrator offers the task to a group of workers through a 1:8 selector operated according to round-robin polling 2434 of individual workers until a worker accepts the task.

Figure 25:
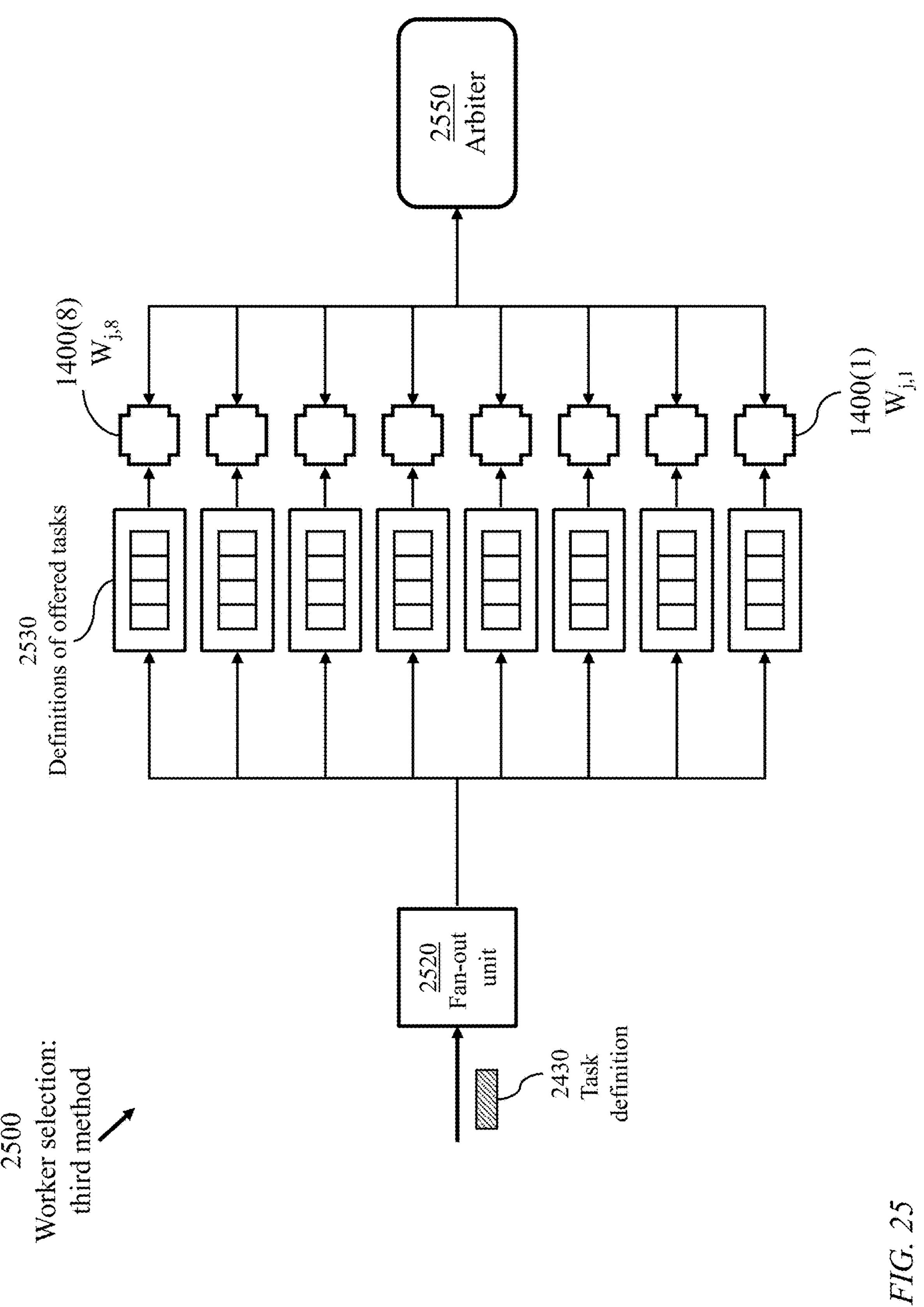
FIG. 25 illustrates multicasting a definition of a requisite task to candidate workers (method-3), in accordance with an embodiment of the present invention.

FIG. 25 is a continuation 2500 of FIG. 24 where the orchestrator offers a task to all workers of a worker group (method-3) and an arbiter selects one of available workers (if any). Task definition 2430 is presented to all workers of a worker-group using a fan-out unit 2520. A buffer 2530, preceding each candidate worker 1400, holds definitions of offered tasks. For each task, the arbiter may select a preferred worker after receiving availability indications from a predefined number of workers, or within a predefined period of time, whichever occurs first. At any instant of time, a buffer 2530 preceding a worker may contain definitions of multiple tasks which may be considered according to any queuing discipline, such as FIFO (first in, first out). A waiting task at a buffer 2530 of a particular worker may expire based on a permissible waiting interval or the arbiter's selection of another worker for the task.

Figure 26:
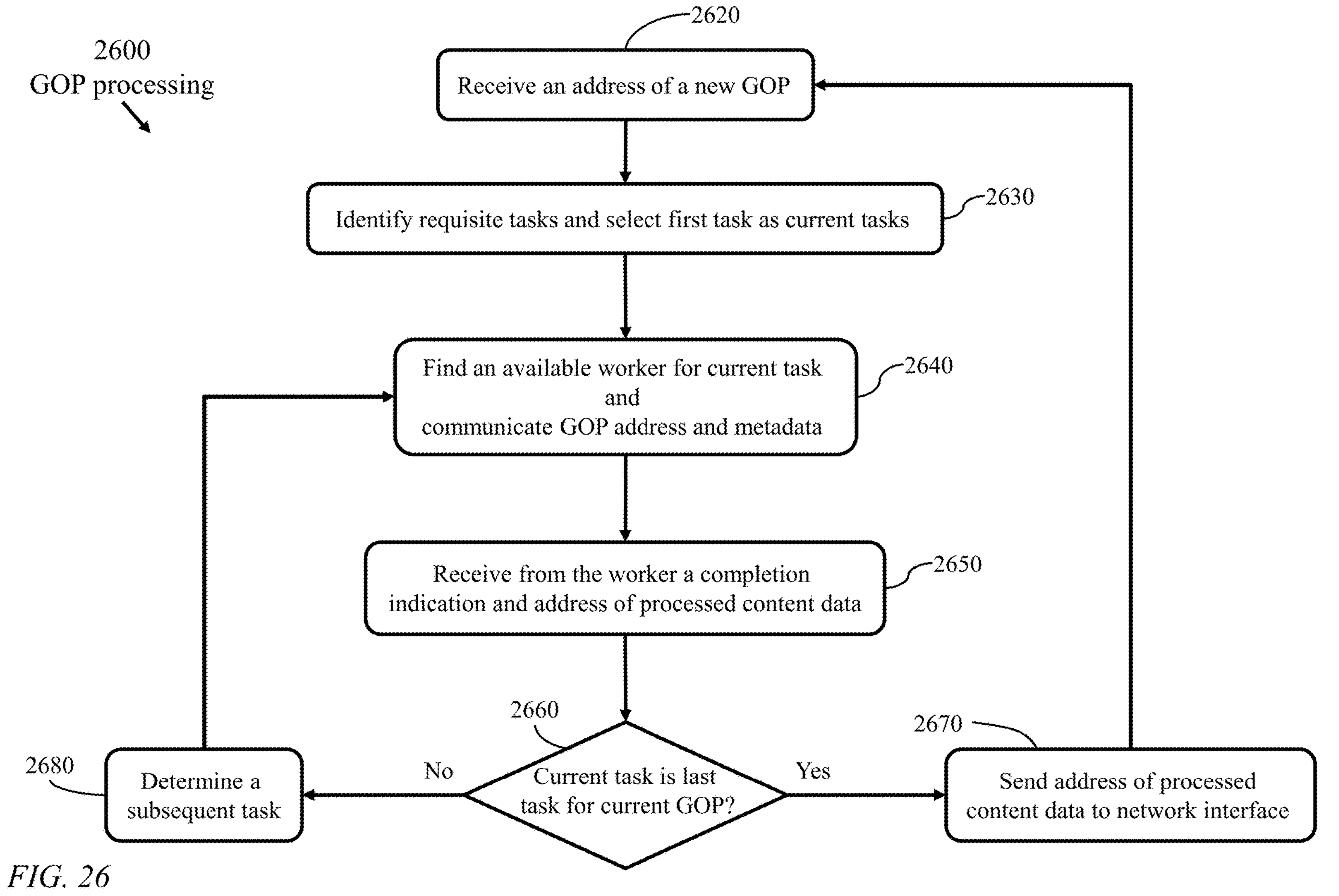
FIG. 26 is a flow chart indicating basic processes of worker selection for a task, in accordance with an embodiment of the present invention.

FIG. 26 is a flow chart 2600 indicating basic processes of worker selection for a task. Process 2620 receives a memory address of a new GOP. Process 2630 identifies requisite tasks and selects a first task as a current task. Processes 2640 find an available worker for the current task and communicate to the available worker the memory address and relevant metadata. Process 2650 receives from the worker a completion indication and memory address of processed content data. Process 2660 determines completion, or otherwise, of all tasks for the GOP. Process 2670 communicates the memory address of the processed content data to the network interface 220 and revisits process 2620 to receive another GOP. Process 2680 determines a subsequent task and revisits processes 2640 to find a worker for the subsequent task.

Figure 27:
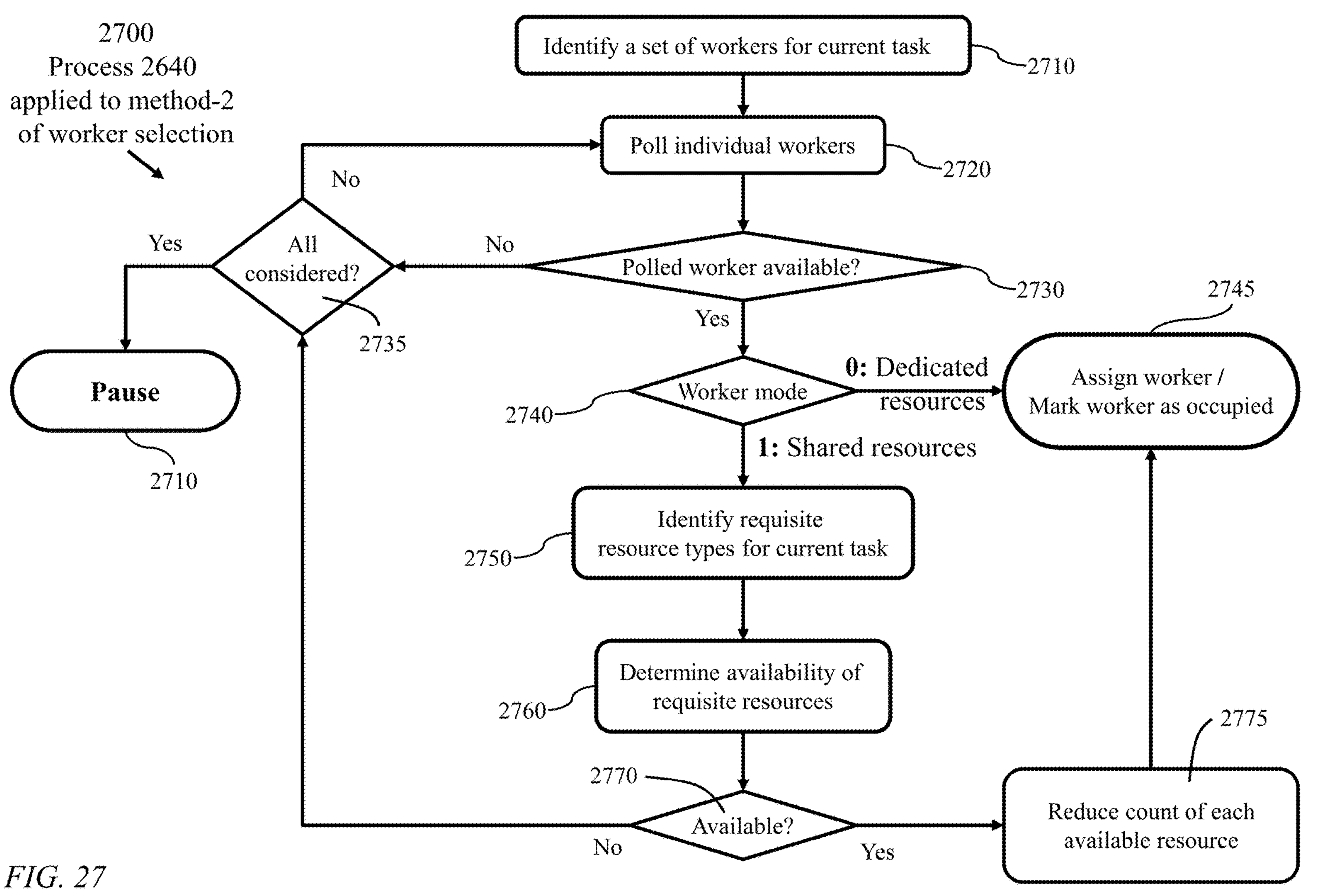
FIG. 27 is a flow chart indicating processes of method-2 of worker selection for a task, in accordance with an embodiment of the present invention.

FIG. 27 is a flow chart 2700 indicating processes 2640 applying method-2 of worker selection for a task. Process 2710 identifies a set of workers for a task. Process 2720 polls individual workers of the set of workers. Process 2730 determines whether a polled worker is available. Process 2740 branches to process 2745 or process 2750 according to mode of a polled worker (mode 0: dedicated resources, mode 1: worker uses shared resources). Process 2745 assigns a worker to implement the task and marks the worker as occupied. Process 2750 identifies requisite resource types for the task. Process 2760 determines availability of requisite resources. Process 2770 ascertains availability, or otherwise, of all requisite resources. Process 2775 reduces counts of resources allocated to the task then visits process 2745. Process 2780 pauses processing then revisits process 2720.

Figure 28:
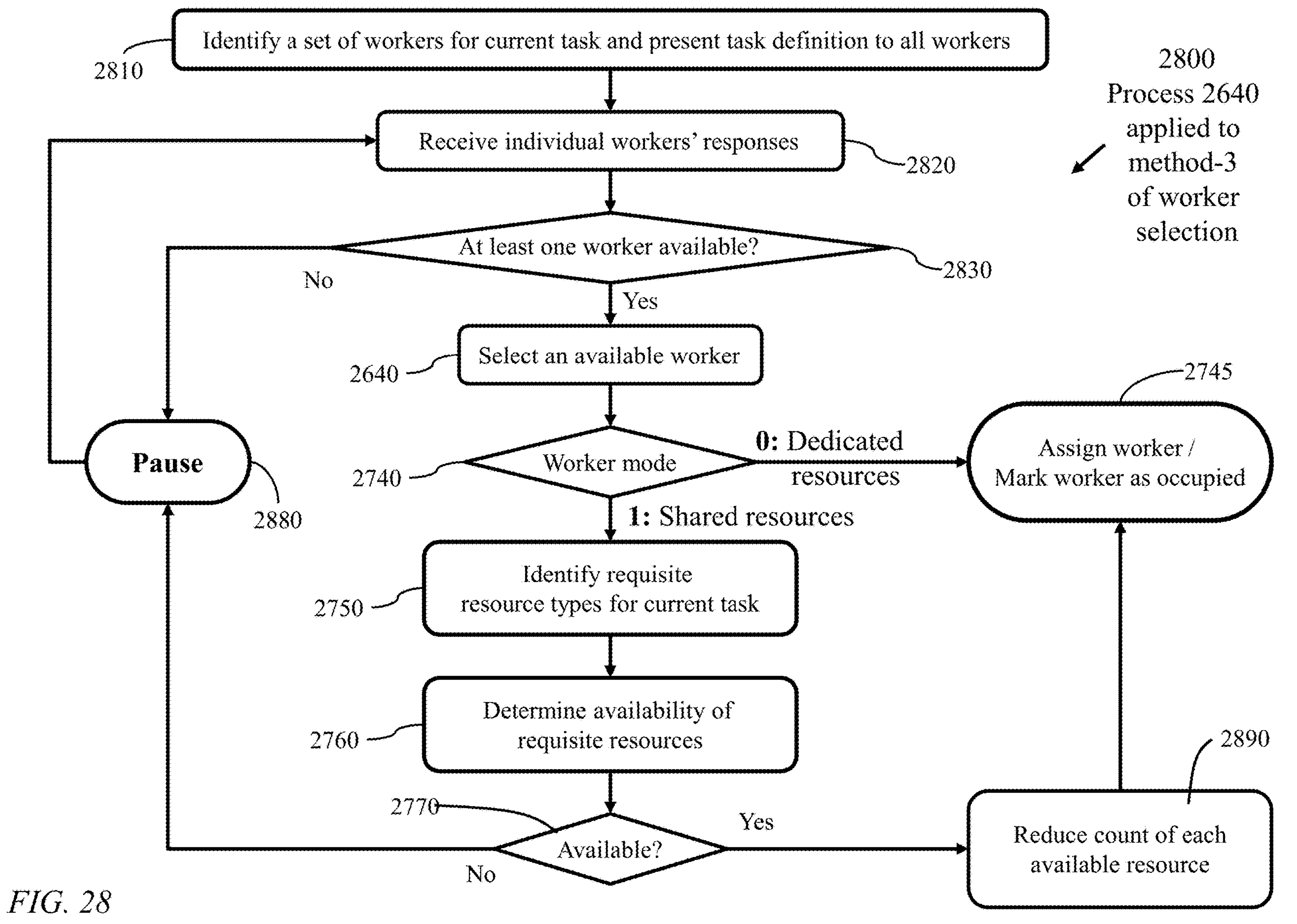
FIG. 28 is a flow chart indicating processes of method-3 of worker selection for a task, in accordance with an embodiment of the present invention.

FIG. 28 is a flow chart 2800 indicating processes 2640 applying method-3 of worker selection for a task. Process 2810 identifies a set of workers for a task and presents task definition to all workers of the set of workers. Process 2820 receives individual workers' responses within a predefined time window. Process 2830 determines availability of at least one available worker. Process 2840 selects one available worker. Process 2740 branches to process 2745 or process 2750 according to mode of a polled worker (mode 0: dedicated resources, mode 1: worker uses shared resources). Process 2745 assigns a worker to implement the task and marks the worker as occupied. Process 2750 identifies requisite resource types for the task. Process 2760 determines availability of requisite resources. Process 2770 ascertains availability, or otherwise, of all requisite resources. Process 2775 reduces counts of resources allocated to the task then visits process 2745. Process 2880 pauses processing then revisits process 2820

Figure 29:
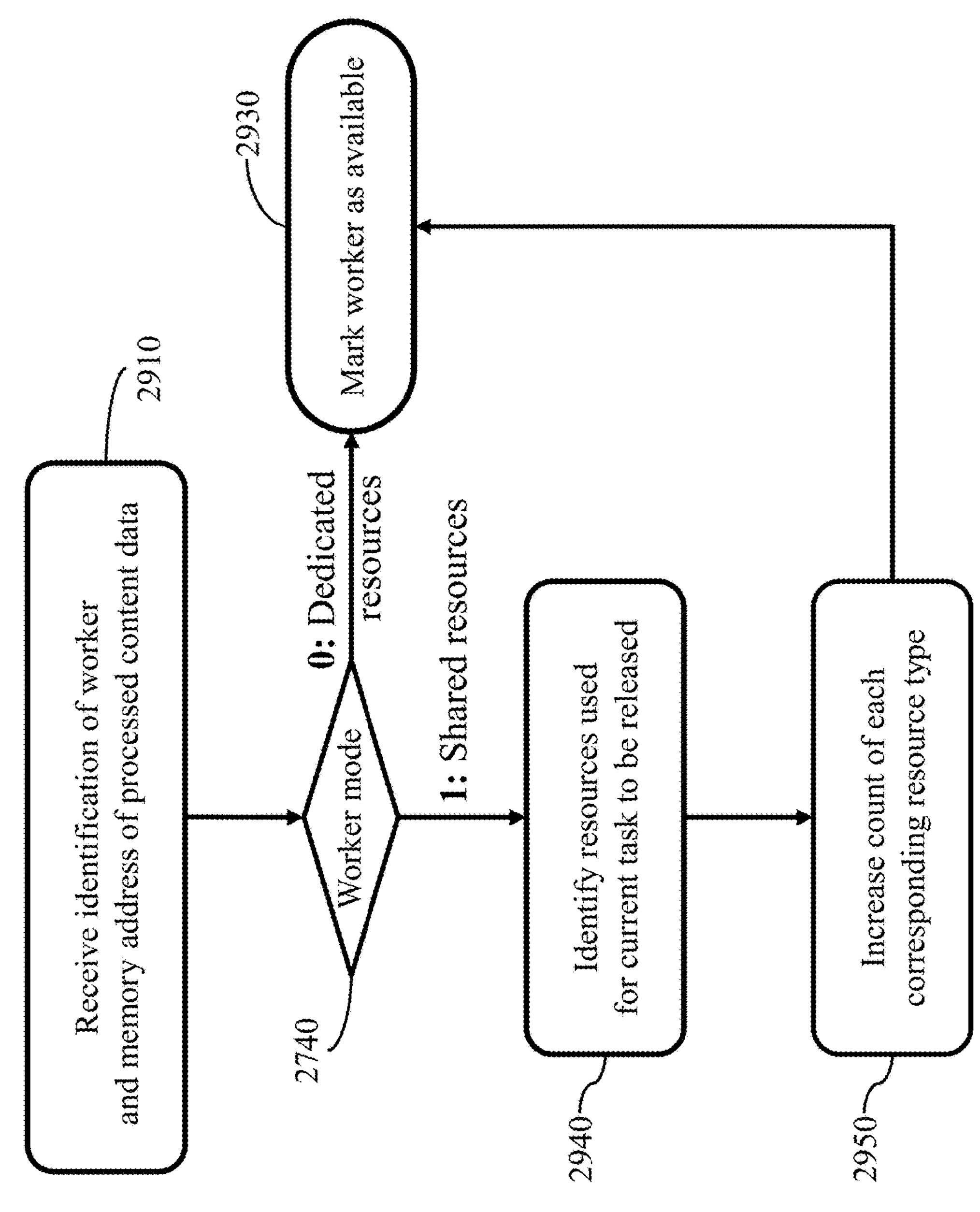
FIG. 29 is a flow chart detailing state update following completion of a task.

FIG. 29 is a flow chart 2900 detailing state update following completion of a task regardless of the method used for worker allocation to the task. Process 2910 acquires identification of worker to be marked available and memory address content data that the worker processed. Process 2740 leads to process 2930 or process 2940 depending of the mode of the worker to be released. Process 2930 marks a released worker as available. Process 2940 identifies all resources that the released worker used. Process 2950 increases availability count of each corresponding resource type.

FIG. 30 illustrates a configuration 3000 for transfer of control data from a group of workers to another group of workers following a worker's task completion using method-1 of centralized allocation of a worker for a task. Each worker of each group of workers has a dual control channel 3010 to orchestrator 250. A worker of worker-group-J transfers control data to a worker of worker-group-K through a channel 3010J, the orchestrator, and a channel 3010K, 1≤J≤Ω, 1≤K≤Q. Processed GOP-content data at workers of type-J are transferred to workers of type-K through paths 3020 to be illustrated in FIGS. 33 to 35.

FIG. 31 illustrates a configuration 3100 for transfer of control data following a worker's task completion for method-2 of polling workers. The orchestrator places task definitions to a worker group 520 in a respective buffer 3110.

FIG. 32 illustrates a configuration 3200 for transfer of control data following a worker's task completion for the case of multicasting a task definition to all workers of a respective set of workers (method-3. As illustrated in FIG. 25, the orchestrator offers a task to all workers of a worker group and an arbiter selects one of available workers (if any). Task definition 2430 is presented to all workers of a worker-group using a fan-out unit 2520.

Figure 33:
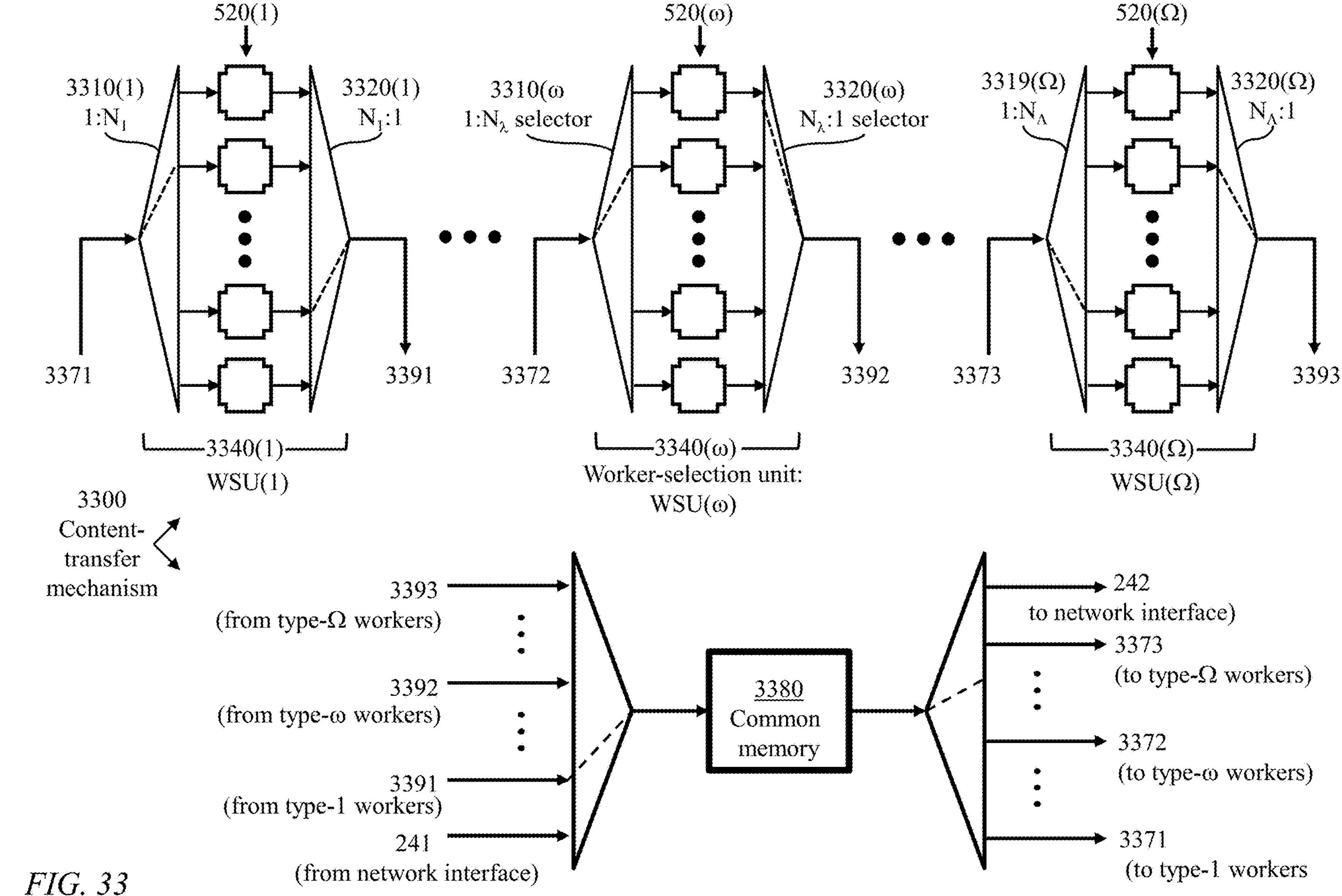
FIG. 33 illustrates a first mechanism of inter-worker content transfer, in accordance with an embodiment of the present invention.

FIG. 33 illustrates a first mechanism 3300 of inter-worker content transfer based on transferring received (raw) GOPs from the network interface 220 to the first group 520(1) of workers, transferring processed GOPs from one worker group to another, then transferring transcoded GOPs from worker group 520(Ω) to the network interface 220 through a common storage medium, such as common memory 3350.

Each worker group 520(ω), 1≤ω≤Ω, is coupled to a respective input selector 3310 and a respective output selector 3320 to form a respective worker-selection unit (WSU) 3340. Each input selector 3310 is operable to direct GOP content data read from common content memory 3350 to workers of a respective worker group. Each output selector 3320 is operable to direct processed GOP content to the common content memory 3350.

The common memory 3350 is coupled to a WRITE-access selector 3360 and a READ-access selected 3365. WRITE-access selector 3360 is operable to:

(1) transfer detected upstream GOP content data 241 (FIG. 2) to the common memory 3350 to be read out as data 3371 directed to type-1 workers of WSU-1 which produce respective decompressed GOPs 3391;

(2) transfer decompressed GOPs 3391 to the common memory 3350 to be read out as data 3372 directed to a type-ω workers of WSU-ω, 1<ω<Ω, which produce respective processed GOPs 3392;

(3) transfer processed GOPs 3392 to the common memory 3350 to be read out as data 3373 directed to a type-Ω workers of WSU-Ω which produce compressed transcoded GOPs 3393; and (4) transfer compressed transcoded GOPs 3393 to the common memory 3350 to be read out as stream-specific downstream content data 242 to be transmitted to respective destinations through the network interface 220.

FIG. 34 illustrates a variation 3400 of the content-transfer mechanism of FIG. 33, for a case where Ω=4, where the common-content memory 3350 is replaced with:

Ω stage-content memory devices 3450(ω), 1≤ω≤Ω, each preceding a respective WSU, and an output-content memory device 3455 holding compressed transcoded GOPs for dissemination to respective destinations.

Each stage-content memory device is coupled to a respective controller 3460. The output-content memory is coupled to a controller 3465. Controllers 3460 and 3465 are coupled to an interface unit 3480 between the pool of workers and the orchestrator.

Figure 35:
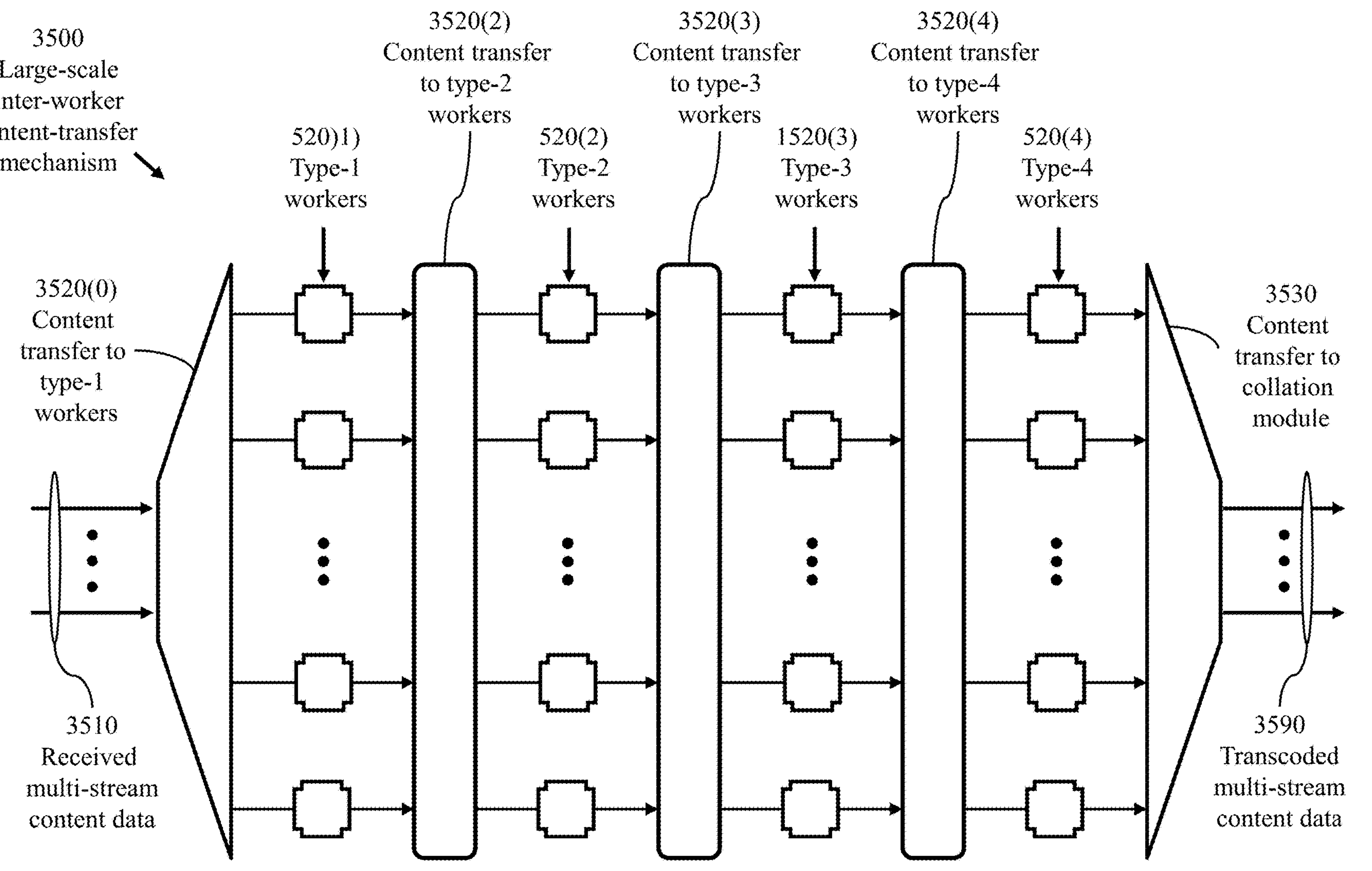
FIG. 35 illustrates a second mechanism of inter-worker content transfer, in accordance with an embodiment of the present invention.

FIG. 35 illustrates a second mechanism 3500 of inter-worker content transfer where each of Ω content-transfer mechanisms 3520, precedes a respective worker group and an output content-transfer mechanism 3530 transfers compressed transcoded data to the network interface 220. Each content-transfer mechanism is configured as a simplified switching mechanism for concurrent transfer of GOPs at different stages of processing.

Figure 36:
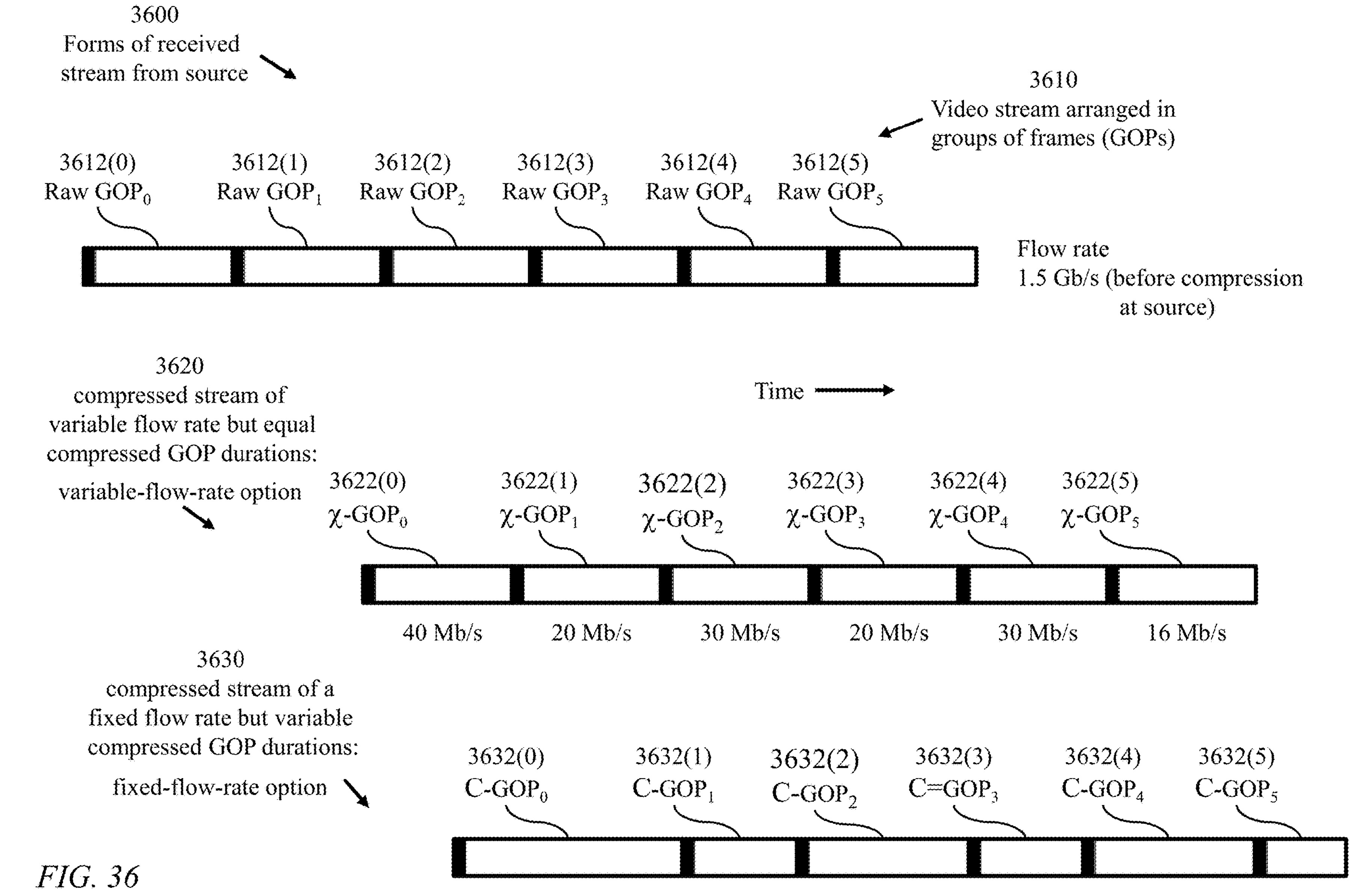
FIG. 36 illustrates forms of multimedia signals received at a transcoding station from a multimedia source, comprising variable flow rate signals structured as groups-of-pictures (GOPs) of fixed durations and signals of fixed flow rates with variable GOP durations, for use in an embodiment of the present invention.

FIG. 36 illustrates video-stream components 3600 of multimedia streams formed at a multimedia source 140 to be directed to a transcoding station 160. The video streams may comprise variable-flow-rate streams with fixed durations of group-of-pictures (GOPs), or fixed-flow-rate streams with variable GOP durations. A raw video stream 3610 originating at a multimedia source 140 is arranged in raw groups of pictures (GOPs). Six raw GOPs, indexed as 3611 to 3616, are illustrated. The raw video stream 3610 may be compressed to form a compressed video stream 3620 of a variable flow rate but equal compressed GOP durations, or a compressed video stream 3630 of a fixed flow rate, hence variable compressed GOP durations. The illustrated six compressed GOPs of stream 3620, indexed as 3621 to 3626, of equal durations have mean flow rates of 40 Mb/s, 20 Mb/s, 30 Mb/s, 20 Mb/s, 30 Mb/s, and 16 Mb/s, reflecting time-varying rates changes of captured scenes. The illustrated six compressed GOPs of stream 3630, indexed as 3631 to 3636, of equal mean flow rates have varying durations.

Figure 37:
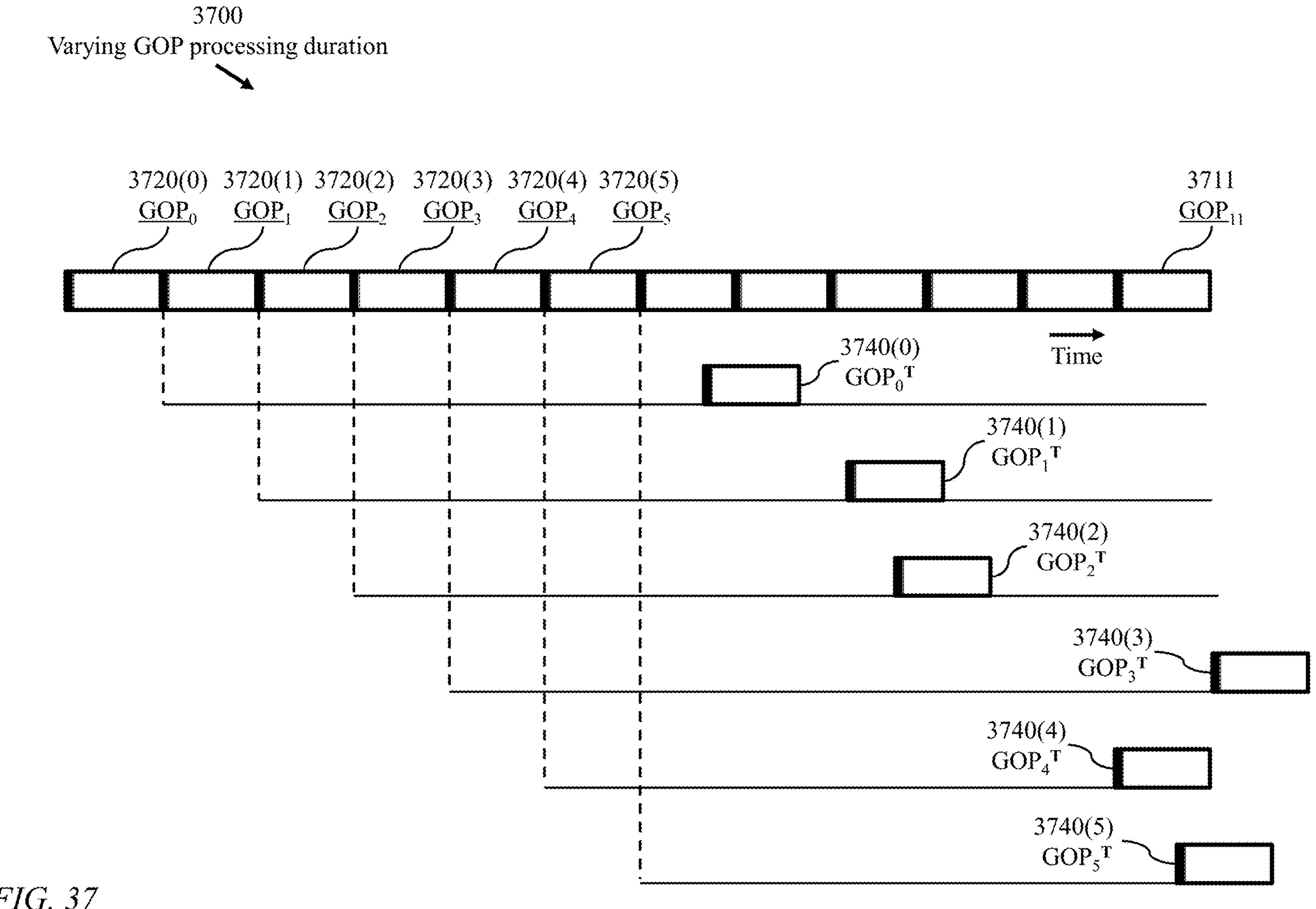
FIG. 37 illustrates effect of variable processing delays of successive GOPs.

FIG. 37 illustrates an example 3700 of discrepancy between the order of transcoded GOPs and the order of received GOPs of a specific stream at a transcoding station 160 due to varying processing delays of successive GOPs. A transcoded GOP is distinguished as $GOP^T$. The detected source GOPs at the network interface 220 are indexed sequentially in steps of 1, with the indices denoted 3720(*j*), j>1. The corresponding transcoded GOPs experience varying processing delays due to both the varying contents of individual GOPs and contention for appropriate workers. The indices 3740($j$), j>1, of transcoded GOPs bear a one-to-one correspondence to indices 3720($j$), j>1, of the source GOPs. As illustrated, transcoded $GOP_4^T$ is generated before $GOP_3^T$. With the passage of times, the incidence of out-of-order transcoded GOPs increases necessitating retention of a sliding window of transcoded GOPs to enable temporal rearrangement.

Figure 38:
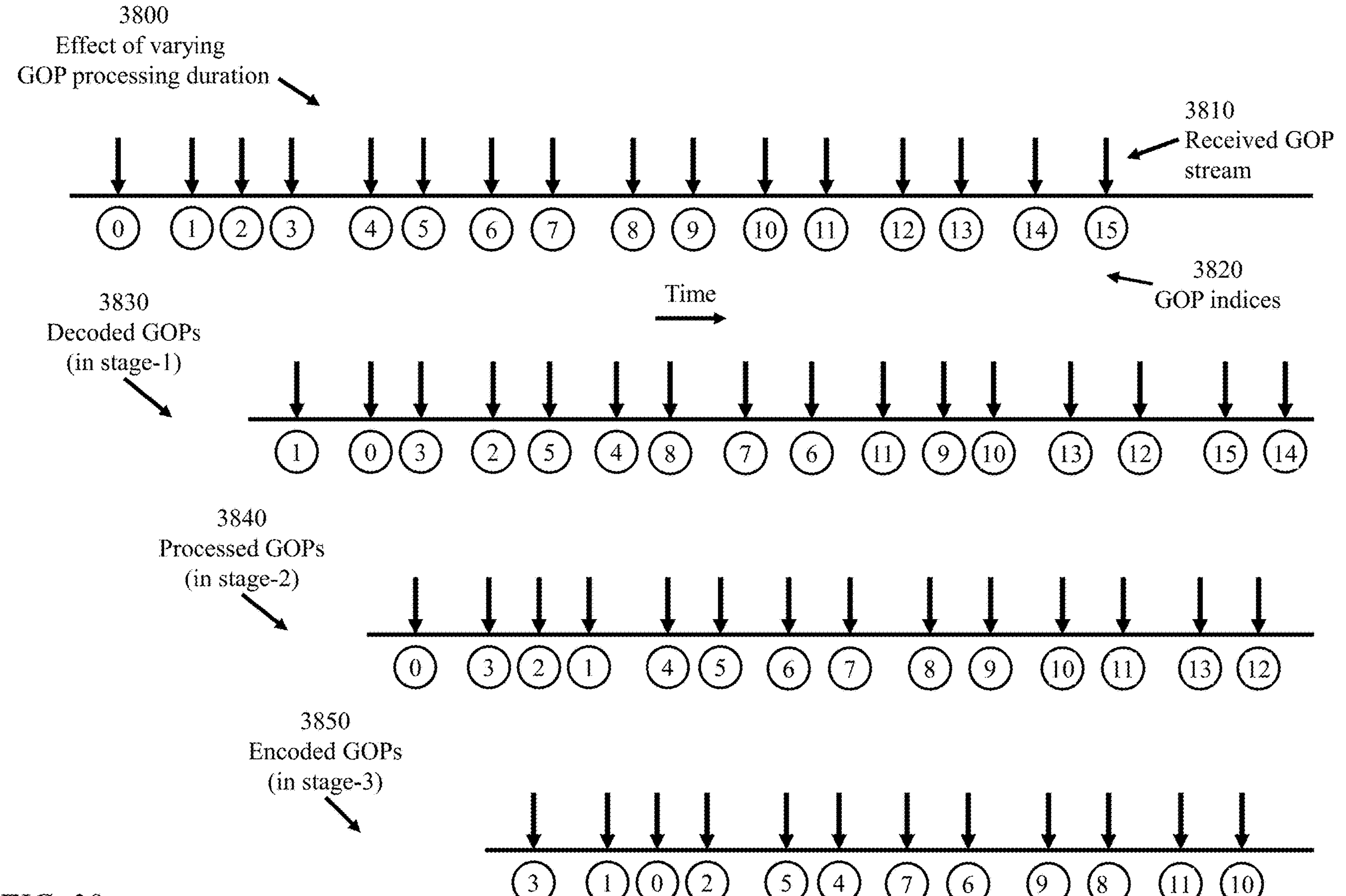
FIG. 38 illustrates discrepancy between the order of arrival of received GOPs and the order of transcoded GOPs due to varying processing effort of different GOPs within each of the three stages, thus necessitating reordering of the GOPs at output of the transcoding station.

FIG. 38 illustrates an example 3800 of discrepancy between the order of arrival of received GOPs and the order of producing transcoded GOPs due to varying processing time intervals of different GOPs within each of the three stages.

The GOPs received at successive time instants 3810 are indexed sequentially, in steps of 1 (reference 3820). Received GOPs of indices 0 to 15 are illustrated. As illustrated, the sequential order of the decoded GOPs 3830 in stage-1 differs from the sequential order of the GOPs received from the source. The sequential order of the processed GOPs 3840 in the second stage differs from the sequential order of decoded GOPs 3830. The sequential order of the encoded GOPs 3850 in the third stage differs from the sequential order of processed GOPs 3840. Consequently, to enable arranging the encoded GOPs in a proper temporal order prior to transmission to a destination client 180, a number of encoded GOPs, within a moving time window, may need to be buffered.

Figure 39:
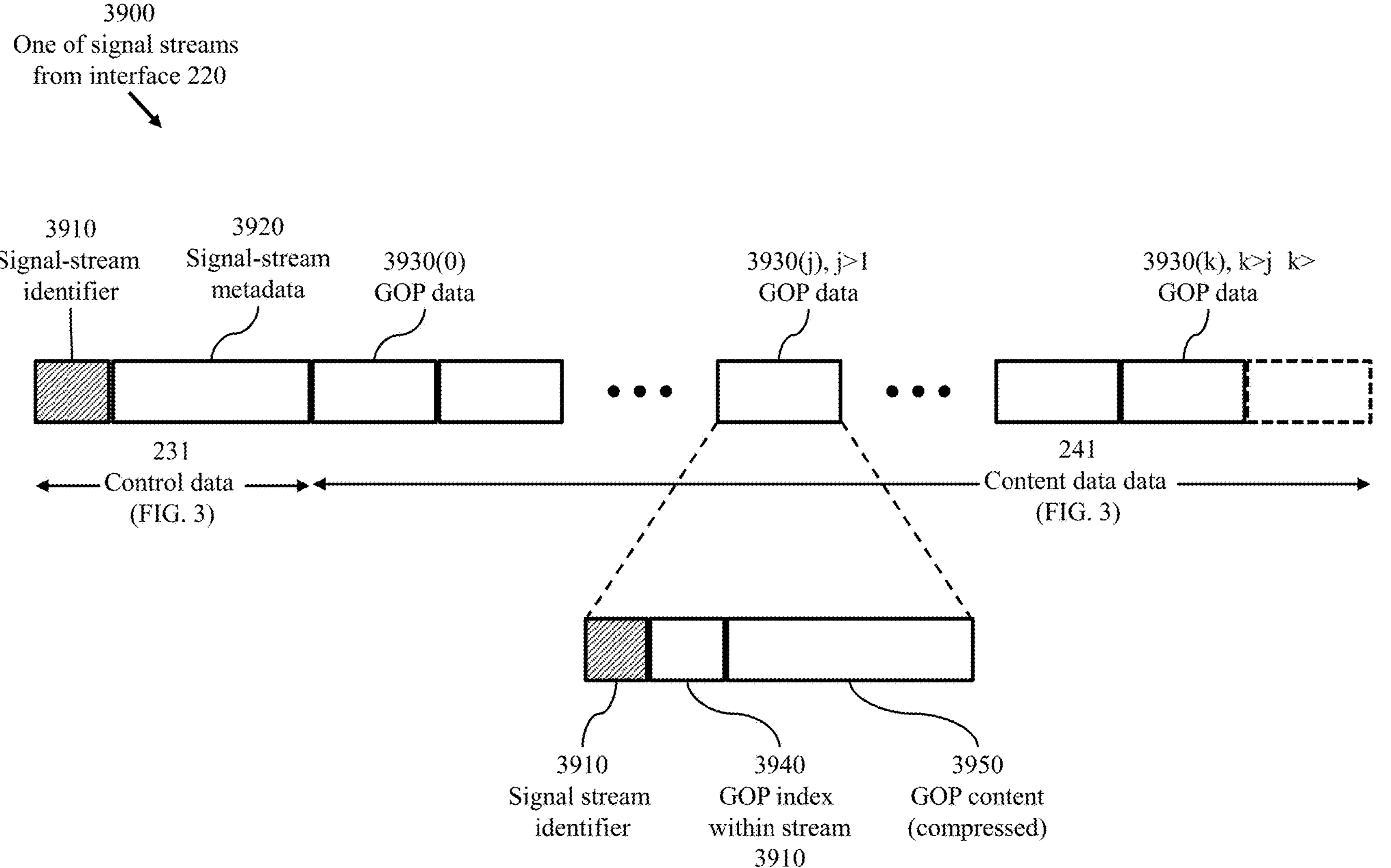
FIG. 39 illustrates a signal stream received at the network interface.

FIG. 39 illustrates a signal stream 3900 received at the transcoding station from a multimedia source 140. A signal-stream identifier 3910 is inserted at the network interface 220. Signal-stream metadata 3920 indicates transcoding functions to be applied to contents 3930 of the GOPs of the signal stream. Each GOP is identified according to the signal-stream identifier 3910 and a GOP index 3940 within the signal stream. Each received GOPs comprises compressed GOP content 3950.

FIG. 40 details metadata 3930. The metadata includes data 4010 relevant to received signal stream and data 4020 relevant to the transcoded signal stream. Data 4010 indicates a compression standard 4012 according to which the received GOPs are compressed at source as well as frame-level data 4014 related to frame rate and structure (frame dimension in pixels). Data 4020 indicates a compression standard 4022 to be applied to transcoded signal stream as well as required frame rate and structure 4024.

Figure 41:
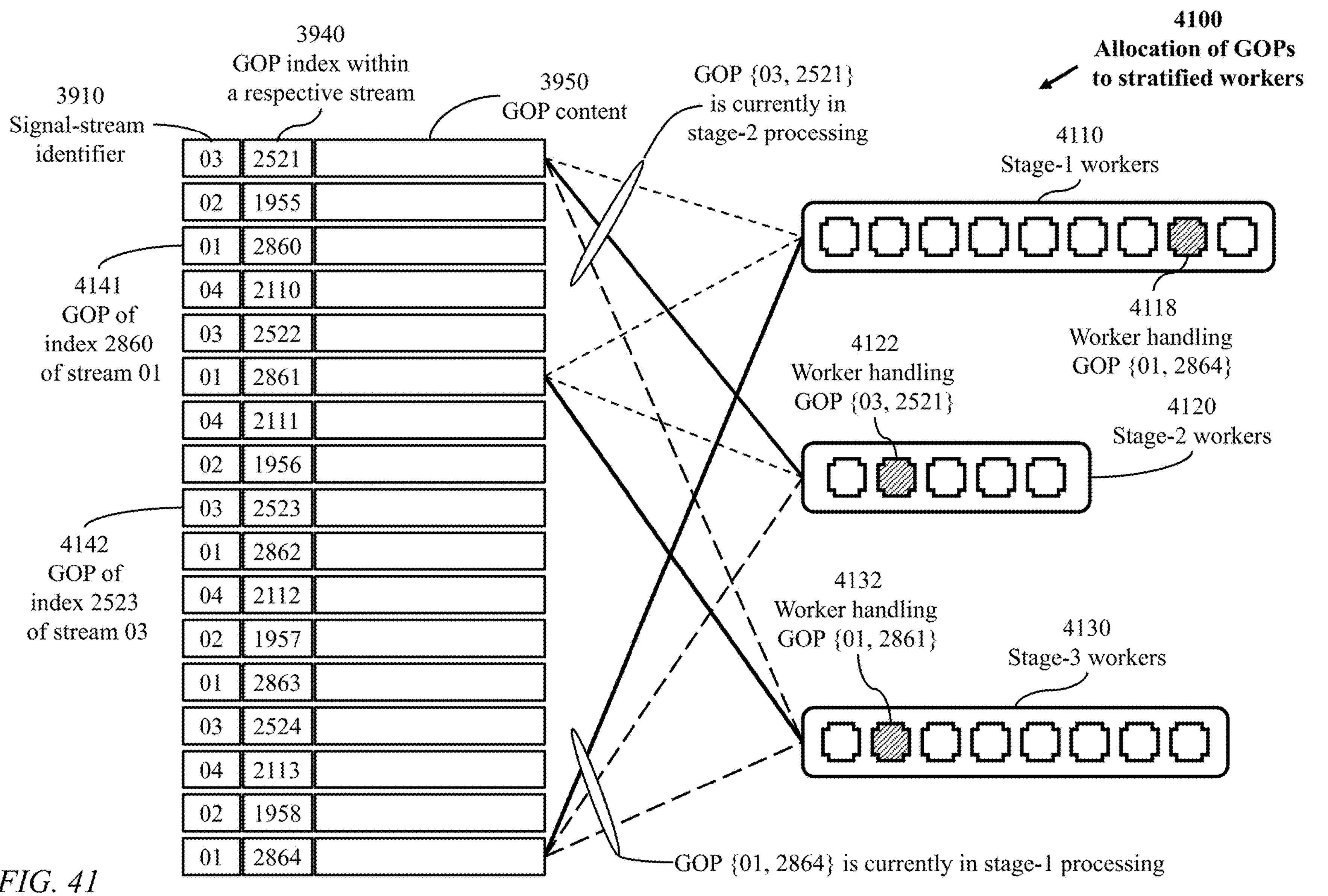
FIG. 41 illustrates a process of allocating GOPs of a received signal stream to stratified workers.

FIG. 41 illustrates a process 4100 of allocating GOPs of the received signal stream to stratified workers of the processing stages. Workers 4110 of the decoding stage (the first processing stage) include heterogeneous workers which may be individually specialized to handle compressed GOPs formed according to respective standards. Workers 4120 of the second stage are configured to modify the frame rate and structure of decoded GOPs is needed. Workers 4130 of the encoding stage (the third processing stage) include heterogeneous workers which may be individually specialized to compress outgoing GOPs according to respective standards. A solid line from a GOP to a worker group indicates that a worker of the group is currently processing the GOP. A dotted line indicates a completed process or a forthcoming process. As indicated, worker 4118 of the decoding stage (first stage) is processing GOP (01, 2864), worker 4122 of the second stage is processing GOP (03, 2521), and worker 4132 of the encoding stage (third stage) is processing GOP (01, 2861).

Figure 42:
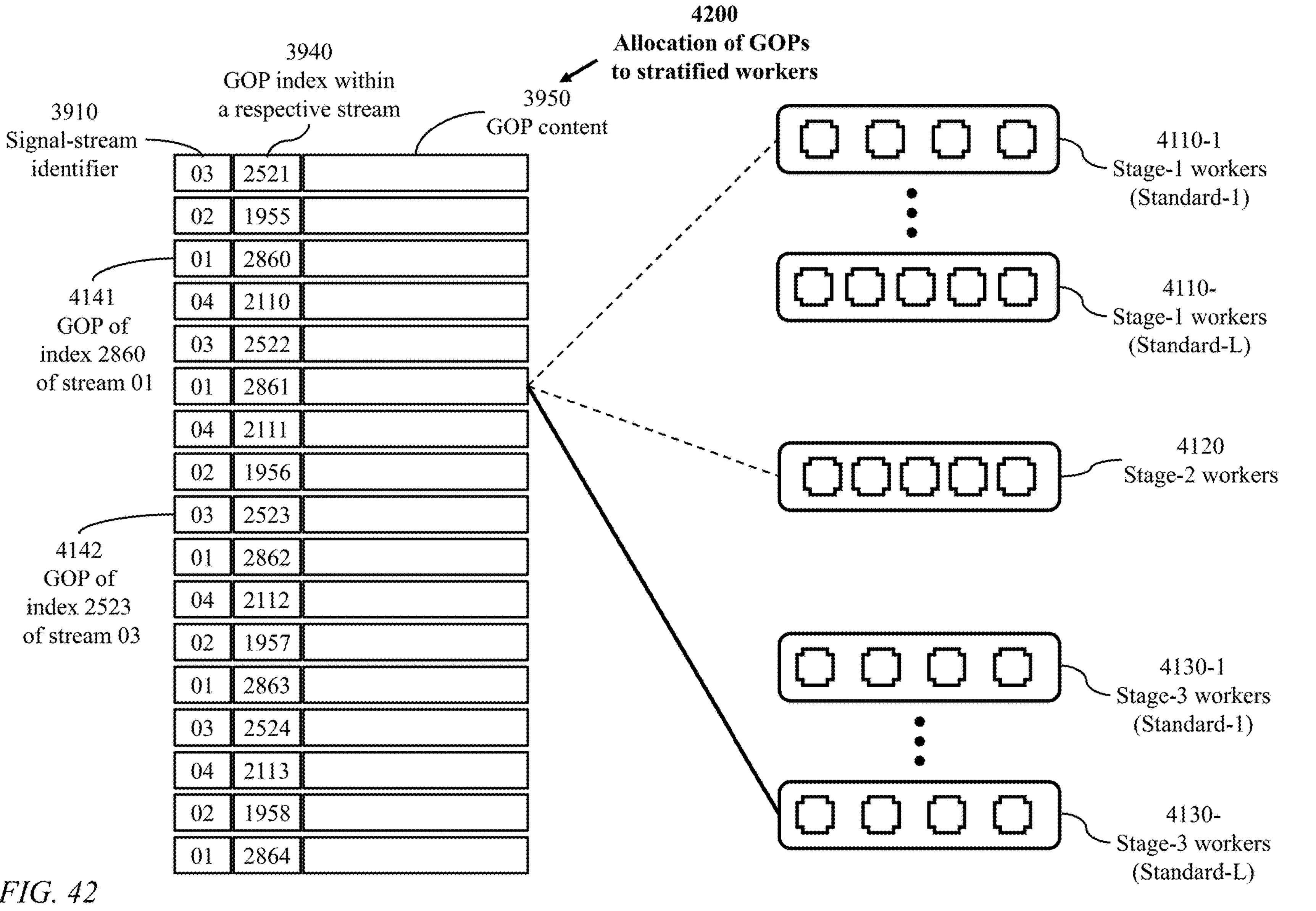
FIG. 42 illustrates a process of allocating GOPs of a received signal stream to workers of transcoding stages which are stratified and further grouped according to applied compression standards.

FIG. 42 illustrates a process 4200 of allocating GOPs of the received signal stream to workers of the processing stages which are stratified and further grouped according to applied compression standards. Workers 4210 of the decoding stage (the first processing stage) are divided into L subgroups, L>1, each subgroup corresponding to a respective compression standard. Likewise, Workers 4230 of the encoding stage (the third processing stage) are divided into L subgroups, L>1, each subgroup corresponding to a respective compression standard. This arrangement expedites the process of selecting a worker for a requisite task.

Figure 43:
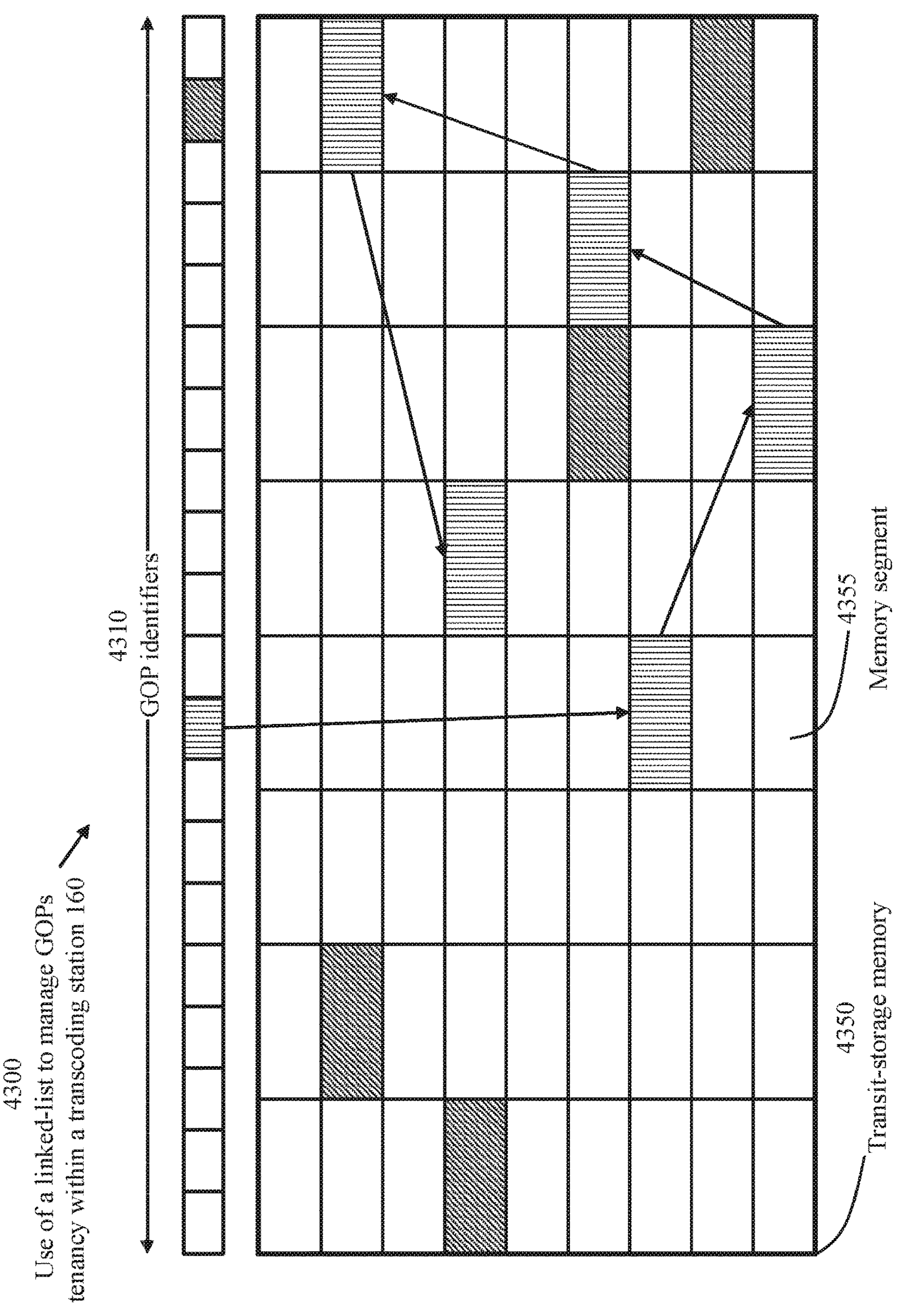
FIG. 43 illustrates a process of managing storage of GOP data as the content of each GOP is altered during the processing stages.

FIG. 43 illustrates a process 4300 of managing storage of GOP data as the content of each GOP is altered during the processing stages. A linked-link structure facilitates updating and storing the modified data in a common memory device 4350 (or in multiple memory devices). The storage space is organized into memory segments 4355. Content of a single GOP may occupy an integer number of linked segments. An array 4310 stores GOP identifiers and corresponding initial memory segments.

Figure 44:
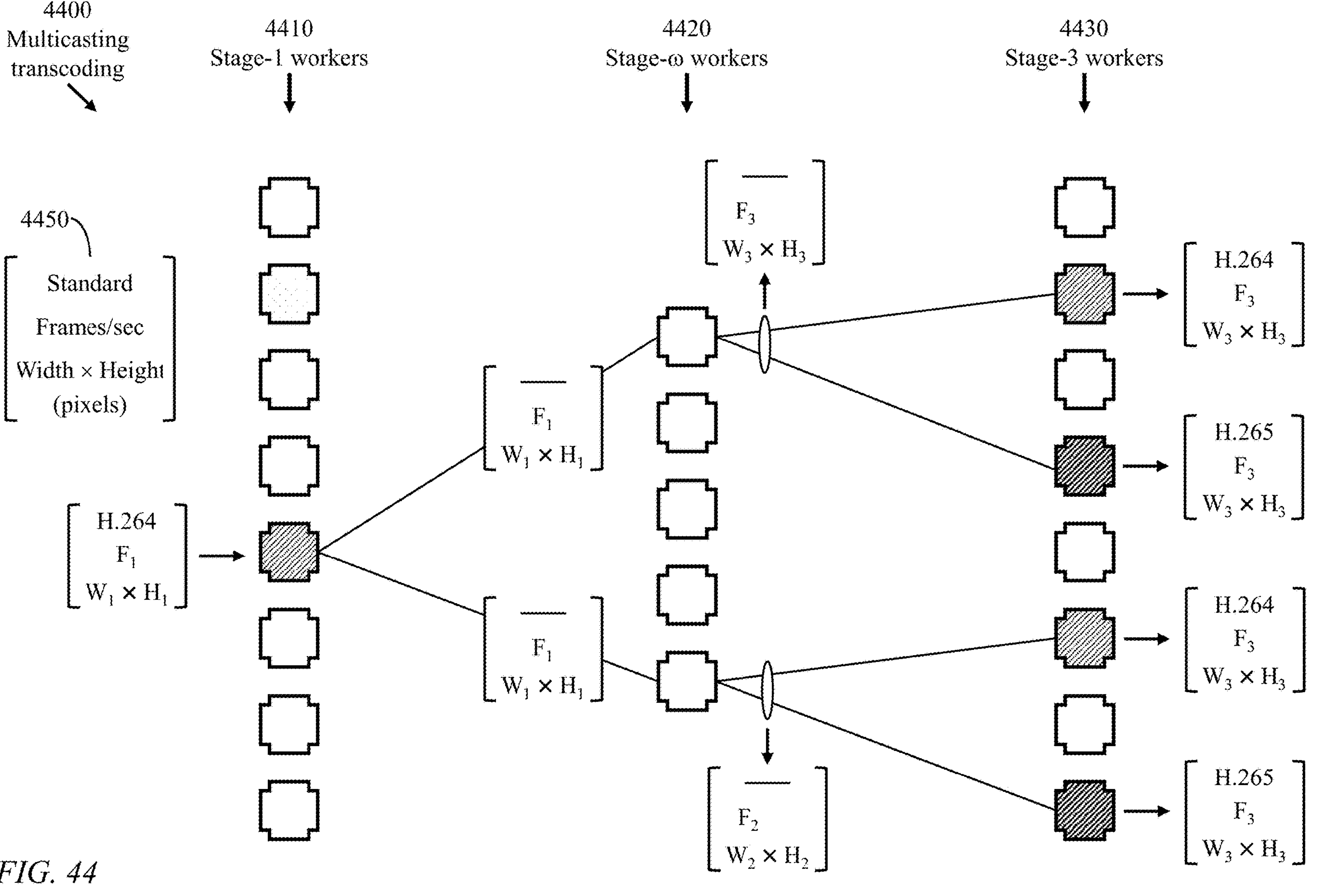
FIG. 44 illustrates transcoding of a signal stream to be multicast in different formats, in accordance with an embodiment of the present invention.

FIG. 44 illustrates transcoding a received signal stream to be multicast in different formats. A signal stream formed according to H.264 is received at the transcoding station with a request to be transcoded to different formats. The video signals of the received signal stream are formed at a frame rate $F_1$ frames/sec with a frame dimension of $W_1 \times H_1$. The transcoding request specifies four transcoded streams formatted as: {H.264, $F_2$, $W_2 \times H_2$}, {H.265, $F_2$, $W_2 \times H_2$}, {H.264, $F_3$, $W_3 \times 3_2$}, and {H.265, $F_3$, $W_3 \times H_3$}. For live transcoding, this is realized using two stage-2 workers concurrently, then four stage-3 workers concurrently as indicated.

In summary, the invention provides a high-capacity transcoding station 200 for concurrently transcoding multiple signal streams received from designated multimedia sources 140. The transcoding station comprises a network interface 220 coupled to a telecommunication network 120, a pool 260 of heterogenous processing units of different types, referenced as "workers", a pool 280 of resources communicatively coupled to the pool of workers, and an orchestrator 250 configured to communicate with the pool of workers through dual control paths 270 and communicate with the multimedia sources 140 through the network interface 220.

The network interface 220 is configured to communicate with a plurality of multimedia sources to receive transcoding requests and signal streams to be transcoded. The network interface directs control data components of the transcoding requests from different multimedia sources to the orchestrator through a stream-specific control-data selector 235 and directs content data of the signal streams to the pool of workers through a high-capacity stream-specific content selector 245.

In a preferred implementation, the content data is organized into groups of pictures (GOPs) 300 and each worker of the pool of workers is configured to process one GOP at a time. The GOPs are treated as independent entities, regardless of their stream affiliations. Thus, a worker may process a GOP belonging to any stream. A collator coupled to the network interface is configured to collate transcoded GOPs according to signal-stream (310A, 310B, 310C, . . . ) affiliation and arrange GOPs of each signal stream in proper sequential order to be communicated to respective destinations through destination-interface module 1230 of the network interface 220.

The transcoding station includes an inter-worker content-transfer network 3300, 3400, 3500 for transfer of processed data from each worker to a subsequent worker of a different type, if any, and a worker-resource network 1580, 1630 for dynamically coupling workers of the pool of workers to respective requisite resources of the pool of resources 280, 1640.

Each worker of the pool of workers comprises a respective hardware processor 1410 coupled to a memory device 1450 storing software modules for executing tasks allocable to the worker. Each worker includes:

- an orchestrator-interface module 1420 configured to communicate with the orchestrator 250;
- an inter-worker-interface module 1430 configured to enable transferring control signals to other workers through the inter-worker network; and
- a resource interface module 1440 configured to enable coupling to selected resources of the pool of resources.

The transcoding station may employ workers sorted into a first set of workers each having respective dedicated resources 1520, and a second set of workers each connecting to the pool of resources through a resource-access mechanism 1580.

The pool of workers 260 is arranged into a number, Ω, of groups of worker types 520(ω), 1≤ω≤Ω, having a one-to-one corresponding to Ω transcoding stages, Ω>1. Optionally, a set of stage controllers. 1120(1) to 1120(Ω), directly coupled to the orchestrator 250, is provided to extend the capacity of the transcoding station, each stage controller 1120 having a dual control channel 1010 to the orchestrator 250 and communicatively couples to a respective worker group of the pool of workers.

The network interface 220 comprises: a respective processor 1290; a source interaction module 1210; a destination interaction module 1230; a metadata extraction module 1220; a content-extraction module 1260; a source-characterization module 1240; and a source-characterization database 1250.

The invention provides a method 400 of transcoding, implemented at a transcoding station 200 employing a plurality of hardware processors. The method comprises processes of receiving 410 multiple signal streams 310A, 310B, 310C, . . . , from multiple signal sources 140, where each signal stream 310 is organized into respective groups of pictures (GOPs), each GOP comprising a respective number of video frames, and transcoding all GOPs of all signal streams independently.

Individual GOPs and corresponding metadata are detected 420 from the received signal streams and transcoded 430 using a plurality of workers operating concurrently. The transcoded GOPs are collated 440 according to stream identity and sequential order within each stream. Transcoded GOPs of each stream are transmitted 450 to respective designated destinations.

Definitions of requisite tasks, for each signal stream of the multiple signal streams, are acquired according to respected metadata associated with each signal stream. Transcoding a received GOP entails performing basic processes including:

- decoding 1720 the received GOP to extract a respective baseband signal;
- baseband processing 1730 based on source-provided metadata;
- destination-specific baseband processing 1740; and
- encoding 1750 to produce a compressed baseband signal modulating a downstream carrier directed to respective destinations.

According to a first implementation 2200, an orchestrator 250A is employed for assigning 2414 the requisite tasks to appropriate workers of the plurality of workers. A scheduler 2210 coupled to the orchestrator selects a worker for each requisite task.

According to a second implementation 2300, an orchestrator 250B polls a group of workers, through a selector 2432 operated according to round-robin discipline 2434, to offer a specific task of the requisite tasks until a worker accepts the task.

According to a third implementation 2500, an orchestrator 259C presents a definition of a specific task of the requisite tasks to all workers of a selected worker group of the pool of workers. An arbiter 2550 then selects an available worker of the selected worker group, according to worker-availability indications, within a predefined period of time.

The embodiments of the invention further provides a method of transcoding comprising acquiring operator-defined data 810 and applying a recursive set of processes {830, 840, 850} to transcode received signal streams. The operator-defined data comprises definitions 820 of a set of task types and, for each task type, respective resources of a pool of resources and a list of candidate workers of a pool of workers.

The recursive set of processes comprises:

- receiving 830 a transcoding request from a multimedia source of a plurality of multimedia sources and a respective signal stream organized into groups of pictures (GOPs);
- identifying 850 requisite tasks for the transcoding request;
- storing definitions of the requisite tasks in a memory device accessible to the pool of workers;
- allocating respective workers and resources, and
- updating availability of resources of the pool of resources and workers of the pool of workers.

For each GOP of the respective signal stream, a respective GOP identifier is assigned to facilitate tracking as GOPs content undergo changes in different processing stages. A set of requisite tasks is identified and a first task is selected as a current task. The following processes are then recursively performed:

- identifying 2640 an available worker for the current task;
- communicating 2640 to the available worker a definition of the current task and the respective GOP identifier;
- receiving 2650 from the available worker a completion indication;
- subject to a determination 2660, 2680 that at least one requisite task is pending, selecting a subsequent task of the set of requisite tasks as a current task; and
- subject to a determination that all requisite tasks have been performed 2660, 2670, sending the respective GOP identifier to a collator of transcoded GOPs.

Several methods of selecting a worker for a specific task may be used. According to one method, for each requisite task, a set of worker types and a set of requisite resource types are identified (FIG. 19, FIG. 20), individual workers of the set of workers are polled (2434, FIG. 24). Subject to a determination that a polled worker is available and the requisite resource types are available, the requisite task is assigned to the polled worker.

Methods of the embodiment of the invention are performed using one or more hardware processors, executing processor-executable instructions causing the hardware processors to implement the processes described above. Computer executable instructions may be stored in processor-readable storage media such as hard disks, Flash ROMS, non-volatile ROM, and RAM. A variety of processors, such as microprocessors, digital signal processors, and gate arrays, may be employed.

Systems of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

It should be noted that methods and systems of the embodiments of the invention and data streams described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

The invention claimed is:

1. A transcoding station, comprising:

a pool of heterogeneous workers configured to concurrently transcode a plurality of heterogeneous signal streams, wherein each signal stream is organized into groups of pictures (GOPs), each worker comprising a respective hardware processor, wherein the pool of workers is organized into a predefined number of worker groups, each worker group comprising workers of a respective transcoding stage;

an orchestrator configured to assign to each GOP a respective set of workers to produce a respective transcoded GOP, wherein the orchestrator is coupled to one or more transcoding-stage controllers, each transcoding-stage controller communicatively coupled to a respective worker group, wherein said respective set of workers comprises one worker from each worker group, wherein each worker of each worker group has a dual control channel to the orchestrator, a first content-transfer channel from a content-transfer mechanism, and a second content-transfer channel to said content-transfer mechanism, thereby enabling transfer of control data and content data from a worker of any worker group to a worker of another worker group, wherein said content-transfer mechanism comprises:

a worker-selection unit for each worker group having a respective upstream selector for transferring GOP content to a selected worker of said each worker group and a downstream selector for transferring output of the selected worker to a common memory;

a first cyclical selector for supplying GOP content data from a network interface and from said worker-selection units to said common memory; and a second cyclical selector for transfer of GOP content data from said common memory to said worker-selection units and to said network interface;

the network interface, connecting to a telecommunication network, configured to:

communicate with a plurality of multimedia sources to receive transcoding requests and corresponding signal streams organized into GOPs;

attach a signal-stream identifier to each GOP;

direct the transcoding requests to the orchestrator; and direct the signal streams to the pool of workers; and a collator coupled to said network interface configured to collate transcoded GOPs according to respective signal-stream identifiers and arrange GOPs of each signal stream in proper sequential order to be communicated to respective destinations through the network interface.

2. The transcoding station of claim 1, wherein said plurality of heterogeneous signal streams comprises at least two signal streams formed according to different coding standards.

3. The transcoding station of claim 1, wherein each said transcoding request of a specific signal stream comprises metadata indicating a compression standard according to which the specific stream is formed and specifying a compression standard according to which a respective transcoded signal stream is to be formed.

4. The transcoding station of claim 1, wherein said orchestrator is configured to, for each transcoding stage:

define tasks to be performed for said each GOP according to metadata content of transcoding request;

present definitions of said tasks to compatible workers of said each transcoding stage; and select a compatible worker of least workload.

5. The transcoding station of claim 1, wherein said content-transfer mechanism comprises:

a worker-selection unit for each worker group having a respective upstream selector for transferring GOP content to a selected worker of said each worker group and a downstream selector for transferring output of the selected worker to an intermediate content memory coupled to a subsequent worker-selection unit.

6. The transcoding station of claim 1, wherein said content-transfer mechanism comprises:

an input selector for transferring GOP content data received through said network interface to designated workers of a first-stage worker group;

$(\Omega-1)$ switching units each connecting a respective worker-group to a subsequent worker group; and an output selector for transferring transcoded GOP content data to said network interface.

7. The transcoding station of claim 1, wherein at least one worker group comprises workers having respective dedicated resources.

8. The transcoding station of claim 1, wherein workers of at least one worker group connect to a shared pool of heterogenous resources through a resource-access mechanism where a resource of the shared pool is allocable to any worker of the at least one worker group on demand.

9. The transcoding station of claim 1, wherein the pool of workers is organized into three worker groups so that:

a first group of workers decodes received GOPs to produce respective decoded GOPs;

a second group of workers performs processes relevant to frame rate and frame dimension to organize frames of each GOP to be compatible with destination receivers; and a third group of workers encodes output GOPs of the second group of workers according to a requisite coding standard at destination to produce a compressed signal modulating a downstream carrier directed to respective destinations.

10. The transcoding station of claim 9, wherein:

said first group of workers comprises a predetermined number of decoding sub-groups, each decoding sub-group corresponding to a respective coding standard; and said third group of workers comprises a predetermined number of encoding sub-groups, each encoding sub-group corresponding to a respective coding standard.

11. The transcoding station of claim 1, wherein said network interface comprises:

a network interface processor;

a source-characterization module configured to determine characteristics of each engaged multimedia source of said plurality of multimedia sources, with the help of a source-characteristics database; and a destination interaction module configured to communicate notifications and respective transcoded content to all destinations of each transcoded stream.

12. A method of signal-stream transcoding, implemented at a transcoding station employing a plurality of hardware processors, the method comprising:

employing a plurality of heterogeneous workers, each worker comprising a processor and configured to perform a respective set of tasks of a plurality of predefined tasks, wherein the plurality of heterogeneous workers is organized into a predefined number of worker groups, each worker group comprising workers of a respective transcoding stage;

receiving heterogeneous signal streams from multiple signal sources, each signal stream associated with respective metadata and organized into respective groups of pictures (GOPs), each GOP comprising a respective number of video frames;

assigning, by an orchestrator, a respective set of heterogeneous workers of the plurality of heterogeneous workers to each GOP, wherein the orchestrator is coupled to one or more transcoding-stage controllers, each transcoding-stage controller communicatively coupled to a respective worker group, wherein said respective set of heterogeneous workers comprises one worker from each worker group, wherein each worker of each worker group has a dual control channel to the orchestrator, a first content-transfer channel from a content-transfer mechanism, and a second content-transfer channel to said content-transfer mechanism, thereby enabling transfer of control data and content data from a heterogeneous worker of any worker group to a heterogeneous worker of another worker group, wherein said content-transfer mechanism comprises:

a worker-selection unit for each worker group having a respective upstream selector for transferring GOP content to a selected worker of said each worker group and a downstream selector for transferring output of the selected worker to a common memory;

a first cyclical selector for supplying GOP content data from a network interface and from said worker-selection units to said common memory; and a second cyclical selector for transfer of GOP content data from said common memory to said worker-selection units and to said network interface;

concurrently processing individual GOPs of all of said heterogeneous signal streams as independent entities, said processing comprising:

identifying requisite tasks of said plurality of predefined tasks for each signal stream of said heterogeneous signal streams according to said respective metadata; and allocating and activating compatible workers to perform said requisite tasks for each GOP of said each signal stream to produce a respective transcoded GOP;

collating resulting transcoded GOPs according to signal-stream identity and sequential order within each signal-stream; and transmitting transcoded GOPs of each stream to respective designated destinations.

13. The method of claim 12, wherein said plurality of workers comprises a number of specific workers performing functions pertinent to respective coding standards and each said specific worker comprises dedicated resources.

14. The method of claim 12, wherein said requisite tasks comprise generic processes of:

decoding received GOPs to produce respective decoded GOPs;

adjusting frame-dimensions and frame-rates of the decoded GOPs to produce respective edited GOPs compatible with target receivers;

encoding the edited GOPs to produce respective compressed GOPs compatible with said target receivers; and modulating a downstream carrier signal directed to a network for distribution to said target receivers.

15. The method of claim 12, wherein said heterogeneous signal streams comprise signal streams formed according to different coding standards and said respective metadata of said each signal stream specify:

a first coding standard according to which said each signal stream is compressed at source;

frame dimensions and frame rate at source, and requisite frame dimensions and frame rate at destination; and a second coding standard according to which a respective transcoded signal stream is to be formed.

16. The method of claim 12, further comprising arranging said plurality of heterogeneous workers into:

a first group of workers for performing video-signal decompression functions;

a second group of workers for performing video-signal formatting; and a third group of workers for performing video-signal compression functions.

17. The method of claim 16, further comprising:

partitioning said first group of workers into a predetermined number of decoding sub-groups, each decoding sub-group corresponding to a respective coding standard; and partitioning said third group of workers into a predetermined number of encoding sub-groups, each encoding sub-group corresponding to a respective coding standard;

thereby expediting allocation of said compatible workers.

* * * * *